United States Patent
Ueno et al.

(10) Patent No.: US 7,788,856 B2
(45) Date of Patent: Sep. 7, 2010

(54) PREFORM, HYDROFORMING METHOD, AND HYDROFORMED PRODUCT

(75) Inventors: Kazuto Ueno, Tokyo (JP); Hajime Minagawa, Yokohama (JP); Shinji Ooe, Kanagawa (JP); Kazuhiro Mitamura, Chigasaki (JP); Satoru Majima, Hiratsuka (JP); Takashi Haraoka, Machida (JP); Masaaki Yoshitome, Sagamihara (JP); Hideto Kanafusa, Yokohama (JP); Tomoaki Watari, Yokohama (JP); Tomoyuki Hirota, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1412 days.

(21) Appl. No.: 11/191,259

(22) Filed: Jul. 28, 2005

(65) Prior Publication Data

US 2006/0076471 A1    Apr. 13, 2006

(30) Foreign Application Priority Data

Jul. 28, 2004   (JP) ............................ 2004-220851
Sep. 8, 2004    (JP) ............................ 2004-261390
Sep. 8, 2004    (JP) ............................ 2004-261396

(51) Int. Cl.
    *E04H 1/00*    (2006.01)
(52) U.S. Cl. ..................................... 52/79.8
(58) Field of Classification Search .................... 52/79.8
    See application file for complete search history.

(56) References Cited

U.S. PATENT DOCUMENTS

| | | | | |
|---|---|---|---|---|
| 3,927,817 A | * | 12/1975 | Hamilton et al. | 228/157 |
| 4,331,284 A | * | 5/1982 | Schulz et al. | 228/157 |
| 4,361,262 A | * | 11/1982 | Israeli | 228/118 |
| 4,549,685 A | * | 10/1985 | Paez | 228/118 |
| 4,588,651 A | * | 5/1986 | Israeli | 428/594 |
| 5,115,963 A | * | 5/1992 | Yasui | 228/157 |
| 5,118,026 A | * | 6/1992 | Stacher | 228/157 |
| 5,131,710 A | | 7/1992 | Kamiguchi et al. | |
| 5,204,161 A | * | 4/1993 | Pettit et al. | 428/174 |
| 5,366,787 A | * | 11/1994 | Yasui et al. | 428/174 |
| 5,714,233 A | * | 2/1998 | Suzuki et al. | 428/178 |
| 5,737,954 A | * | 4/1998 | Yasui | 72/60 |
| 6,722,009 B2 | | 4/2004 | Kojima et al. | |
| 6,747,253 B1 | * | 6/2004 | Firth et al. | 219/634 |
| 7,049,548 B1 | * | 5/2006 | Sjogren et al. | 219/385 |

(Continued)

FOREIGN PATENT DOCUMENTS

EP    0 728 541 A1    8/1996

(Continued)

*Primary Examiner*—Richard E Chilcot, Jr.
*Assistant Examiner*—Mark R Wendell
(74) *Attorney, Agent, or Firm*—Foley & Lardner LLP

(57) ABSTRACT

A preform having edges overlapped and jointed, two outer members for forming outer surfaces of a hydroformed product, and reinforcement members for forming reinforcement ribs that divide a hollow cross section of the hydroformed product, including a joint formed by, when more than three sheet materials for forming the outer members and the reinforcement members are overlapped together, welding a first sheet material on a surface of the overlapped sheet materials to a second sheet material positioned inside the first sheet material, and a space disposed and aligned with a joint plane between the second sheet material and a third sheet material located inside the second sheet material during the welding process.

33 Claims, 39 Drawing Sheets

U.S. PATENT DOCUMENTS 7,533,794 B2 * 5/2009 Comley et al. .............. 228/157

FOREIGN PATENT DOCUMENTS

| | | | |
|---|---|---|---|
| JP | 2002-082142 A | 3/2002 |
| JP | 2002-273526 A | 9/2002 |
| JP | 2003-025022 A | 1/2003 |
| JP | 2003-164924 A | 6/2003 |
| JP | 2004-042049 A | 2/2004 |
| JP | 2004-082142 A | 3/2004 |

* cited by examiner

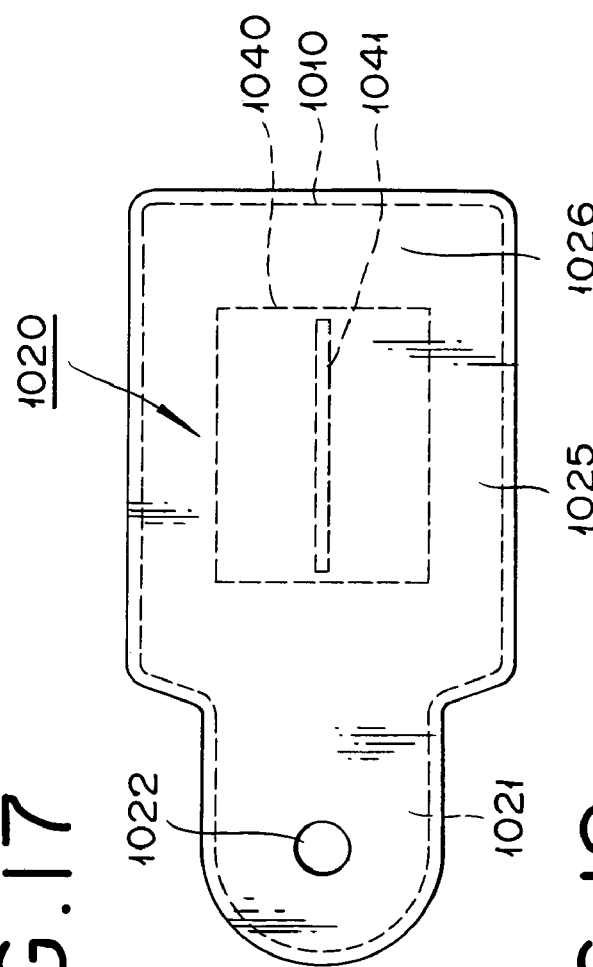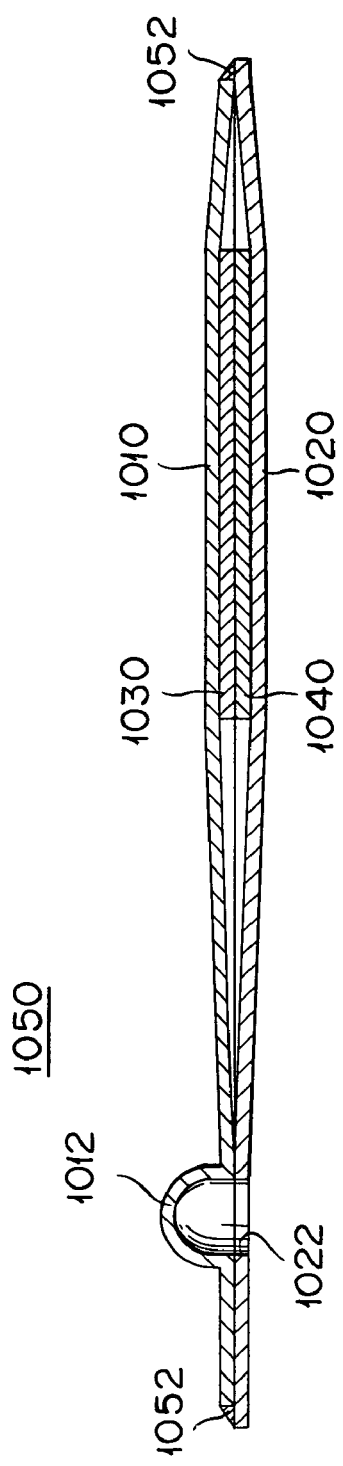
FIG.17
FIG.18

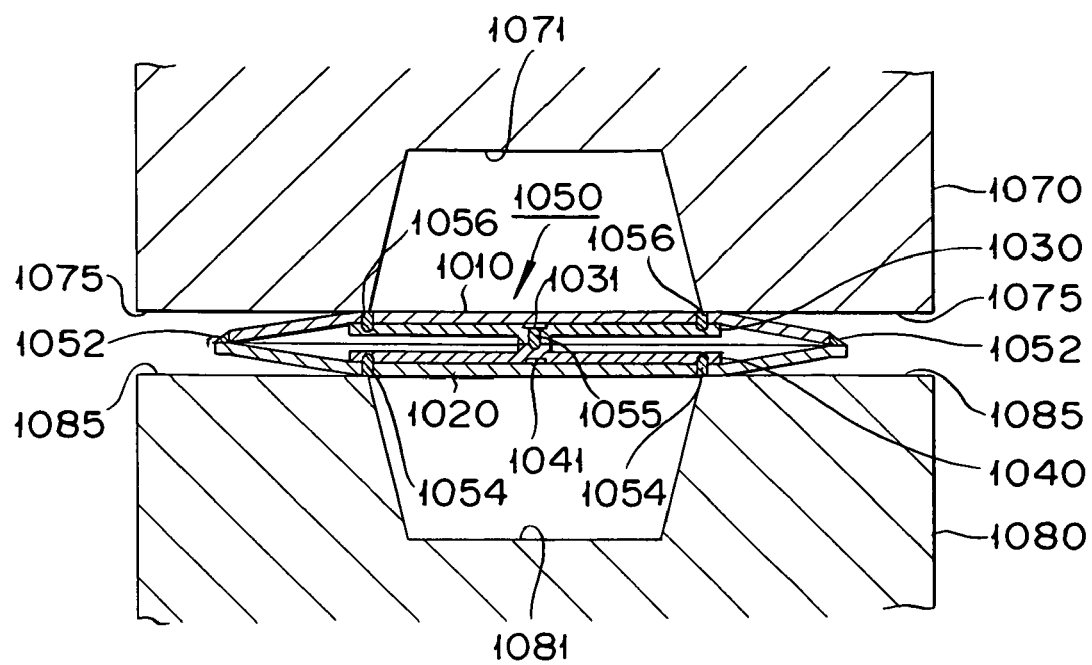
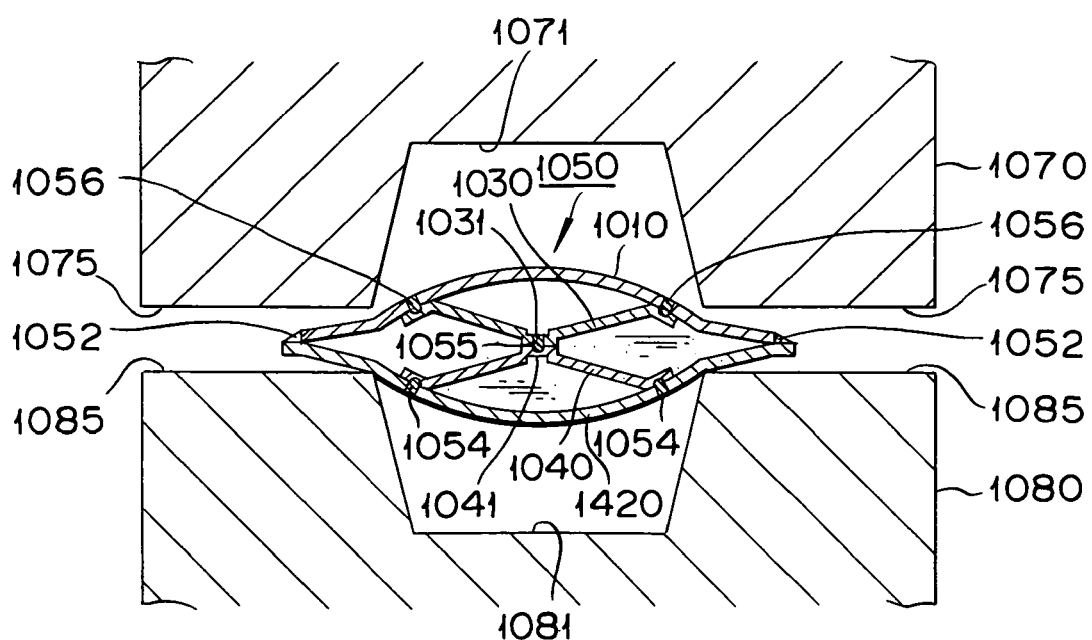

2065

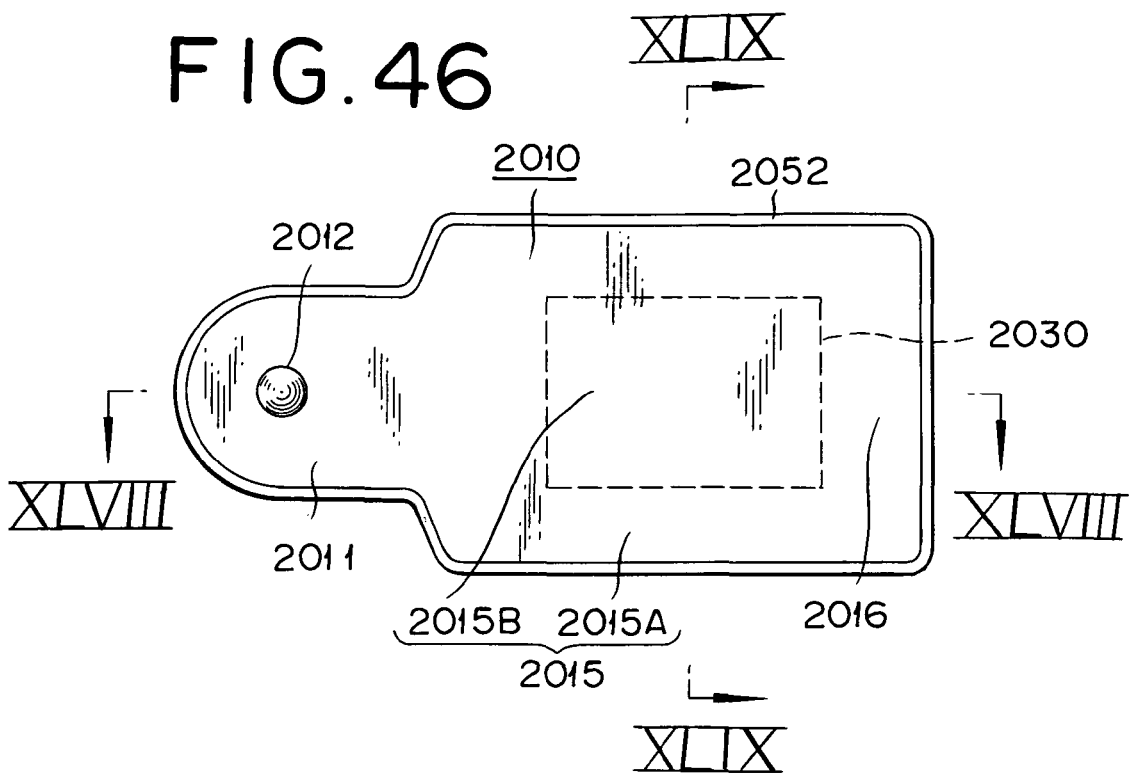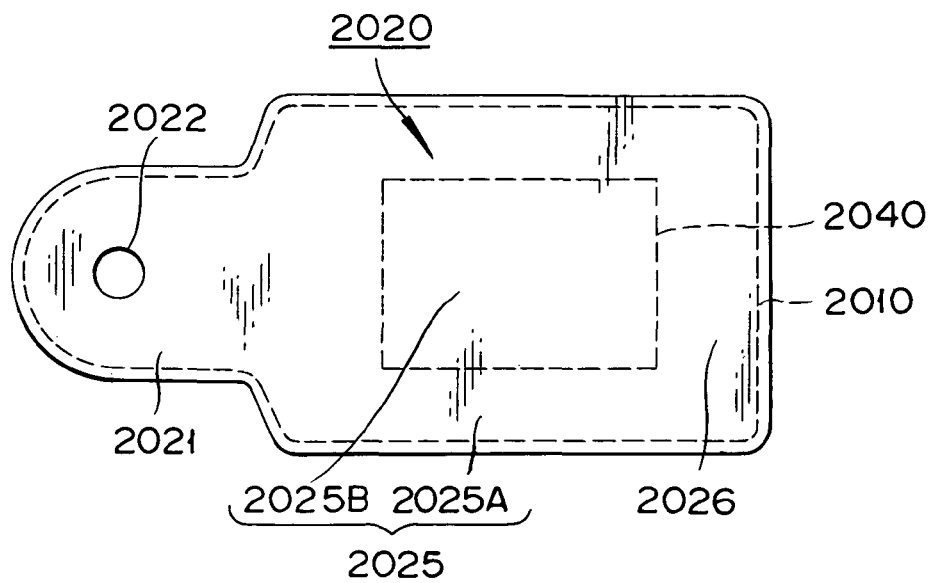

2050

2050

PREFORM, HYDROFORMING METHOD, AND HYDROFORMED PRODUCT

BACKGROUND OF THE INVENTION

1. Field of the Invention

The present invention relates to preforms, hydroforming method, and hydroformed products.

2. Description of the Related Art

A typical automobile body structural member such as a side member has a hollow structure for improving absorption capacity of crash impact, and provided with internal reinforcement members in order to reinforce the strength thereof, and a typical hydroformed product to be used as a body structural member is made by feeding hydraulic pressure to the inside of a preform having two outer members and reinforcement members to cause an inflating deformation (see, e.g., Publication No. of Unexamined Japanese Patent Application, 2004-082142).

SUMMARY OF THE INVENTION

However, such a preform includes sheet material outer members and reinforcement members, which are formed by repetitive layering and jointing, often causing problems as a result when welding is used as a jointing method.

For example, when a surface located first sheet material is welded to a underlying second sheet material, welding heat may be transmitted to a third sheet material located underneath the second member, resultantly causing an unwanted jointing of the third sheet material.

This reduces the welding yield of the preform and increases the manufacturing costs of the preform as well as the hydroformed product obtained from the preform.

It is therefore a general object of the invention to provide a preform with manufacturing cost advantages, a hydroforming method for obtaining preforms with manufacturing cost advantages, and hydroformed products with manufacturing cost advantages.

More specifically, it is an object of the invention to provide a preform having edges overlapped and jointed, two outer members for forming outer surfaces of a hydroformed product, and reinforcement members for forming reinforcement ribs that divide a hollow cross section of the hydroformed product. The preform includes a joint and a space. The joint is formed by, when more than three sheet materials for forming the outer members and the reinforcement members are overlapped together, welding a first sheet material on a surface of the overlapped sheet materials to a second sheet material positioned inside the first sheet material. The space is disposed and aligned with a joint plane between the second sheet material and a third sheet material located inside the second sheet material during the welding process.

Another object of the invention is to provide a hydroforming method including a) disposing a perform inside forming dies having cavity surfaces that correspond to outer surfaces of a hydroformed product, the perform having edges overlapped and jointed, two outer members for forming the outer surfaces of the hydroformed product, and reinforcement members for forming reinforcement ribs that divide a hollow cross section of the hydroformed product, and comprising a joint formed by, when more than three sheet materials for forming the outer members and the reinforcement members are overlapped together, welding a first sheet material on a surface of the overlapped sheet materials to a second sheet material positioned inside the first sheet material, and a space disposed and aligned with a joint plane between the second sheet material and a third sheet material located inside the second sheet material during the welding process, b) applying a hydraulic pressure to the inside of the perform to expand and deform the perform, and c) forming the outer surfaces of the hydroformed product and reinforcing ribs that divide the hollow cross section of the hydroformed product using the outer members and the reinforcement members.

A further object of the invention is to provide a hydroformed product formed by a) disposing a perform inside forming dies having cavity surfaces that correspond to outer surfaces of a hydroformed product, the perform having edges overlapped and jointed, two outer members for forming the outer surfaces of the hydroformed product, and reinforcement members for forming reinforcement ribs that divide a hollow cross section of the hydroformed product, and comprising a joint formed by, when more than three sheet materials for forming the outer members and the reinforcement members are overlapped together, welding a first sheet material on a surface of the overlapped sheet materials to a second sheet material positioned inside the first sheet material, and a space disposed and aligned with a joint plane between the second sheet material and a third sheet material located inside the second sheet material during the welding process, b) applying a hydraulic pressure to the inside of the perform to expand and deform the perform, and c) forming the outer surfaces of the hydroformed product and reinforcing ribs that divide the hollow cross section of the hydroformed product using the outer members and the reinforcement members.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 17 is a rear elevation of the preform shown in FIG. 16.

FIG. 18 is a cross-sectional view taken on line XVIII-XVIII of the view in FIG. 16.

FIG. 28 is a cross-sectional view taken online XXVIII-XXVIII of the view in FIG. 27.

FIG. 29 is a cross-sectional view of assistance in explaining an initial stage of forming continued from FIG. 28.

FIG. 46 is a plan view of assistance in explaining a preform according to the embodiment C1.

FIG. 47 is a rear elevation of the preform shown in FIG. 46.

DETAILED DESCRIPTION OF THE PREFERRED EMBODIMENT

The embodiments of this invention will be described below with reference to the accompanying drawings.

Figure 1:
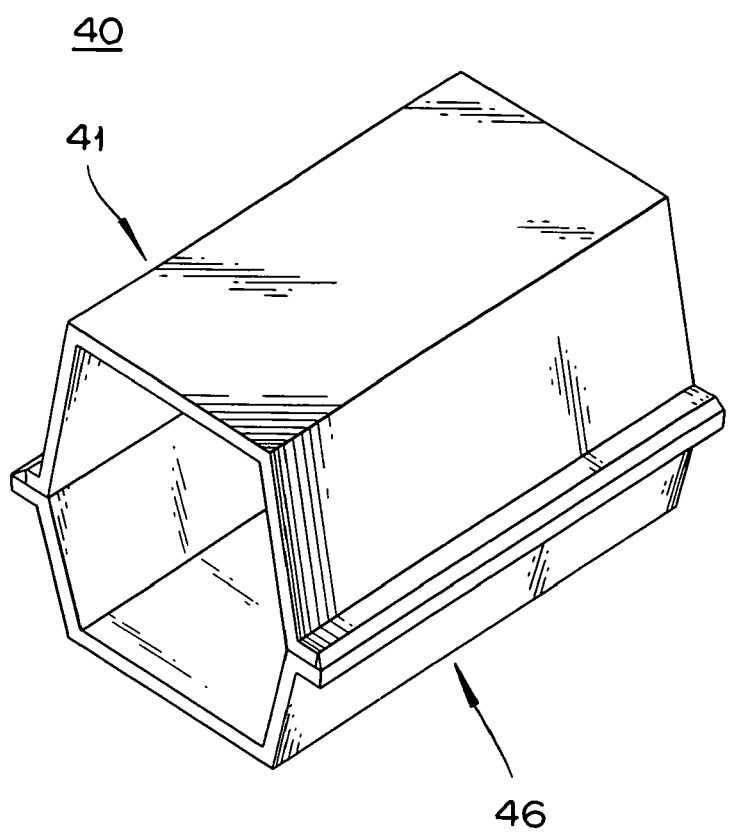
FIG. 1 is a perspective view of assistance in explaining a hydroformed product according to an embodiment A1.

FIG. 1 is a perspective view of assistance in explaining a hydroformed product according to an embodiment A1. A hydroformed product 40 is a hollow structural member that can be used as an automobile part that provide both light weight and high rigidity features, for example, axle part, body side part, suspension part and the like.

The hydroformed product 40 has an asymmetric cross section, so that the cross-sectional contour length of an outer surface 46 which is constituted by one sheet material as the bottom plate is shorter than the cross-sectional contour length of an outer surface 41 which is constituted by the other sheet material as the top plate in which the outer surface 46 and the outer surface 41 are disposed to face with each other, presenting a different cross-sectional contour length. For example, the ratio obtained by dividing the cross-sectional contour length of the outer surface 46 by the cross-sectional contour length of the outer surface 41, or the cross-sectional contour length ratio is 0.75 or less.

Figure 2:
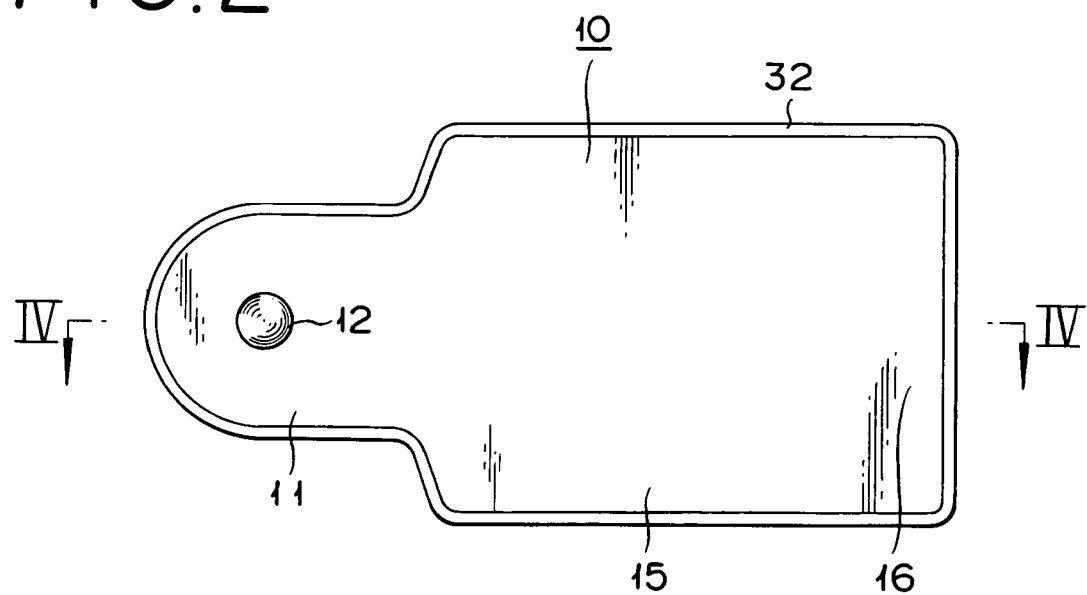
FIG. 2 is a plan view of assistance in explaining a preform according to the embodiment A1.
Figure 3:
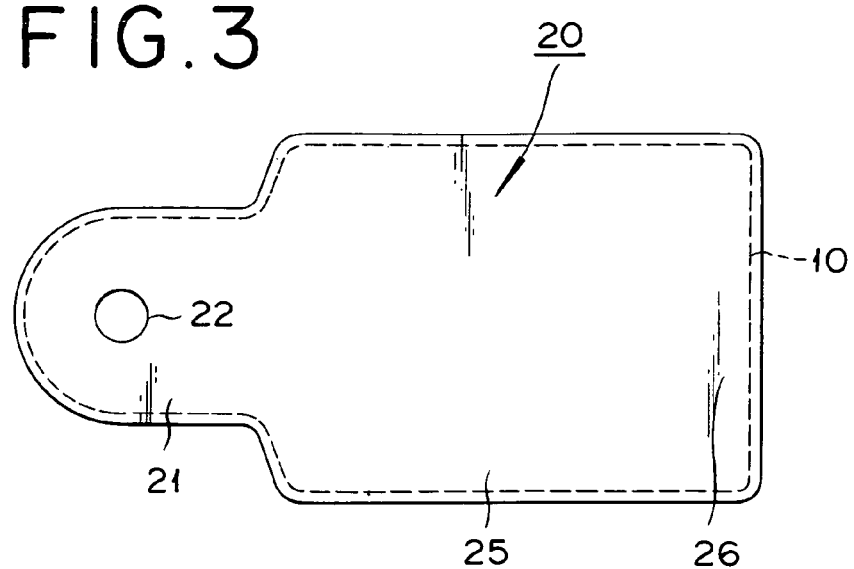
FIG. 3 is a rear elevation of the preform shown in FIG. 2.
Figure 4:
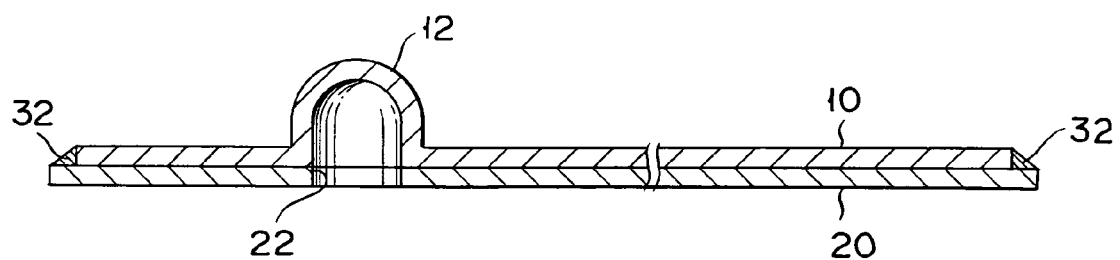
FIG. 4 is a cross-sectional view taken on line IV-IV of the preform shown in FIG. 2.

FIG. 2 is a plan view of assistance in explaining a preform according to the embodiment A1, FIG. 3 is a rear elevation of the preform shown in FIG. 2, and FIG. 4 is a cross-sectional view taken on line IV-IV of the preform shown in FIG. 2.

A preform 30 which is the raw material of the hydroformed product 40 has two overlapping sheet materials 10, 20. While the sheet materials 10, 20 are equal in thickness, they generate different elongations when a pressure is applied, the elongation of the sheet material 10 being larger than that of the sheet material 20.

The sheet material 10 is made of cold rolled steel sheet with a relatively good elongation characteristic. The cold rolled steel sheet is, e.g., SPCE intended for deep drawing applications defined in JIS-G-3141 having an elongation ratio of 42% and a tensile strength of 270 [N/mm$^2$] or higher.

The sheet material 20 is made of relatively inexpensive hot rolled mild steel sheet. The hot rolled mild steel sheet is, e.g., SPHE intended for deep drawing applications defined in JIS-G-3131 having an elongation ratio of 35% and a tensile strength of 270 [N/mm$^2$] or higher.

The physical properties such as mechanical characteristics of sheet materials 10, 20 are selected in consideration of the cross-sectional contour length ratio. For example, if the cross-sectional contour length ratio is 0.6, it is possible to use cold rolled steel sheet with an elongation ratio of 50% and a tensile strength of 270 [N/mm$^2$] as the sheet material 10 and hot rolled mild steel sheet with an elongation ratio of 30% and a tensile strength of 370 [N/mm$^2$] as the sheet material 20

The edges of the sheet materials 10, 20 have a joint 32 formed by fillet welding. The method of forming the joint 32 can be anything that securely provides good sealing and does not affect hydroforming capability, for example, laser welding, arc welding, or gluing.

The sheet material 10 is used to form the outer surface 41 that has a long cross-sectional contour length in the hydroformed product 40. The sheet material 10 has a middle part 15 and end sections 11 and 16 located on both ends across the middle part 15. A dome-shaped part 12 is formed on the end section 11.

The sheet material 20 is used to form the outer surface 46 that has a short cross-sectional contour length in the hydroformed product 40. The sheet material 20 is larger than the sheet material 10 in size, has a similar shape as the sheet material 10, a middle part 25 that corresponds with the middle part 15 of the sheet material 10, and end sections 21, 26 that correspond with the end sections 11, 16 of the sheet material 10. The end section 21 has an opening 22 that coincides with the position of the dome-shaped part 12.

Figure 5:
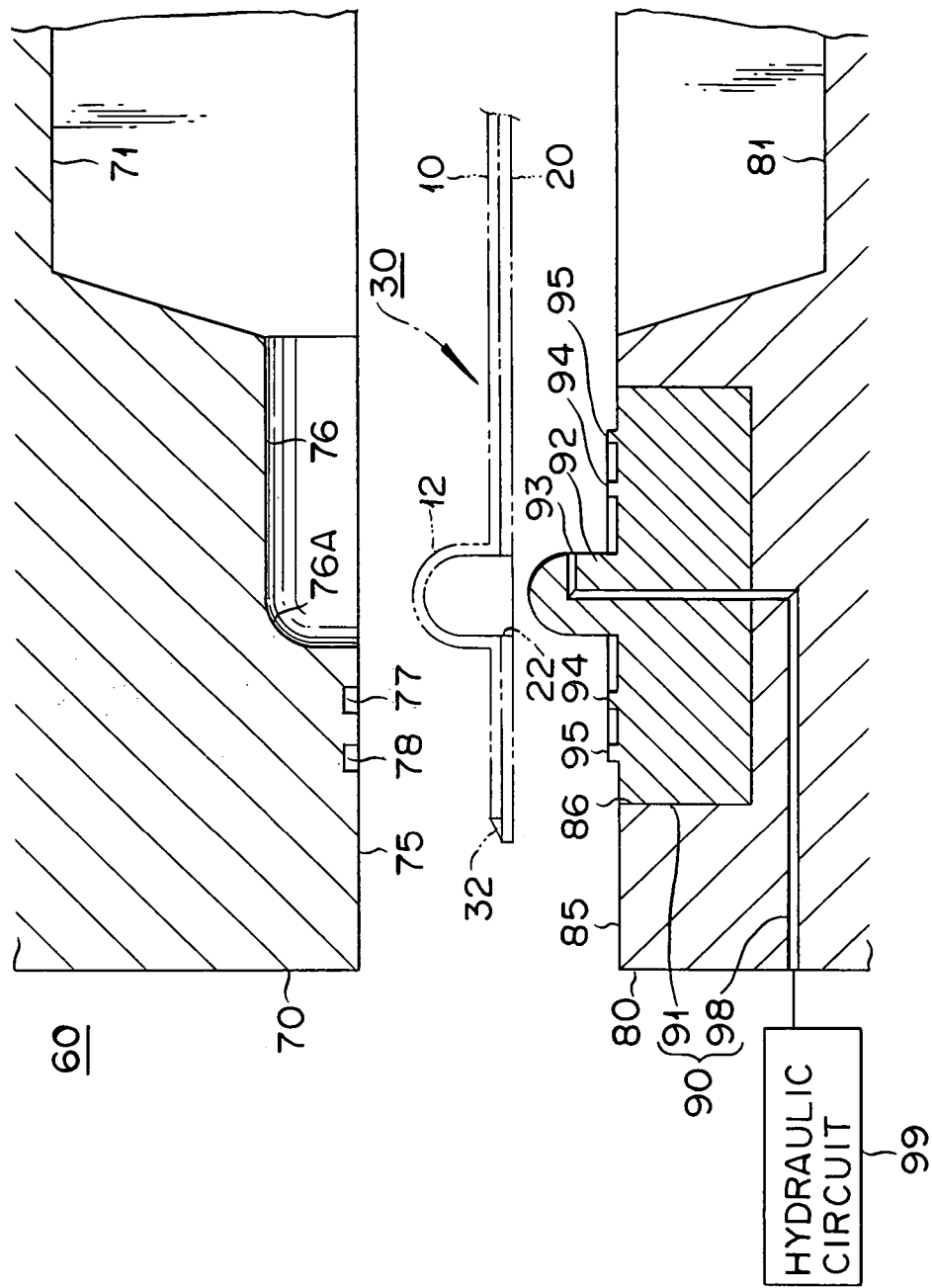
FIG. 5 is a cross-sectional view of assistance in explaining hydroforming apparatus according to the embodiment A1.
Figure 6:
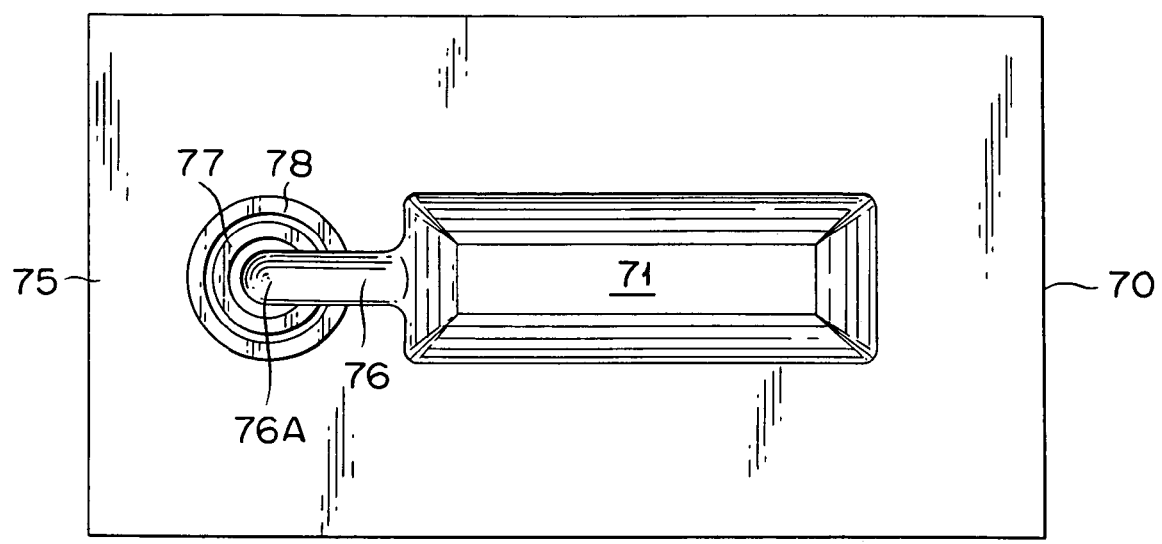
FIG. 6 is a plan view of assistance in explaining the top die for the hydroforming apparatus shown in FIG. 5.
Figure 7:
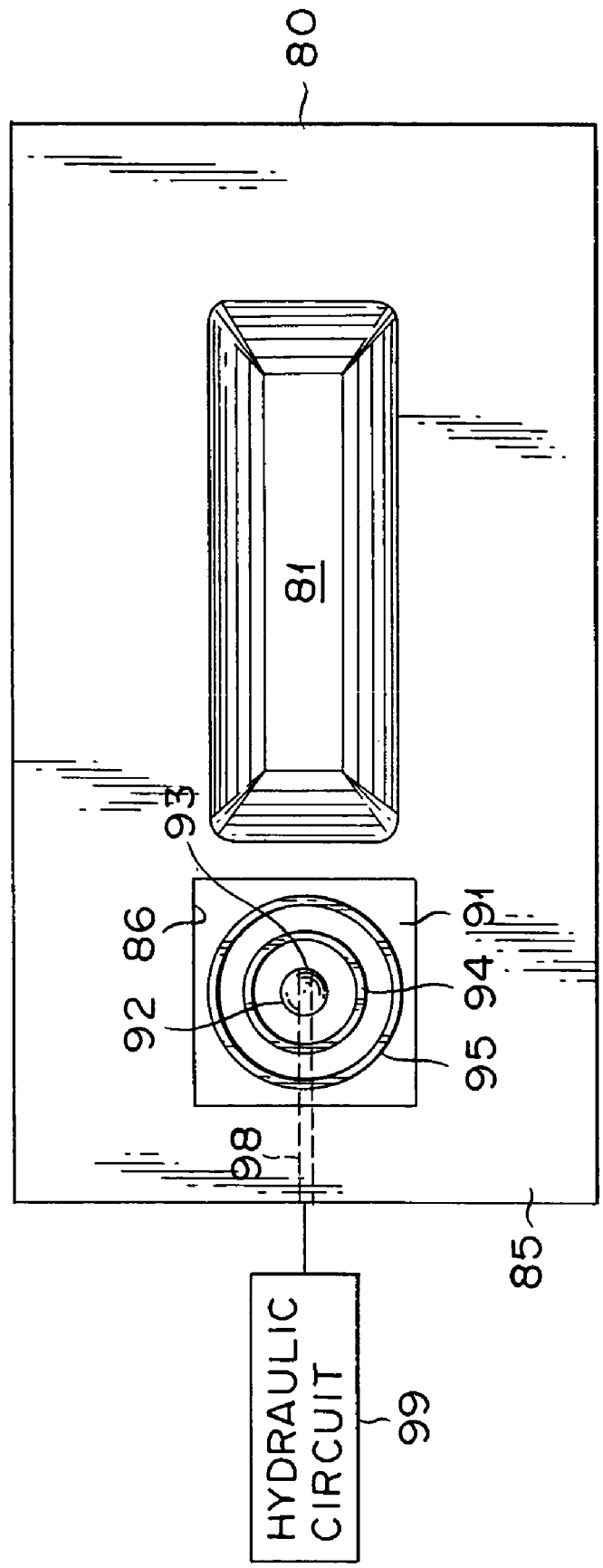
FIG. 7 is a plan view of assistance in explaining the bottom die for the hydroforming apparatus shown in FIG. 5.

FIG. 5 is a cross-sectional view of assistance in explaining hydroforming apparatus according to the embodiment A1, FIG. 6 is a plan view of assistance in explaining the top die for the hydroforming apparatus shown in FIG. 5, and FIG. 7 is a plan view of assistance in explaining the bottom die for the hydroforming apparatus shown in FIG. 5.

The hydroforming apparatus 60 has forming dies of the top die 70 and the bottom die 80, and a hydraulic pressure supply mechanism 90.

The top die 70 and the bottom die 80 can be moved proximate to or apart from each other, and clamped with a preform 30 being placed inside thereof. The top die 70 and the bottom die 80 have cavity surfaces 71, 81 and pressing sections 75, 85. The cavity surface 71 corresponds to the outer surface 41 of the hydroformed product having the longer cross-sectional contour length, and the sheet material 10 with a larger elongation amount is placed facing thereto.

The cavity surface 81 corresponds to the outer surface 46 of the hydroformed product having the shorter cross-sectional contour length, and the sheet material 20 with a smaller elongation amount is placed facing thereto. The pressing sections 75, 85 are portions to grip the outer periphery of the preform 30 during the die clamping.

The pressing section 75 of the top die 70 includes a recess 76 that extends from the cavity surface 71, having arc-shaped grooves 77, 78 placed to surround an end section 76A of the recess 76. The end section 76A has a cross-sectional shape that corresponds to the outer shape of the section obtained by vertically separating the dome-shaped part 12 of the preform 30 in two parts. The common center of the arc-shaped grooves 77, 78 coincides with the center of the end section 76A. The pressing section 85 of the bottom die 80 has a substantially rectangular recess 86 where a nozzle unit 91 is to be placed.

The hydraulic pressure supply mechanism 90 is connected to a pressure generating device having a booster cylinder and a forming medium source, and has a flow path 98 and a nozzle unit 91 that are connected to a hydraulic circuit 99. The flow path 98 extends through the inside of the bottom die 80 and reaches the nozzle unit 91. The forming medium is typically water.

The nozzle unit 91 has a dome-shaped part 92 that corresponds to the inside of the dome-shaped part 12 of the preform 30, and annular protrusions 94, 95 disposed to surround the dome-shaped part 92. The annular protrusions 94, 95 are matched in positions with the arc-shaped grooves 77, 78 of the pressing section 75 of the top die 70.

The sizes of the annular protrusions 94, 95 are smaller than the arc-shaped grooves 77, 78 in size and are selected in consideration of the thickness of the sheet materials 10, 20. The arc-shaped grooves 77, 78 as well as annular protrusions 94, 95 can be omitted if necessary.

The dome-shaped part 92 can pass freely through the opening 22 of the sheet material 20 and has an injection port 93 that communicates with the flow path 98. When the nozzle unit 91 is inserted into the opening 22 and placed inside the dome-shaped part 12 of the preform 30, the forming medium supplied from the hydraulic circuit 99 is introduced inside the preform 30 via the nozzle unit 91 and the opening 22. As a result, the forming medium applies a hydraulic pressure to the inside of the preform 30 and causes an inflating deformation of the preform 30.

Figure 8:
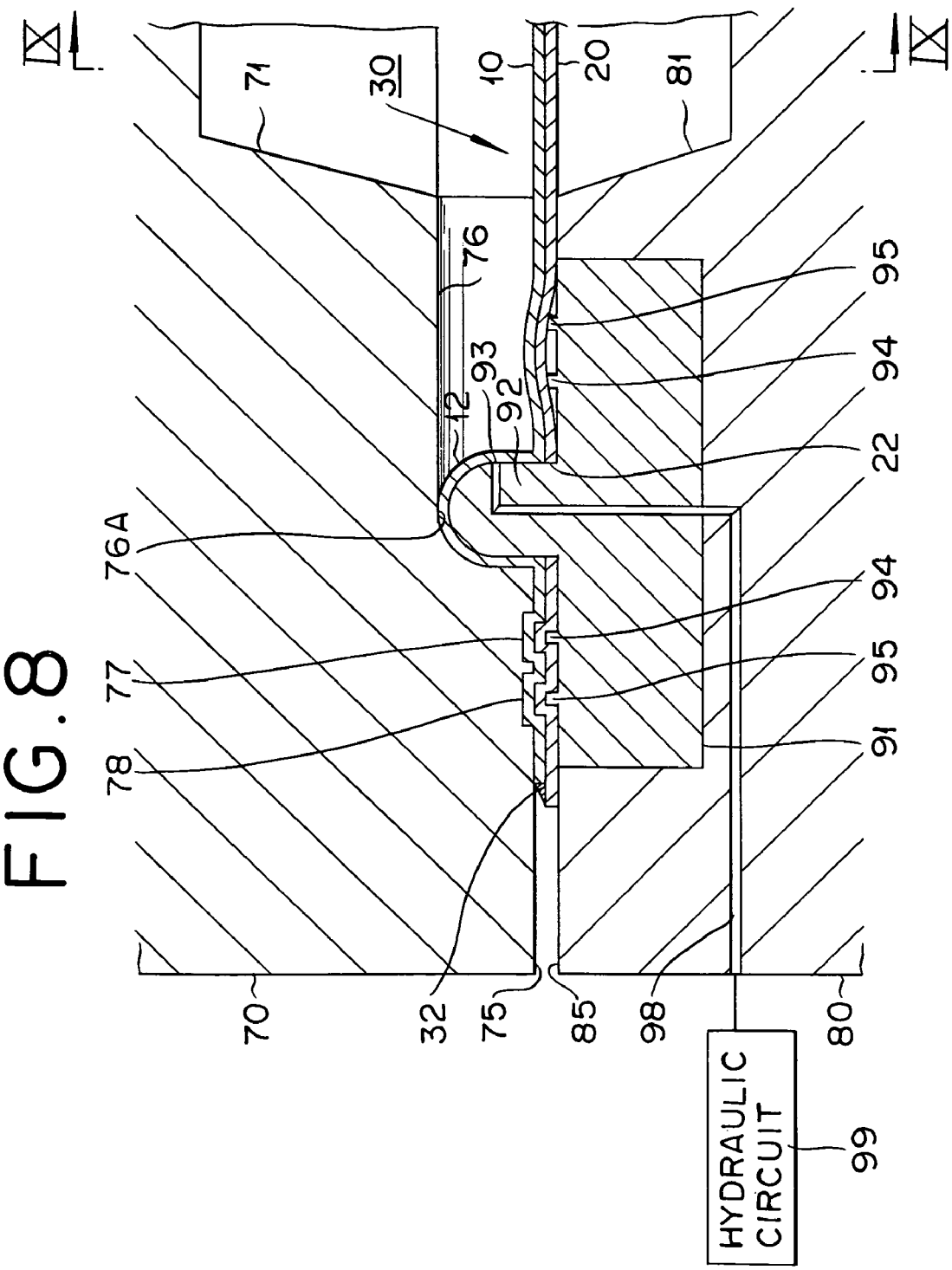
FIG. 8 is a cross-sectional view of assistance in explaining a hydroforming method according to the embodiment A1 showing a die clamping stage.
Figure 10:
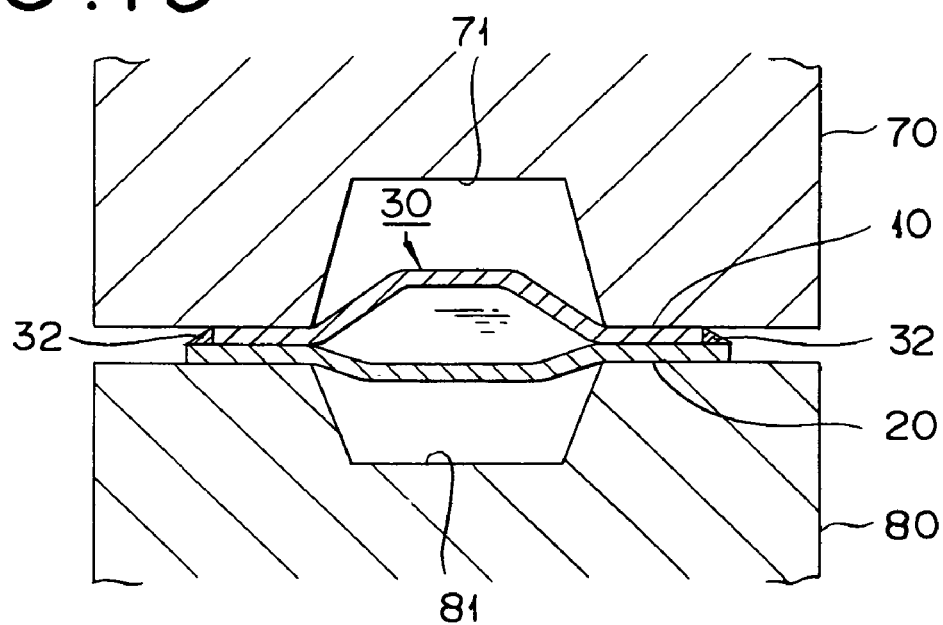
FIG. 10 is a cross-sectional view of assistance in explaining an initial stage of forming continued from FIG. 8.
Figure 11:
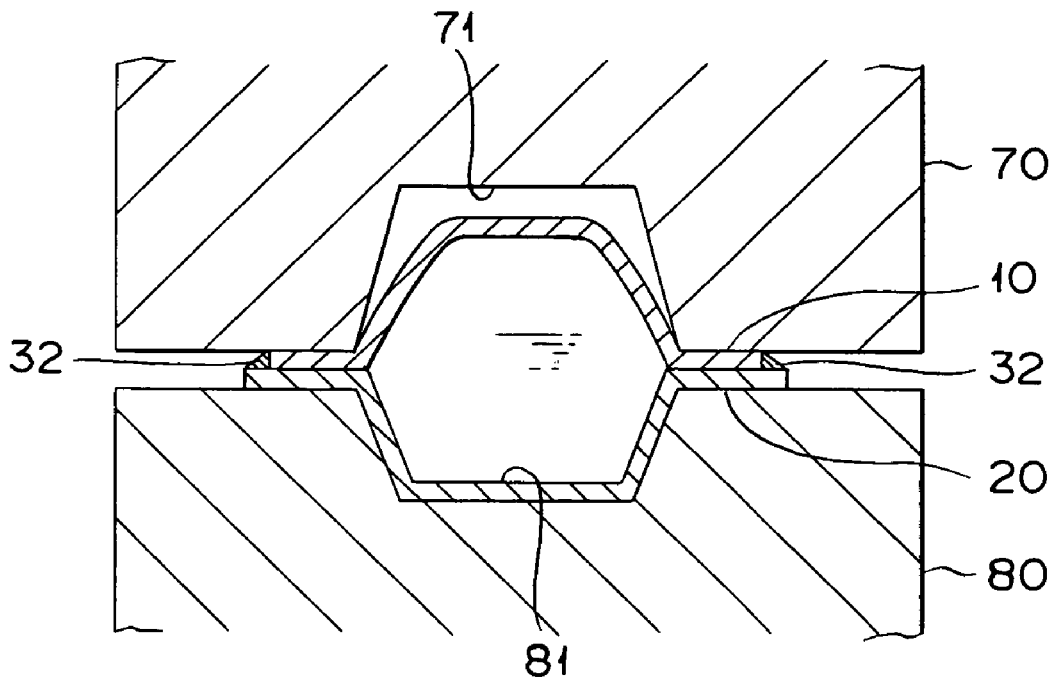
FIG. 11 is a cross-sectional view of assistance in explaining an intermediate stage of forming continued from FIG. 10.
Figure 12:
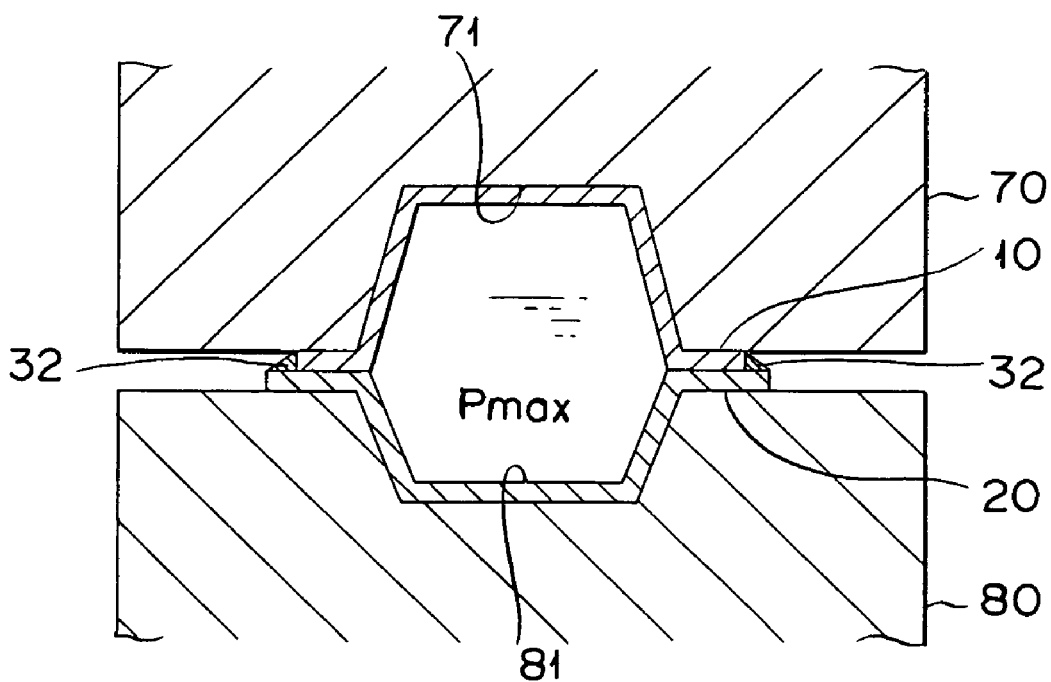
FIG. 12 is a cross-sectional view of assistance in explaining a latter stage of forming continued from FIG. 11.

Next, the hydroforming method according to the embodiment A1 will be described. FIG. 8 is a cross-sectional view of assistance in explaining a die clamping stage, FIG. 9 is a cross-sectional view taken on line IX-IX of the view in FIG. 8, FIG. 10 is a cross-sectional view of assistance in explaining an initial stage of forming continued from FIG. 8, FIG. 11 is a cross-sectional view of assistance in explaining an intermediate stage of forming continued from FIG. 10, and FIG. 12 is a cross-sectional view of assistance in explaining a latter stage of forming continued from FIG. 11.

First, the preform 30 is placed on the bottom die 80. At this time, the sheet material 20, which is to constitute the outer surface 46 having the shorter cross-sectional contour length, is disposed in such a way as to face the cavity surface 81, and the opening 22 of the sheet material 20 is aligned with the dome-shaped part 92 of the nozzle unit 91 of the hydraulic pressure supply mechanism 90.

Figure 9:
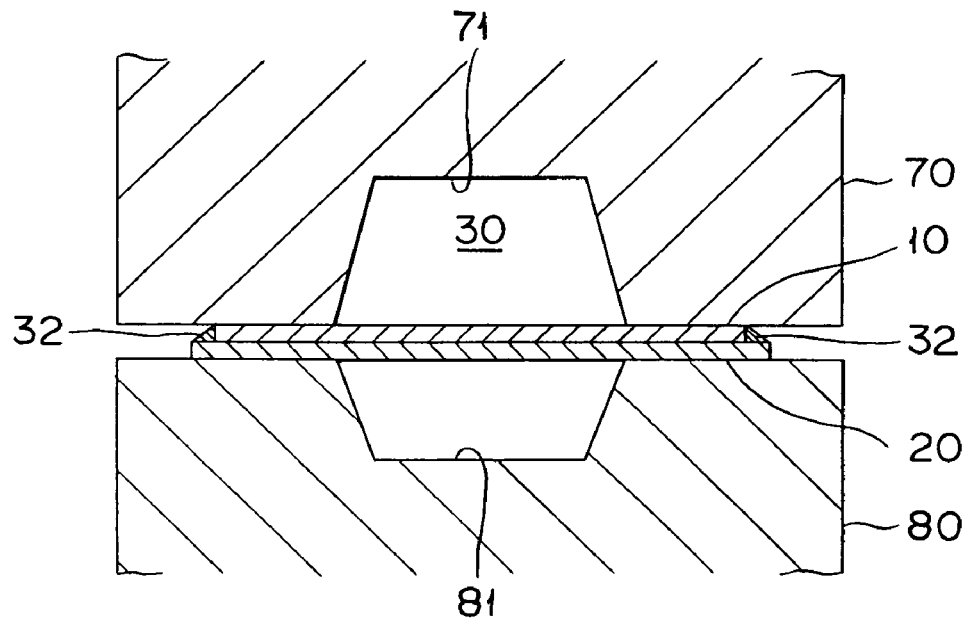
FIG. 9 is a cross-sectional view taken on line IX-IX of the view in FIG. 8.

After that, the top die 70, which has been in a standby position, comes down to approach the bottom die 80 to complete the clamping of the top die 70 and the bottom die 80 (see FIG. 8 and FIG. 9). At this time, the sheet material 10, which is to constitute the outer surface 41 having the longer cross-sectional contour length, is disposed in such a way as to face the cavity surface 71, and the dome-shaped part 12 of the sheet material 10 is fitted to the end section 76A of the recess 76 located in the pressing section 75 of the top die 70. The vicinity of the dome-shaped part 12 is gripped by the arc-shaped grooves 77, 78 in the pressing section 75 of the top die 70 and the annular protrusions 94, 95 in the nozzle unit 91 placed in the recess 86 of the bottom die 80. This generates an annularly deformed area in the vicinity of the dome-shaped part 12, which provides an improved sealability against the forming medium being introduced.

The hydraulic pressure supply mechanism 90 introduces a forming medium supplied from the hydraulic circuit 99 into the inside of the preform 30 via the opening 22 of the nozzle unit 91 to apply a hydraulic pressure. As a result the preform 30 develops an inflating deformation (see FIG. 10). Since the sheet material 10 shows a greater elongation amount and a better elongation characteristic, its inflating deformation propagates quicker than with the sheet material 20.

After the inflating deformation of the sheet material 20 facing the cavity surface 81 having the shorter cross-sectional contour length is completed (see FIG. 11), the inflating deformation of the sheet material 10 facing the cavity surface 71 having the longer cross-sectional contour length continues. At this time, the sheet material 20 constitutes the outer surface 46 having the shorter cross-sectional contour length, and it does not develop any wrinkles or buckling due to excessive material as the elongation amount is limited even though the edge area is jointed thus maintaining a good external appearance on the outer surface 46. On the other hand, the sheet material 10 constitutes the outer surface 41 having the longer cross-sectional contour length, and it does not develop any cracks or fractures because of its excellent elongation characteristic thus maintaining a good external appearance on the outer surface 41.

When the inner pressure of the preform 30 reaches its final pressure Pmax, the supply of the forming medium is stopped and held for a prescribed time to complete the inflation process of the preform 30, or sheet material 10 (see FIG. 12). Next, the top die 70 is raised after removing the hydraulic pressure, the hydroformed products is taken out, and trimming including edge cutting is performed.

As described above, the embodiment A1 provides a hydroforming method for obtaining a hydroformed product having different cross-sectional contour lengths and an excellent outer shape.

The elongation amount has a corresponding relation with the tensile strength. For example, a sheet material with a higher tensile strength provides a smaller elongation amount, and a sheet material with the lower tensile strength provides a larger elongation amount. Therefore, it is also preferable to consider the tensile strength when selecting the sheet materials 10, 20. Also, the opening 22 of the sheet material 20 and the nozzle unit 91 of the hydraulic pressure supply mechanism 90 can both be provided more than one.

Figure 13:
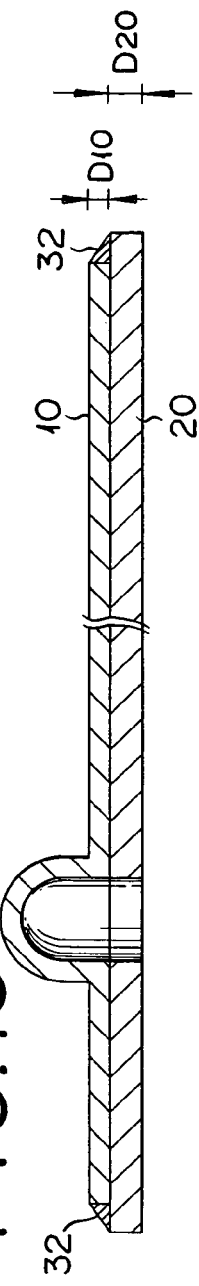
FIG. 13 is a cross-sectional view of assistance in explaining a variation of the embodiment A1.

FIG. 13 is a cross-sectional view of assistance in explaining a variation of the embodiment A1.

In this variation, the amount of elongation when a pressure is applied varies with the difference in the sheet thickness. Specifically, a sheet thickness $D_{20}$ of the sheet material 20, which is to constitute an outer surface of a hydroformed product having a shorter cross-sectional contour length is designed to be greater than a sheet thickness $D_{10}$ of the sheet material 10, which is to constitute an outer surface of the hydroformed product having a longer cross-sectional contour length, and the sheet material 20 provides a smaller elongation amount compared to that of the sheet material 10.

Thus it is possible to obtain hydroformed products having an excellent external shape and different cross-sectional contour lengths. The sheet thicknesses $D_{10}$, $D_{20}$ of the sheet materials 10, can be arbitrarily chosen considering the mechanical properties of the sheet materials 10, 20 as well as the cross-sectional contour length ratio of the intended hydroformed product. It is also possible to make the elongation amount vary when a pressure is applied by adjusting thermal refining condition of materials instead of sheet thickness.

Figure 14:
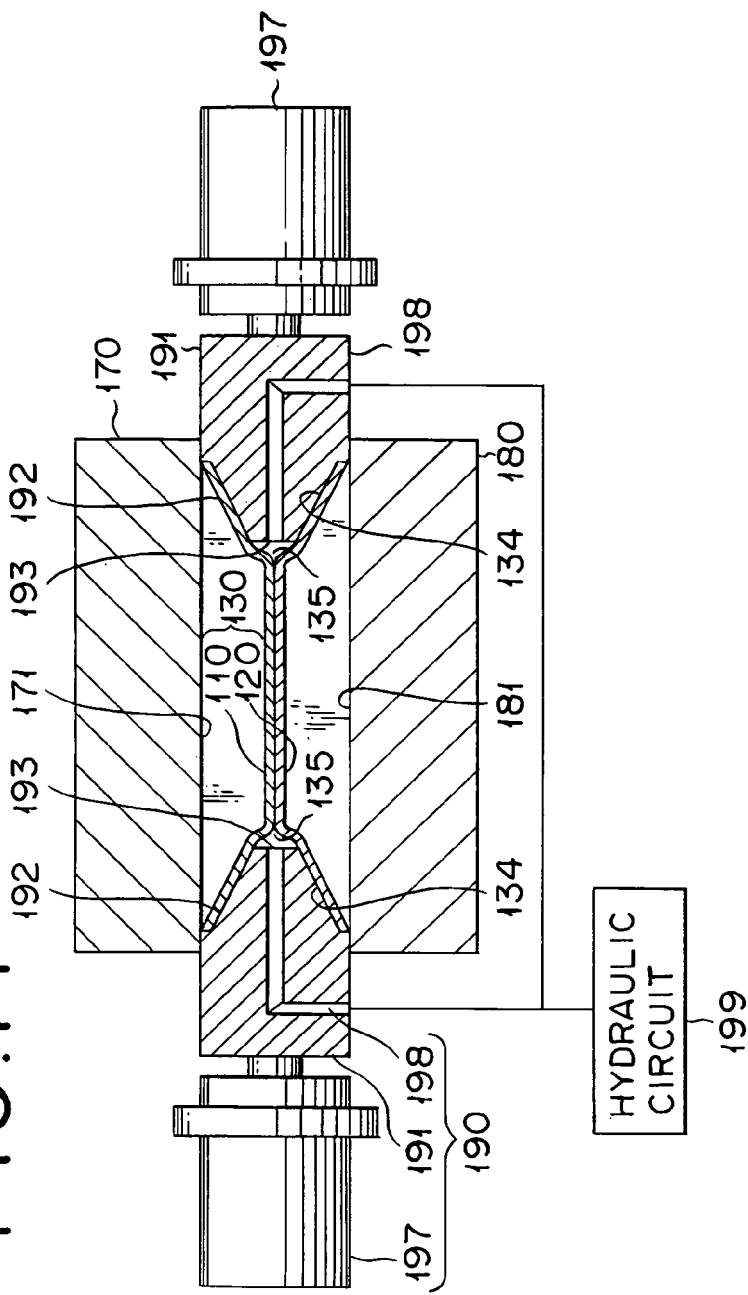
FIG. 14 is a cross-sectional view of assistance in explaining another variation of the embodiment A1.

FIG. 14 is a cross-sectional view of another variation of the embodiment A1. In general, this variation example has a different shape of preform and a different hydraulic pressure supply mechanism.

A preform 130 has a non-jointing part 134 formed by the edges of two overlapping sheet materials 110, 120. The non-jointing part 134 is formed substantially conical with its outer end having a circular opening and its inner end 135 communicating with the inside of the preform 130. The non-jointing part 134 is not limited to a shape being disposed throughout the end face but can be partially disposed.

The sheet material 110 has a larger elongation amount than that of the sheet material 120 and is disposed in such a way as to face the cavity surface 171 of the top die 170. The cavity surface 171 corresponds to the outer surface having a longer cross-sectional contour length of the hydroformed product. The sheet material 120 has a smaller elongation amount than that of the sheet material 110 and is disposed in such a way as to face the cavity surface 181 of the bottom die 180. The cavity surface 181 corresponds to the outer surface having a shorter cross-sectional contour length of the hydroformed product.

The hydraulic pressure supply mechanism 190 has a flow path 198 that communicates with a hydraulic circuit 199, an axial press punch 191, and an axial press cylinder 197. The axial press punch 191 is located on each side of the top die 170 and the bottom die 180 and is connected to the axial press cylinder 197. The axial press punch 191 has a nozzle unit 192.

The nozzle unit 192 has an injection port 193 that communicates with the flow path 198, and presents a substantially conical shape that corresponds with the shape of the non-jointing part 134. The axial press cylinder 197 supports the axial press punch 191 to move towards or away from the die, or the top die 170 and the bottom die 180. The power source of the axial press cylinder 197 is typically hydraulic or pneumatic.

The non-jointing part 134 of the preform 130 expands when the nozzle unit 192 is pushed into its opening, while its expanded diameter is restricted by the top die 170 and the bottom die 180. As a consequence, the non-jointing part 134 makes a close contact with the nozzle unit 192 securing a sealing effect.

The injection port 193 of the nozzle unit 192 is aligned with the inner end 135 that communicates with the inside of the preform 130. As a consequence, the forming medium supplied from the hydraulic circuit 199 is introduced to the flow path 198 and the injection port 193, the forming medium is injected into the inside of the preform 130 via the non-jointing part 134 and the inner end 135.

Consequently, the hydraulic pressure supply mechanism 190 applies a hydraulic pressure to the inside of the preform 130 to cause an inflating deformation. At this time, the sheet material 120 having a smaller elongation capability is supposed to form an outer surface of the hydroformed product with a shorter cross-sectional contour length, so that it does not cause any large amount of excess material and causes no wrinkles or buckling. On the other hand, the sheet material 110 having a larger elongation capability is supposed to form an outer surface with a longer cross-sectional contour length, so that it causes no crack or fracture. Thus it is possible to obtain hydroformed products having an excellent external shape and different cross-sectional contour lengths.

As described above, the shape of the preform and the hydroforming apparatus can have various types of designs.

Incidentally, in the embodiment A1, sheet materials that constitute the preform do not have to be made from one raw material but can be made of a tailored blank built by jointing a plurality of raw materials. The difference in elongations when a pressure is applied can be generated by arbitrarily adjusting material, material thickness, and tempering condition.

Figure 15:
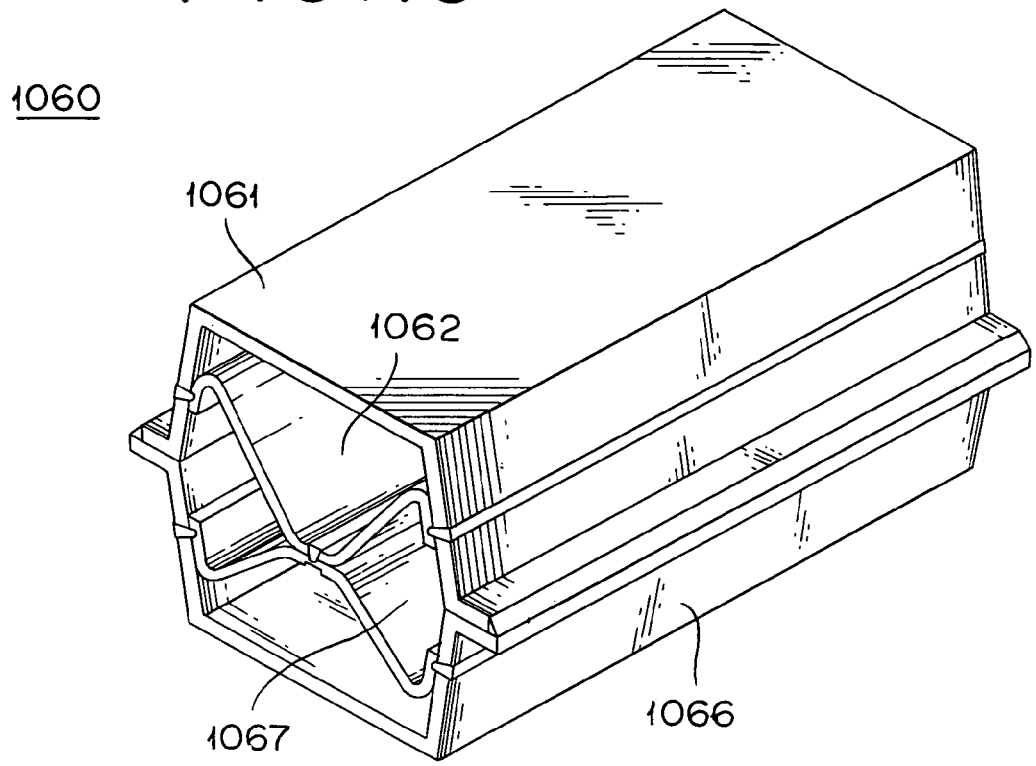
FIG. 15 is a perspective view of assistance in explaining a hydroformed product according to an embodiment B1.

FIG. 15 is a perspective view of assistance in explaining a hydroformed product according to an embodiment B1. The hydroformed product 1060 has outer surface s 1061, 1066 as well as reinforcing ribs 1062, 1067 and can be used as an automobile part that provides both light weight and high rigidity features, for example, axle part, body side part, suspension part and the like. The outer surface s 1061, 1066 form a hollow structure, while reinforcing ribs 1062, 1067 divide the hollow cross section into four sectors.

Figure 16:
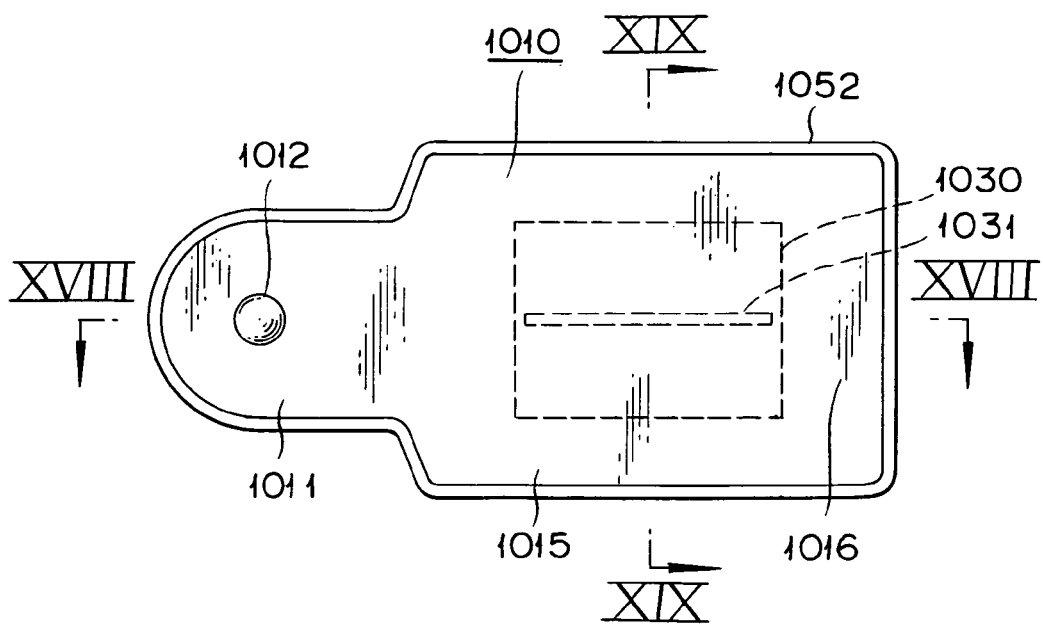
FIG. 16 is a plan view of assistance in explaining a preform according to the embodiment B1.
Figure 19:
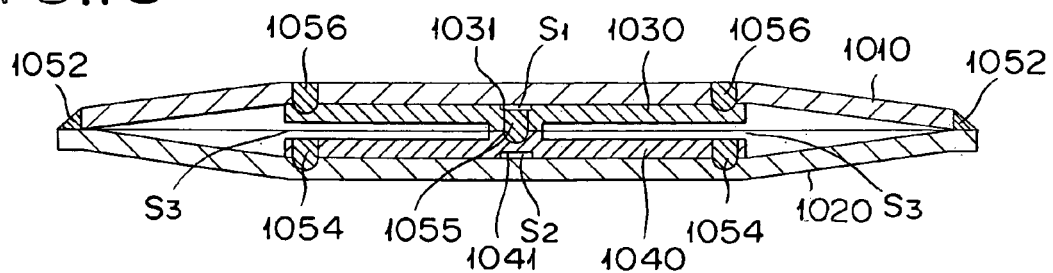
FIG. 19 is a cross-sectional view taken on line XIX-XIX of the view in FIG. 16.
Figure 20:
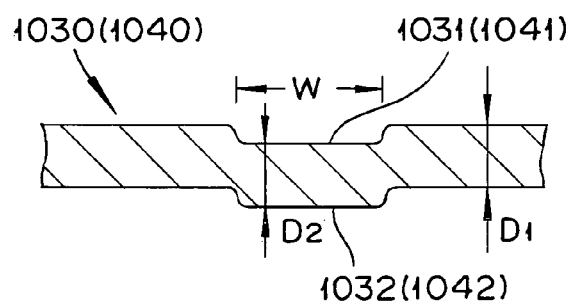
FIG. 20 is a cross-sectional view of assistance in explaining shapes of the lower insertion plate and the upper insertion plate that constitute reinforcement members placed in the inside of a preform.

FIG. 16 is a plan view of assistance in explaining a preform according to the embodiment B1, FIG. 17 is a rear elevation of the preform shown in FIG. 16, FIG. 18 is a cross-sectional view taken online XVIII-XVIII of the view in FIG. 16, FIG. 19 is a cross-sectional view taken on line XIX-XIX of the view in FIG. 16, and FIG. 20 is a cross-sectional view of assistance in explaining shapes of the lower insertion plate and the upper insertion plate that constitute a reinforcement member placed in the inside of a preform.

The preform 1050 has outer members and reinforcement members. The outer members are to form the outer surface s 1061, 1066 of the hydroformed product 1060. The reinforcement members are to form the reinforcement ribs 1062, 1067 of the hydroformed product 1060.

The sheet materials that constitute the outer members include the top plate 1010 as one of the outer members and the bottom plate 1020 as the other outer member and their overlapping edge has a joint 1052 formed by fillet welding. The sheet materials that constitute there inforcement members include the upper insertion plate 1030 as second reinforcement member and the lower insertion plate 1040 as first reinforcement member, and are disposed inside the top plate 1010 and the bottom plate 1020.

The raw material of the sheet material that constitute the outer members and the reinforcement members are not particularly specified but can be cold rolled steel sheet or hot rolled mild steel sheet. Also, the method of forming the joint 1052 can be anything that securely provides good sealing and does not affect hydroforming capability, for example, laser welding, arc welding, or gluing.

The top plate 1010 that forms the outer surface 1061 of the hydroformed product 1060 have a middle part 1015 and end sections 1011, 1016 located on both ends across the middle part 1015. A dome-shaped area 1012 is formed on the end section 1011.

The bottom plate 1020 that is to form the outer surface 1066 of the hydroformed products 1060 is larger than the top plate 1010 in size and is similar to the top plate 1010 in shape, and has a middle part 1025 that corresponds to the middle part 1015 of the top plate 1010 and end sections 1021, 1026 that correspond to the end sections 1011, 1016 of the top plate 1010. The end section 1021 has an opening 1022 that coincides with the position of the dome-shaped part 1012.

The upper insertion plate 1030 and the lower insertion plate 1040 have substantially similar shapes and have recesses 1031, 1041 located substantially in the middle of both ends thereof respectively (see FIG. 20). The recesses 1031, 1041 have, for example, bending shapes which can be formed by presses.

The recesses 1031, 1041 are pierce-welded as described later. The welding heat generated by the pierce welding moves primarily through an area with reduced sheet thickness and the welding preferably requires a penetrated area of about two to three times of the material thickness. Therefore, it is so designed that the sheet thickness $D_2$ of the bottoms of the recesses 1031, 1041 is smaller than the sheet thickness $D_1$ of the vicinities of the recesses 1031, 1041, or of areas where the recesses 1031, 1041 are not formed, and the width W of the recesses 1031, 1041 is two to three times of the sheet thickness $D_1$.

The lower insertion plate 1040 is so disposed as to make the recess 1041 to face against the bottom plate 1020, both ends of the lower insertion plate 1040 are connected to the bottom plate 1020 via joints 1054, and the recess 1041 forms a space $S_2$ between it and the bottom plate 1020. The upper insertion plate 1030 is so disposed as to make the recess 1031 to face against the top plate 1010, both ends of the upper insertion plate 1030 are connected to the top plate 1010 via a joint 1056, and the recess 1031 forms a space $S_1$ between it and the top plate 1010.

A back area 1042 of the recess 1041 of the lower insertion plate 1040 is connected to a back area 1032 of the recess 1031 of the upper insertion plate 1030 via a joint 1055. The back areas 1032, 1042 have protruded shapes so that a space $S_3$ is formed between the upper insertion plate 1030 and the lower insertion plate 1040. The abutment plane between the back area 1032 and the back area 1042 defines a joint plane.

The joints 1054, 1055, and 1056 are formed by pierce welding. The pierce welding is preferable because of welding together the first sheet material located on the surface and the second sheet material located inside thereof to provide a good joint strength. Laser welding or electronic beam welding can be applied as the pierce welding.

Figure 21:
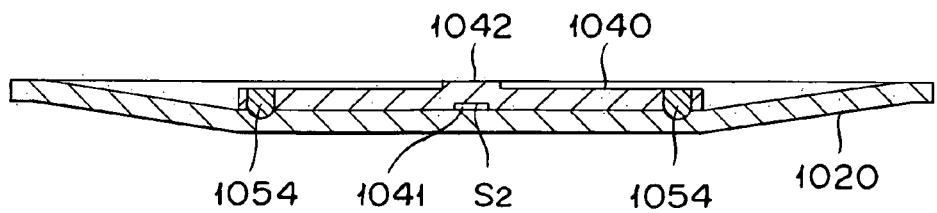
FIG. 21 is a cross-sectional view of assistance in explaining an example method of jointing reinforcement members in the preform showing the jointing process of the lower insertion plate to the bottom plate.
Figure 22:
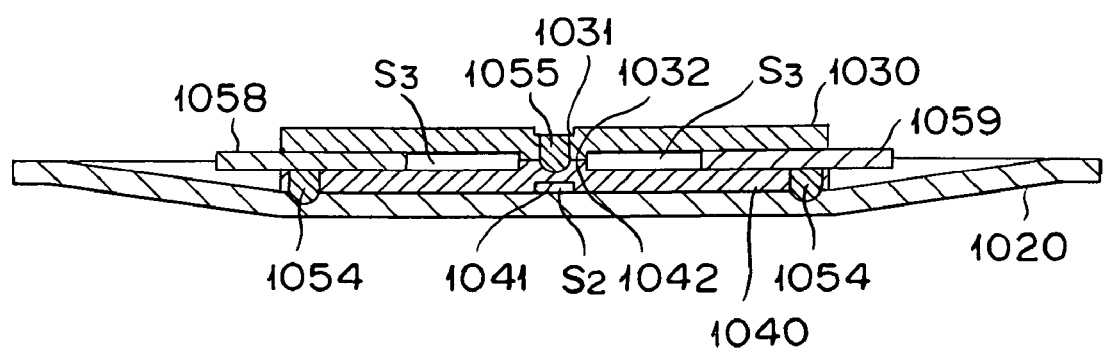
FIG. 22 is a cross-sectional view of assistance in explaining the jointing process of the upper insertion plate to the lower insertion plate following FIG. 21.
Figure 23:
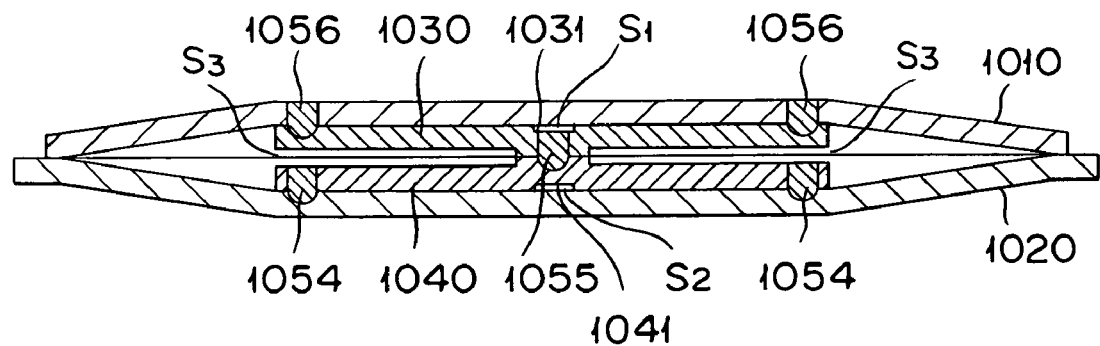
FIG. 23 is a cross-sectional view of assistance in explaining the jointing process of the top plate to the upper insertion plate following FIG. 22.

Next, an example of the method for jointing there inforcement members of the preform will be described. FIG. 21 is a cross-sectional view of assistance in explaining the jointing process of the lower insertion plate to the bottom plate, FIG. 22 is a cross-sectional view of assistance in explaining the jointing process of the upper insertion plate to the lower insertion plate following FIG. 21, and FIG. 23 is a cross-sectional view of assistance in explaining the jointing process of the top plate to the upper insertion plate following FIG. 22.

First, place the bottom plate 1020 at a specified position on the workbench (not shown), and then place the lower insertion plate 1040 so as to cause the recess 1041 to face the bottom plate 1020. Next, the end sections of the lower insertion plate 1040 are jointed to the bottom plate 1020 by pierce welding to form the joints 1054 (see FIG. 21).

Place the upper insertion plate 1030 on top of the lower insertion plate 1040 in such a way that the back area 1032 of the recess 1031 of the upper insertion plate 1030 abuts against the back area 1042 of the recess 1041 of the lower insertion plate 1040. Then joint the recess 1031 of the upper insertion plate 1030 to the back area 1042 of the recess 1041 of the lower insertion plate 1040 by pierce welding to form the joint 1055 (see FIG. 22).

Specifically, the joint 1055 is formed by welding the first sheet material as upper insertion plate 1030 located on the surface to the second sheet material as lower insertion plate 1040 located inside thereof while stacking more than three pieces of materials, i.e., the outer member as bottom plate 1020 and the sheet materials as upper insertion plate 1030 and lower insertion plate 1040 that constitute the reinforcement member.

The recess 1041 of the lower insertion plate 1040 forms the space $S_2$. In other words, the space $S_2$, which is aligned with the joint plane, is located between the second sheet material as lower insertion plate 1040 and the third sheet material as bottom plate 1020 located in the inside thereof during the welding. The space $S_2$ therefore prevents the transmission of welding heat and prevents inadvertent welding failure of the second sheet material as lower insertion plate 1040 to the third sheet material as bottom plate 1020, thus improving the welding yield.

The upper insertion plate 1030 is relatively unstable as it is supported only by the back area 1042 of the recess 1041 of the lower insertion plate 1040 via the back area 1032 of the recess 1031. Such an unstable condition can be averted by places wedging plates 1058, 1059 in the space $S_3$ formed between the upper insertion plate 1030 and the lower insertion plate 1040. The space $S_3$ has a function of absorbing any warping that may have developed due to jointing of the lower insertion plate 1040 and the bottom plate 1020, thus reducing poor welding results and improving the welding yield.

The wedging plates 1058, 1059 are removed and the top plate 1010 is overlapped when the forming of the joint 1055 is completed, allowing the edges of the top plate 1010 to meet with the edges of the bottom plate 1020. Next, joint the top plate 1010 to both end sections of the upper insertion plate 1030 by pierce welding to form the joint 1056 (see FIG. 23)

At this time, the space $S_3$ remains between the upper insertion plate 1030 and the lower insertion plate 1040. Specifically, the joint 1056 is formed by welding the first sheet material as top plate 1010 located on the surface to the second sheet material as upper insertion plate 1030 located inside thereof while stacking more than three pieces of materials, i.e., the outer member as top plate 1010 and bottom plate 1020 and the sheet materials as upper insertion plate 1030 and lower insertion plate 1040 that constitute the reinforcement member. The space $S_3$, which is aligned with the joint plane, is located between the second sheet material as upper insertion plate 1030 and the third sheet material as lower insertion plate 1040 located in the inside thereof.

The space $S_3$ therefore prevents the transmission of welding heat and prevents inadvertent welding failure of the second sheet material as upper insertion plate 1030 to the third sheet material as lower insertion plate 1040, thus improving the welding yield.

When the joint 1056 is completed, the overlapping edges of the top plate 1010 and the bottom plate 1020 are jointed to complete the preform 1050 (see FIG. 19).

As described above, the prevention of inadvertent welding failure during the production process of the preform 1050, it is possible to improve the welding yield and reduce the production cost. The use of the wedging plates 1058, 1059 placed in the space $S_3$ can be omitted depending on the situation.

Figure 24:
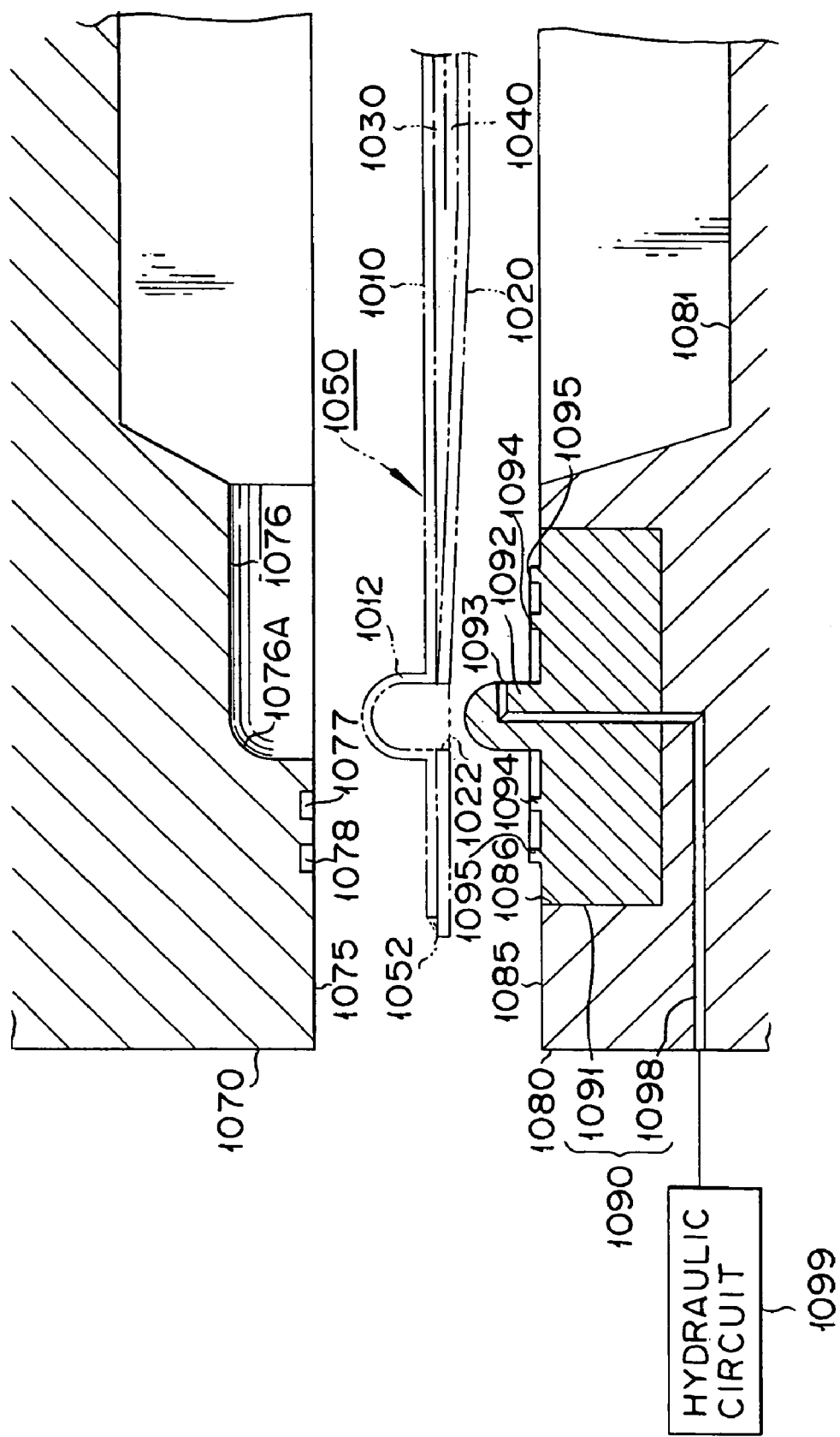
FIG. 24 is a cross-sectional view of assistance in explaining hydroforming apparatus according to the embodiment B1.
Figure 25:
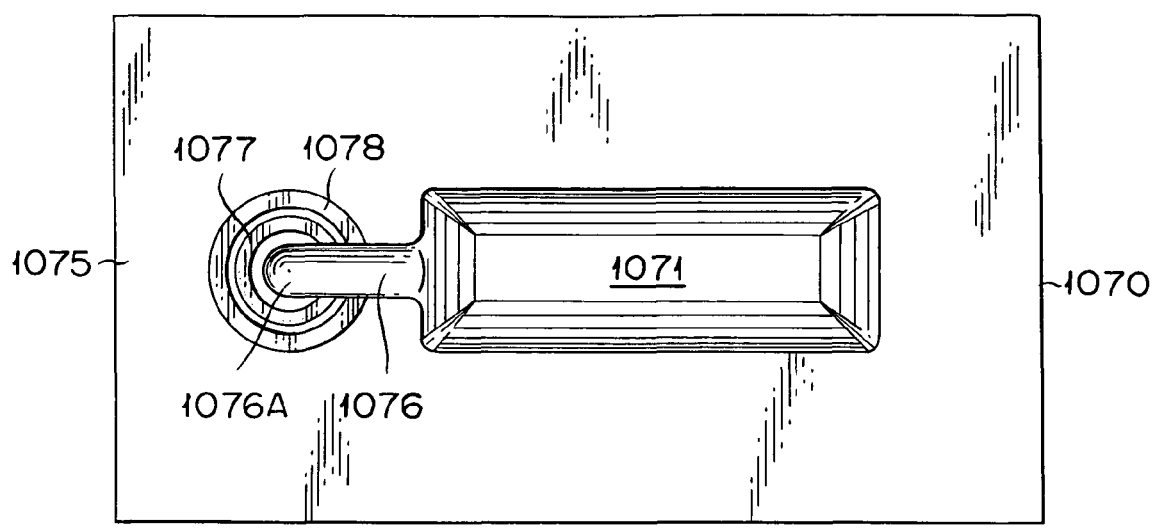
FIG. 25 is a plan view of assistance in explaining the top die for the hydroforming apparatus shown in FIG. 24.
Figure 26:
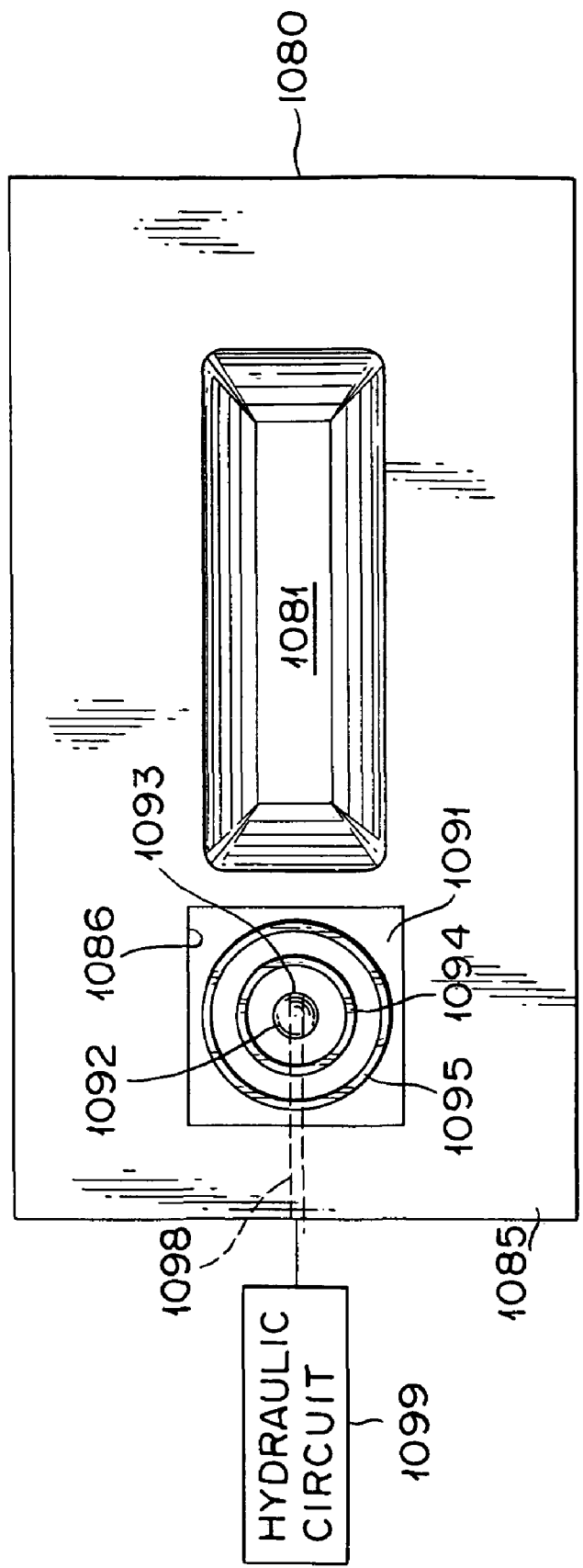
FIG. 26 is a plan view of assistance in explaining the bottom die for the hydroforming apparatus shown in FIG. 24.

FIG. 24 is a cross-sectional view of assistance in explaining hydroforming apparatus according to the embodiment B1, FIG. 25 is a plan view of assistance in explaining the top die for the hydroforming apparatus shown in FIG. 24, and FIG. 26 is a plan view of assistance in explaining the bottom die for the hydroforming apparatus shown in FIG. 24.

The hydroforming apparatus has forming dies of the top die 1070 and the bottom die 1080, and a hydraulic pressure supply mechanism 1090. The top die 1070 and the bottom die 1080 can be moved proximate to or apart from each other, and clamped with a preform 1050 being placed inside thereof.

The top die 1070 and the bottom die 1080 have cavity surfaces 1071, 1081 and pressing sections 1075, 1085. The cavity surfaces 1071, 1081 correspond to the outer surface s 1061, 1066 of the hydroformed product 1060 respectively. The pressing sections 1075, 1085 are portions to grip the outer periphery of the preform 1050 during the die clamping.

The pressing section 1075 of the top die 1070 includes a recess 1076 that extends from the cavity surface 1071, having arc-shaped grooves 1077, 1078 placed to surround an end section 1076A of the recess 1076. The end section 1076A has a cross-sectional shape that corresponds to the outer shape of the section obtained by vertically separating the dome-shaped part 1012 of the preform 1050 in two parts. The common center of the arc-shaped grooves 1077, 1078 coincides with the center of the end section 1076A. The pressing section 1085 of the bottom die 1080 has a substantially rectangular recess 1086 where a nozzle unit 1091 is to be placed.

The hydroforming apparatus further has a large spacer and a small spacer (not shown) placed between the pressing section 1075 of the top die 1070 and the pressing section 1085 of the bottom die 1080, so that the clamping of the top die 1070 and the bottom die 1080 can be implemented in two stages.

The thickness of the large spacer is designed to correspond with the thickness of a part of the preform 1050 where the joints 1054, 1056 are located, or the total thickness of the top plate 1010, the bottom plate 1020, the upper insertion plate 1030 and the lower insertion plate 1040. The thickness of the small spacer is designed to correspond with the thickness of an edge of the preform 1050 where the joints 1052, 1056 are located, or the total thickness of the top plate 1010 and the bottom plate 1020.

The hydraulic pressure supply mechanism 1090 is, for example, connected to a pressure generating device having a booster cylinder and a forming medium source, and has a flow path 1098 and a nozzle unit 1091 that are connected to a hydraulic circuit 1099. The flow path 1098 extends through the inside of the bottom die 1080 and reaches the nozzle unit 1091. The forming medium is typically water.

The nozzle unit 1091 has a dome-shaped part 1092 that corresponds to the inside of the dome-shaped part 1012 of the preform 1050, and annular protrusions 1094, 1095 disposed to surround the dome-shaped part 1092. The annular protrusions 1094, 1095 are matched in positions with the arc-shaped grooves 1077, 1078 of the pressing section 1075 of the top die 1070.

The sizes of the annular protrusions 1094, 1095 are smaller than the arc-shaped grooves 1077, 1078 in size and are selected in consideration of the thickness of the sheet material 1010, 1020. The arc-shaped grooves 1077, 1078 as well as annular protrusions 1094, 1095 can be omitted if necessary.

The dome-shaped part 1092 can pass freely through the opening 1022 of the sheet material 1020 and has an injection port 1093 that communicates with the flow path 1098. When the nozzle unit 1091 is inserted into the opening 1022 and placed inside the dome-shaped part 1012 of the preform 1050, the forming medium supplied from the hydraulic circuit 1099 is introduced inside the preform 1050 via the nozzle part 1091 and the opening 1022. As a result, the forming medium applies a hydraulic pressure to the inside of the preform 1050 and causes an inflating deformation of the preform 1050.

Figure 27:
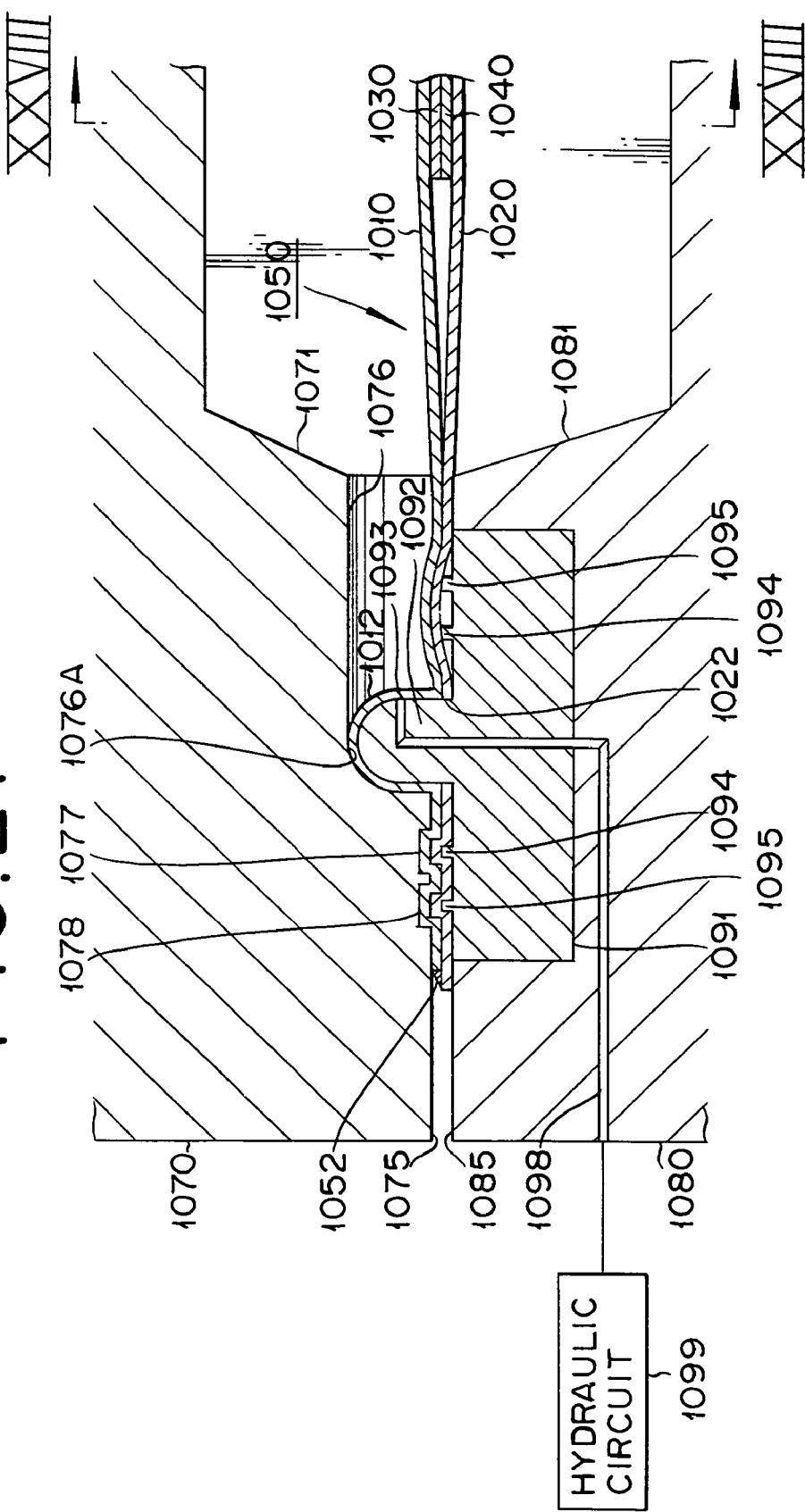
FIG. 27 is a cross-sectional view of assistance in explaining a hydroforming method according to the embodiment B1 showing a die clamping stage.
Figure 30:
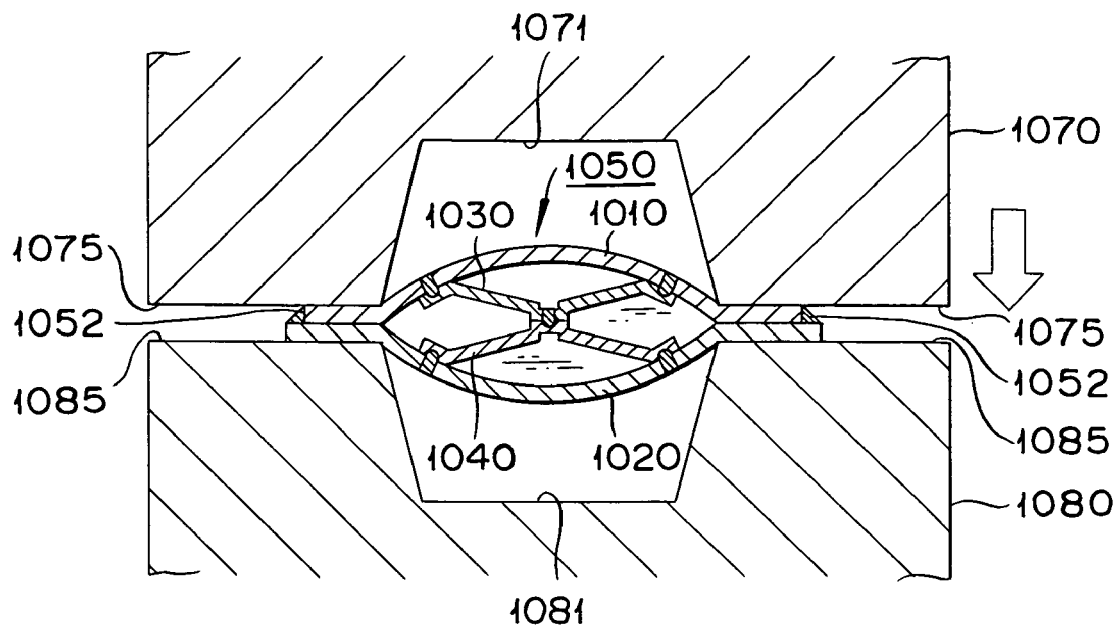
FIG. 30 is a cross-sectional view of assistance in explaining a die clamping stage continued from FIG. 29.
Figure 31:
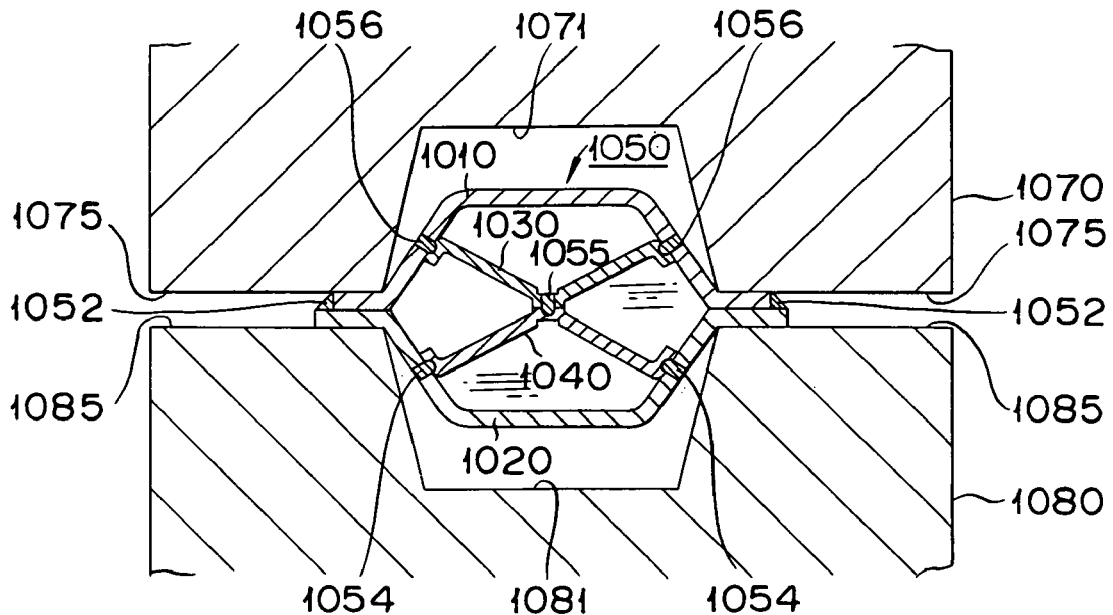
FIG. 31 is a cross-sectional view of assistance in explaining an intermediate stage of forming continued from FIG. 30.
Figure 32:
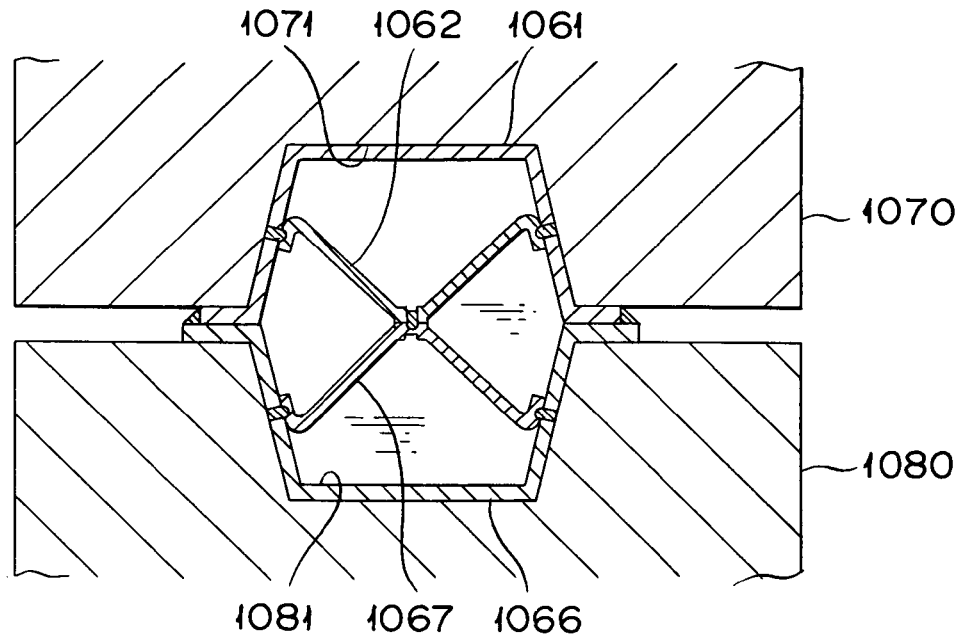
FIG. 32 is a cross-sectional view of assistance in explaining a latter stage of forming continued from FIG. 31.

Next, the hydroforming method according to the embodiment B1 will be described. FIG. 27 is a cross-sectional view of assistance in explaining a die clamping stage, FIG. 28 is a cross-sectional view taken on line XXVIII-XXVIII of the view in FIG. 27, FIG. 29 is a cross-sectional view of assistance in explaining an initial stage of forming continued from FIG. 28, FIG. 30 is a cross-sectional view of assistance in explaining a die clamping stage continued from FIG. 29, FIG. 31 is a cross-sectional view of assistance in explaining an intermediate stage of forming continued from FIG. 30, and FIG. 32 is a cross-sectional view of assistance in explaining a latter stage of forming continued from FIG. 31.

First, the preform 1050 is placed on the bottom die 1080. At this time, the bottom plate 1020 that is to constitute the outer surface 1066 of the hydroformed product 1060 is disposed in such a way to face the cavity surface 1081, and align the opening 1022 of the sheet material 1020 with the dome-shaped part 1092 of the nozzle unit 1091 of the hydraulic pressure supply mechanism 1090.

After that, the top die 1070, which has been in a standby position, comes down to approach the bottom die 1080 to complete the clamping of the top die 1070 and the bottom die 1080 (see FIG. 27 and FIG. 28). At this time, the top plate 1010, which is to constitute the outer surface 1061 of the hydroformed product 1060, is disposed in such a way as to face the cavity surface 1071, and the dome-shaped part 1012 of the sheet material 1010 is fitted to the end section 1076A of the recess 1076 located in the pressing section 1075 of the top die 1070.

The vicinity of the dome-shaped part 1012 is gripped by the arc-shaped grooves 1077, 1078 in the pressing section 1075 of the top die 1070 and the annular protrusions 1094, 1095 in the nozzle unit 1091 placed in the recess 1086 of the bottom die 1080. This generates an annularly deformed area in the vicinity of the dome-shaped part 1012, which provides an improved sealability against the forming medium being introduced.

The joints 1052, 1054, and 1056 of the preform 1050 are disposed to the pressing sections 1075, 1085, which are positioned a prescribed clearance apart from each other by the large spacer (not shown).

The hydraulic pressure supply mechanism 1090 introduces a forming medium supplied from the hydraulic circuit 1099 into the inside of the preform 1050 via the opening 1022 of the nozzle unit 1091 to apply a hydraulic pressure. As a result, the preform 1050 causes its inflating deformation, bringing the edges of the preform 1050 closer toward the cavity surfaces 1071, 1081 and causing material flows.

As the joints 1054, 1056 of the preform 1050 move into the internal forming space surrounded by the cavity surfaces 1071, 1081 (see FIG. 29), the large spacer placed between the pressing section 1075 of the top die 1070 and the pressing section 1085 of the bottom die 1080 are replaced with the small spacer. The top die 1070 comes down further in correspondence with the thickness of the small spacer to clamp the dies, securing a specified clearance corresponding to the thickness of the edges of the preform 1050 (see FIG. 30).

As the supply of the forming medium continues, the upper insertion plate 1030 and the lower insertion plate 1040 jointed to the top plate 1010 and the bottom plate 1020, which are causing inflating deformation, are stretched under a tension so that it expands linearly without becoming unstable (FIG. 31).

Moreover, the root sections of the upper insertion plate 1030 and the lower insertion plate 1040 bend in an L-shape because of the existence of the joints 1054, 1056 limiting the radii of curvatures in the bends small. Furthermore, the upper insertion plate 1030 and the lower insertion plate 1040 pull each other via the joint 1055, the applied force remains balance so the shapes of the root sections of the upper insertion plate 1030 and the lower insertion plate 1040 become substantially similar.

When the inner pressure of the preform 1050 reaches its final pressure, the supply of the forming medium is stopped and held for a prescribed time to complete the inflation process of the preform 1050. Specifically, the top plate 1010 and the bottom plate 1020 form the outer surface s 1061, 1066 of the hydroformed product 1060, the upper insertion plate 1030 and the lower insertion plate 1040 form the reinforcement ribs 1062, 1067 of the hydroformed product 1060 (see FIG. 32). Next, the top die 1070 is raised after removing the hydraulic pressure, the hydroformed products is taken out, and trimming including cutting is performed.

As can be seen from the above, the embodiment B1 makes it possible to reduce the manufacturing cost of a preform by improving the welding yield or provide a preform with an excellent manufacturing cost. It is also capable of or obtaining a hydroformed product from the preform with an excellent manufacturing cost, or providing a hydroforming method for obtaining a hydroformed product with an excellent manufacturing cost.

Moreover, although it was shown to provide the hydraulic pressure by injecting the forming medium through the opening formed in one of the outer members, the embodiment B1 is capable of applying various other types of preforms and hydroforming apparatuses without being limited to the aforementioned particular style.

For example, the opening 1022 of the bottom plate 1020 and the nozzle unit 1091 of the hydraulic pressure supply mechanism 1090 can both be provided more than one. It is also possible to perform the die clamping only once by disposing the joints 1054, 1056 of the preform 1050 in the internal forming space surrounded by the cavity surfaces 1071, 1081 from the start.

Figure 33:
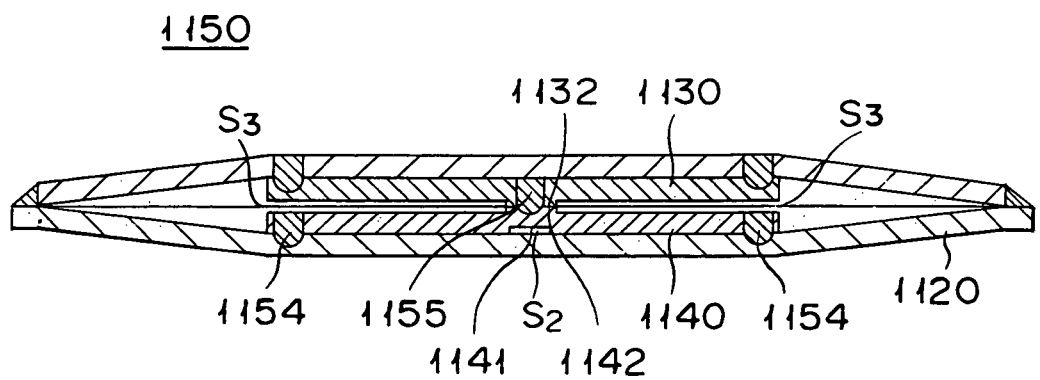
FIG. 33 is a cross-sectional view of assistance in explaining a preform according to the embodiment B2.

FIG. 33 is a cross-sectional view of assistance in explaining a preform according to the embodiment B2. Those members that have the identical functions as those in the embodiment B1 will be denoted with the identical reference numerals hereinafter in order to avoid duplicating their descriptions. A preform 1150 according to the embodiment B2 is generally different from the preform 1050 according to the embodiment B1 in that the shapes of the upper insertion plate and the lower insertion plate do not coincide with each other.

More specifically, the upper insertion plate 1130 of the preform 1150 is substantially flat while the lower insertion plate 1140 has a recess 1141 located substantially in the middle of both end sections. The lower insertion plate 1140 is so disposed as to make the recess 1141 to face against the bottom plate 1120, both ends of the lower insertion plate 1140 are connected to the bottom plate 1120 via a joint 1154, and the recess 1141 forms a gap $S_2$ between it and the bottom plate 1120.

A back area 1142 of the recess 1141 of the upper insertion plate 1140 is connected to the upper insertion plate 1130 via a joint 1155. The reference numeral 1132 denotes the back area of the upper insertion plate 1130 that abuts against the back area 1142 of the recess 1141 of the lower insertion plate 1140, and the abutment plane of the back area 1132 and the back area 1142 define the joint plane. The back area 1142 has a protruded shape so that a gap $S_3$ is formed between the upper insertion plate 1130 and the lower insertion plate 1140.

As described above, the recess 1141 is formed only on the lower insertion plate 1140, so that the shape of the vicinity of the joint 1155 is not vertically symmetric. On the other hand, the upper insertion plate 1130 and the lower insertion plate 1140 experience a bending condition due to a compression load (see FIG. 29).

At this time, the side of the joint 1155 where the recess 1141 is located is more easily bent, so that it is possible to maintain the direction of the initial bending always the same and the location of the joint 1155 always substantially in the middle, different from the case of the preform 1050 according to the embodiment B1. In other words, it is possible to avoid the reinforcement rib from resulting in a distorted shape in the hydroforming due to the difference in the inflation amount.

As can be seen from the above, it is possible to improve the shape quality or accuracy of the reinforcement ribs that divide the hollow cross section of the hydroformed product in the embodiment B2 further than in the embodiment B1.

Figure 34:
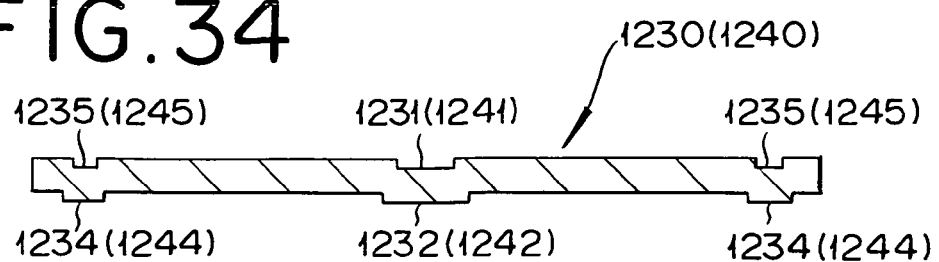
FIG. 34 is a cross-sectional view of assistance in explaining the lower insertion plate and the upper insertion plate that constitute reinforcement members according to the embodiment B3.

FIG. 34 is a cross-sectional view of assistance in explaining the lower insertion plate and the upper insertion plate that constitute a reinforcement member according to the embodiment B3. The preform according to the embodiment B3 is generally different from the preform 1050 according to the embodiment B1 in that protrusions are formed on both the upper insertion plate and the lower insertion plate.

Protrusions 1234, 1244 in the embodiment B3 are disposed across back areas 1232, 1242 of recesses 1231, 1241 in the vicinities of the end sections respectively. Each of the protrusions 1234, 1244 is formed in a bent shape having a substantially flat summit part, and can be formed by a press forming process, for example. Reference numerals 1235, 1245 denote recess-shaped back areas of the protrusions 1234, 1244.

The protrusions 1234, 1244 are located to abut against each other and the height of the protrusions 1234, 1244 is chosen to match the height of the back areas 1232, 1242 of the recesses 1231, 1241.

As a result, when the upper insertion plate 1230 is laid on the lower insertion plate 1240 aligning the back area 1232 of the upper insertion plate 1230 with the back area 1242 of the lower insertion plate 1240, the protrusion 1234 and the back area 1232 of the recess 1231 of the upper insertion plate 1230 abut against the protrusion 1244 and the back area 1242 of the recess 1241 of the lower insertion plate 1240, respectively. The space $S_3$ formed between the upper insertion plate 1230 and the lower insertion plate 1240 matches the total of the heights of the back areas 1232, 1242.

Figure 35:
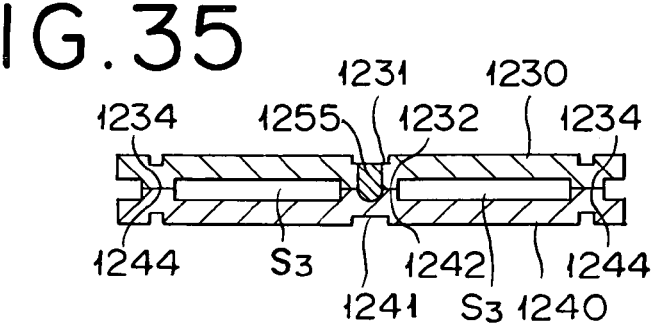
FIG. 35 is a cross-sectional view of assistance in explaining an example method of jointing reinforcement members shown in FIG. 34 showing the jointing process of the upper insertion plate to the lower insertion plate.
Figure 36:
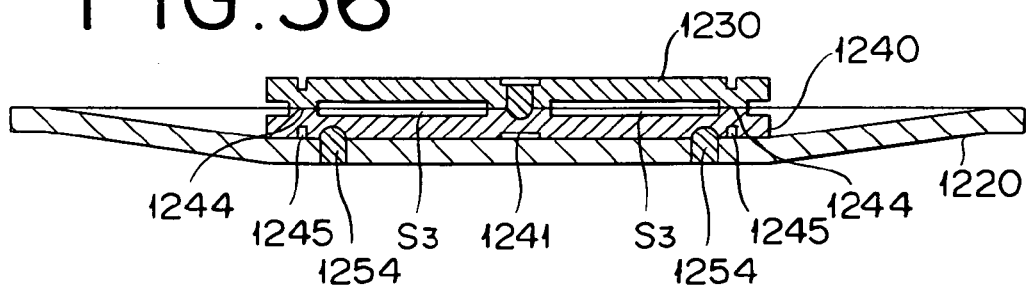
FIG. 36 is a cross-sectional view of assistance in explaining the jointing process of the lower insertion plate to the bottom plate following FIG. 35.
Figure 37:
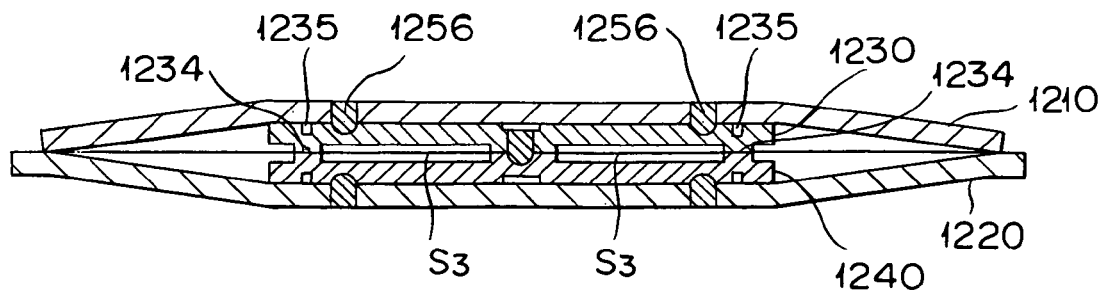
FIG. 37 is a cross-sectional view of assistance in explaining the jointing process of the top plate to the upper insertion plate following FIG. 36.
Figure 38:
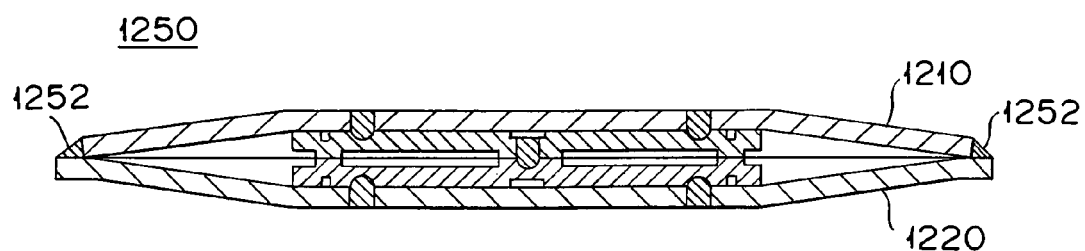
FIG. 38 is a cross-sectional view of assistance in explaining the jointing process of the top plate to the bottom plate following FIG. 37.

Next, an example of the method for jointing the reinforcement members shown in FIG. 34 will be described. FIG. 35 is a cross-sectional view of assistance in explaining the jointing process of the upper insertion plate to the lower insertion plate, FIG. 36 is a cross-sectional view of assistance in explaining the jointing process of the upper insertion plate to the bottom plate following FIG. 35, FIG. 37 is a cross-sectional view of assistance in explaining the jointing process of the top plate to the upper insertion plate following FIG. 36, and FIG. 38 is a cross-sectional view of assistance in explaining the jointing process of the top plate to the bottom plate following FIG. 37.

First, overlap the upper insertion plate 1230 on the lower insertion plate 1240 disposed at a specified position on the workbench (not shown), and then cause the protrusions 1234 and the back area 1232 of the recesses 1231 of the upper insertion plate 1230 to abut against the protrusion 1244 and the back area 1242 of the recess 1241 of the lower insertion plate 1240. Then, joint the recess 1231 of the upper insertion plate 1230 to the back area 1242 of the recess 1241 of the lower insertion plate 1240 by pierce welding to form the joint 1255 (see FIG. 35).

Different from the case of the embodiment B1 wherein it is supported in one place, the upper insertion plate 1230 is stable as it is supported by three locations in total, i.e. the protrusions 1244 and the back area 1242 of the recess 1241 of the lower insertion plate 1240 via the protrusions 1234 and the back area 1232 of the recess 1231. Therefore, it is unnecessary to use the wedging plates 1058, 1059 which are otherwise required to cancel the instability, so that it can reduce the production man-hour related to the wedging plates 1058, 1059 and provide a better productivity.

Thereafter, the jointed assembly of the upper insertion plate 1230 and the lower insertion plate 1240 is disposed in such a way that the recess of the lower insertion plate 1240 faces the bottom plate 1220, which is disposed at a predetermined location of the workbench (not shown). Next, joint the bottom plate 1220 to both ends of the lower insertion plate 1240 by pierce welding to form the joint 1254 (see FIG. 36). The welding locations are in the vicinities of the protrusions 1244 and back areas 1245.

Specifically, the joint 1254 is formed by welding the first sheet material as bottom plate 1220 located on the surface to the second sheet material as lower insertion plate 1240 located inside thereof while stacking more than three pieces of materials, i.e., the outer member as bottom plate 1220 and the sheet materials as upper insertion plate 1230 and lower insertion plate 1240 that constitute the reinforcement member.

On the other hand, the space $S_3$ is formed between the upper insertion plate 1230 and the lower insertion plate 1240 by abutting the protrusions 1234, 1244 as well as the back areas 1232, 1242 of the recesses 1231, 1241. The space $S_3$ therefore prevents the transmission of welding heat and prevents inadvertent welding failure of the second sheet material as lower insertion plate 1240 to the third sheet material as upper insertion plate 1230, thus improving the welding yield.

When the formation of the joint 1254 is completed, the top plate 1210 is laid matching the edges of the top plate 1210 with the edges of the bottom plate 1220. Next, joint the top plate 1210 to both ends of the upper insertion plate 1230 by pierce welding to form the joint 1256 (see FIG. 37). The welding locations are in the vicinities of the protrusions 1234 and back areas 1235, and the space $S_3$ exists between the upper insertion plate 1230 and the lower insertion plate 1240.

Specifically, the joint 1256 is formed by welding the first sheet material as top plate 1210 located on the surface to the second sheet material as upper insertion plate 1230 located inside thereof while stacking more than three pieces of materials, i.e., the outer member as top plate 1210 and bottom plate 1220 and the sheet materials as upper insertion plate 1230 and lower insertion plate 1240 that constitute the reinforcement member. The space $S_3$, which is aligned with the joint surface, is located between the second sheet material as upper insertion plate 1230 and the third sheet material as lower insertion plate 1240 located in the inside thereof.

The space $S_3$ therefore prevents the transmission of welding heat and prevents inadvertent welding failure of the second sheet material as upper insertion plate 1230 to the third sheet material as lower insertion plate 1240, thus improving the welding yield.

When the jointed section 1256 is completed, the overlapping edges of the top plate 1210 and the bottom plate 1220 are jointed to complete the preform 1250 (see FIG. 38). The reference numeral 1252 denotes the joints formed on the edges.

As can be seen from the above, the embodiment B3 makes it possible to improve the productivity in comparison with the embodiment B1 and the embodiment B2.

The heights of the protrusions 1234, 1244 do not have to be identical. For example, the heights of the protrusions 1234, 1244 can be arbitrarily chosen so long as the sum of the heights of the protrusions 1234, 1244 matches with the sum of the back areas 1232 and 1242 of the recesses 1231, 1241. It is also possible to form protrusions only on the upper insertion plate 1230 or the lower insertion plate 1240. In this case, the height of the protrusion should coincide with the sum of the heights of the back areas 1232, 1242 of the recessed sections 1231 and 1241.

Figure 39:
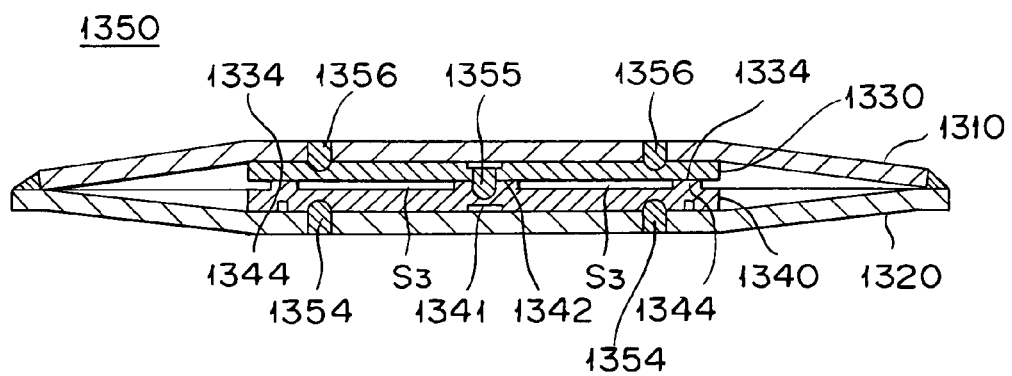
FIG. 39 is a cross-sectional view of assistance in explaining reinforcement members according to the embodiment B4.

FIG. 39 is a cross-sectional view of assistance in explaining reinforcement members according to the embodiment B4. A preform 1350 according to the embodiment B4 is generally different from the preform 1250 according to the embodiment B3 concerning the shape of the upper insertion plate.

More specifically, the upper insertion plate 1330 is substantially flat, having neither recesses nor protrusions, while the lower insertion plate 1340 has a recess 1341 and protrusions 1344. The upper insertion plate 1330 is stable as it is supported by total of three locations, i.e. the back area 1342 of the recess 1341 and the protrusions 1344 of the lower insertion plate 1340. As a consequence, this embodiment is capable of reducing the production man-hour and providing a better productivity as in the embodiment B3.

Moreover, the space $S_3$ is formed between the upper insertion plate 1330 and the lower insertion plate 1340 by abutting of the upper insertion plate 1330 against the back areas 1342 of the recesses 1341 and the protrusions 1344. Therefore, if the jointed assembly of the upper insertion plate 1330 and the lower insertion plate 1340 with the joint 1355 is disposed on the bottom plate 1320 in such a way as to form the joints 1354 in the vicinities of the protrusions 1344 and back areas 1345, the space $S_3$ prevents the transmission of welding heat as in the case of the embodiment B3, thus preventing inadvertent welding failure between the lower insertion plate 1340 and the upper insertion plate 1330, and improves the welding yield.

Furthermore, if the top plate 1310 is disposed on the upper insertion plate 1330 in such a way as to form the joints 1356 in the vicinities of the protrusions 1334 that abuts against the protrudes parts 1344 after the joint 1354 is formed, the space $S_3$ prevents the transmission of welding heat as in the case of the embodiment B3, thus preventing inadvertent welding failure between the upper insertion plate 1330 and the lower insertion plate 1340, and improves the welding yield.

On the other hand, the recess 1341 is formed only on the lower insertion plate 1340 in the preform 1350, so that the shape of the vicinities of the joint 1355 is not vertically symmetric as in the case of the embodiment B2. Therefore, the side of the joint 1355 on which the recess 1341 is located is more likely to bend when hydroforming is applied, so that the initial bending direction becomes always the same and so it becomes possible to keep the location of the joint 1355 substantially in the middle more securely. In other words, it is possible to avoid the reinforcement rib from resulting in a distorted shape in the hydroforming due to the difference in the inflation amount.

As can be seen from the above, it is possible to improve the shape quality or accuracy of the reinforcement ribs that divide the hollow cross section of the hydroformed product in the embodiment B4 further than in the embodiment B3.

The protrusion does not have to be formed on the lower insertion plate 1340, but also can be provided on the upper insertion plate 1330. It is also possible to form protrusions on both the lower insertion plate 1340 and the upper insertion plate 1330. In this case, it is necessary to make the total height of the protrusion substantially equal to the height of the back area 1342 of the recess 1341 of the lower insertion plate 1340.

Figure 40:
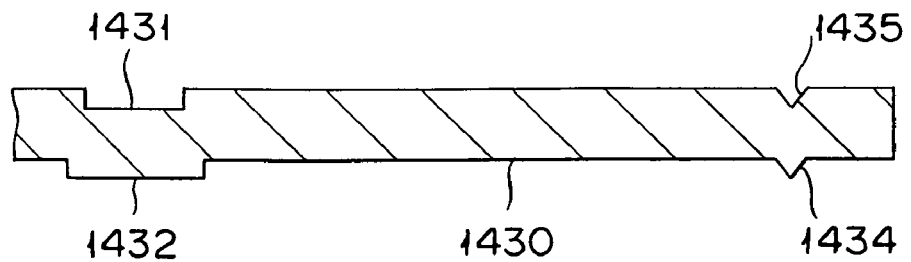
FIG. 40 is a cross-sectional view of assistance in explaining the upper insertion plate that constitutes one of the reinforcement members according to the embodiment B5.
Figure 41:
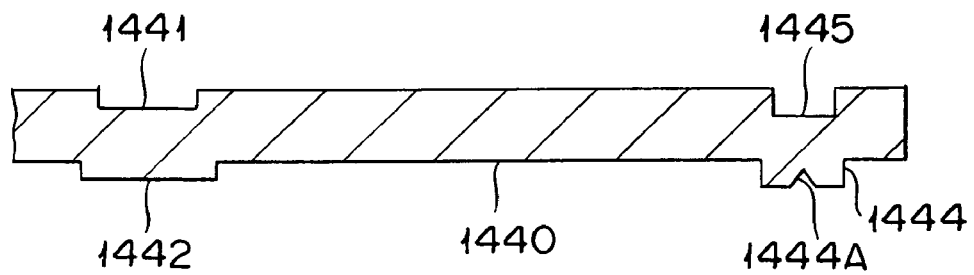
FIG. 41 is a cross-sectional view of assistance in explaining the lower insertion plate that constitutes the other of the reinforcement members according to the embodiment B5.
Figure 42:
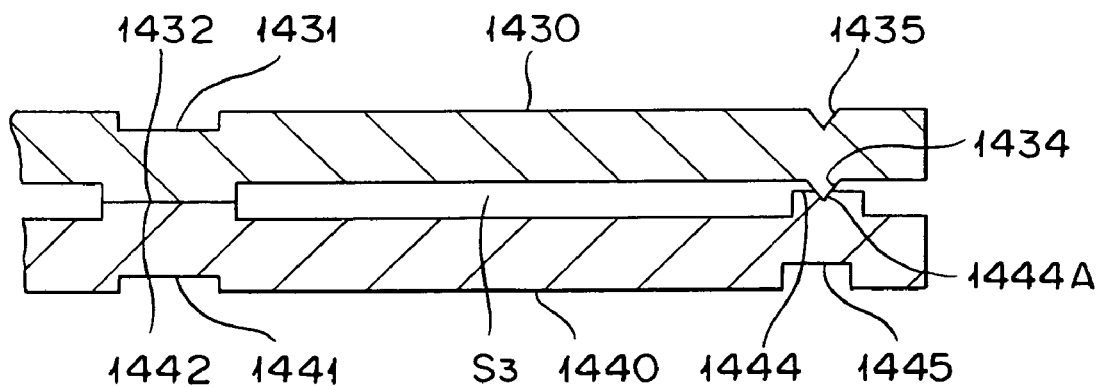
FIG. 42 is a cross-sectional view of assistance in explaining a fitting structure between the upper insertion plate of FIG. 40 and the lower insertion plate of FIG. 41.

FIG. 40 is a cross-sectional view of assistance in explaining the upper insertion plate that constitutes one of reinforcement members according to the embodiment B5, FIG. 41 is a cross-sectional view of assistance in explaining the lower insertion plate that constitutes the other of reinforcement members according to the embodiment B5, and FIG. 42 is a cross-sectional view of assistance in explaining a fitting structure between the upper insertion plate of FIG. 40 and the lower insertion plate of FIG. 41.

The preform according to the embodiment B5 is generally different from the preform 1250 according to the embodiment B3 concerning the shape of the upper insertion plate and the lower insertion plate. More specifically, the upper insertion plate 1430 according to the embodiment B5 has protrusions 1434 disposed across a back area 1432 of a recess 1431. The protrusions 1434 are formed substantially in a V-shape and are located in the vicinity of each end of the upper insertion plate 1430.

On the other hand, the lower insertion plate 1440 has receiving parts 1444 disposed across a back area 1442 of a recess 1441. Each receiving part 1444 includes a protrusion formed by a press forming process, for example, and is positioned to fit properly with each protrusion 1434 of the upper insertion plate 1430. The receiving part 1444 has a summit part on which a dent 1444A that fits properly with the protrusion 1434 of the upper insertion plate 1430. A reference numeral 1445 denotes the recessed back portion of the receiving section 1444.

A space $S_3$ which is formed between the lower insertion plate 1440 and the upper insertion plate 1430 when the receiving part 1444 of the lower insertion plate 1440 fits with the protrusion 1434 of the upper insertion plate 1430, matches with the sum of the height of the back area 1432 of the recess 1431 of the upper insertion plate 1430 and the height of the back area 1442 of the recess 1441 of the lower insertion plate 1440.

When the upper insertion plate 1430 is laid over the lower insertion plate 1440, the protrusion 1434 of the upper insertion plate 1430 fits with the receiving part 1444 of the lower insertion plate 1440 in a specified position. In other words, the protrusion 1434 and the receiving part 1444 can function as the positioning mechanism of the upper insertion plate 1430 for the lower insertion plate 1440.

Therefore, when jointing the recess 1431 of the upper insertion plate 1430 to the back area 1442 of the recess 1441 of the lower insertion plate 1440 by pierce welding to form joints (FIG. 35), the overlapping of the upper insertion plate 1430 to the lower insertion plate 1440 can be easily and quickly done.

As can be seen from the above, the embodiment B5 makes it possible to improve the productivity in comparison with the embodiment B3.

It is also possible to dispose the receiving part 1444 on the upper insertion plate 1430 and dispose the protrusion 1434 to the lower insertion plate 1440.

The positioning mechanism by means of the protrusion 1434 and the receiving part 1444 can be applied to the embodiment B2 as well. For example, the overlapping of the upper insertion plate 1130 on the lower insertion plate 1140 can be easily and speedily done by disposing the protrusion 1434 on the upper insertion plate 1130 and disposing the receiving part 1444 on the lower insertion plate 1140.

In particularly, the space $S_3$ formed between the lower insertion plate 1140 and the upper insertion plate 1130 by fitting the receiving part 1444 of the lower insertion plate 1140 to the protrusion 1434 of the upper insertion plate 1130 should match with the height of the back area 1142 of the recess 1141 of the lower insertion plate 1140 in this case. It is also possible to dispose the receiving part 1444 on the upper insertion plate 1130 and dispose the protrusion 1434 to the lower insertion plate 1140.

Figure 43:
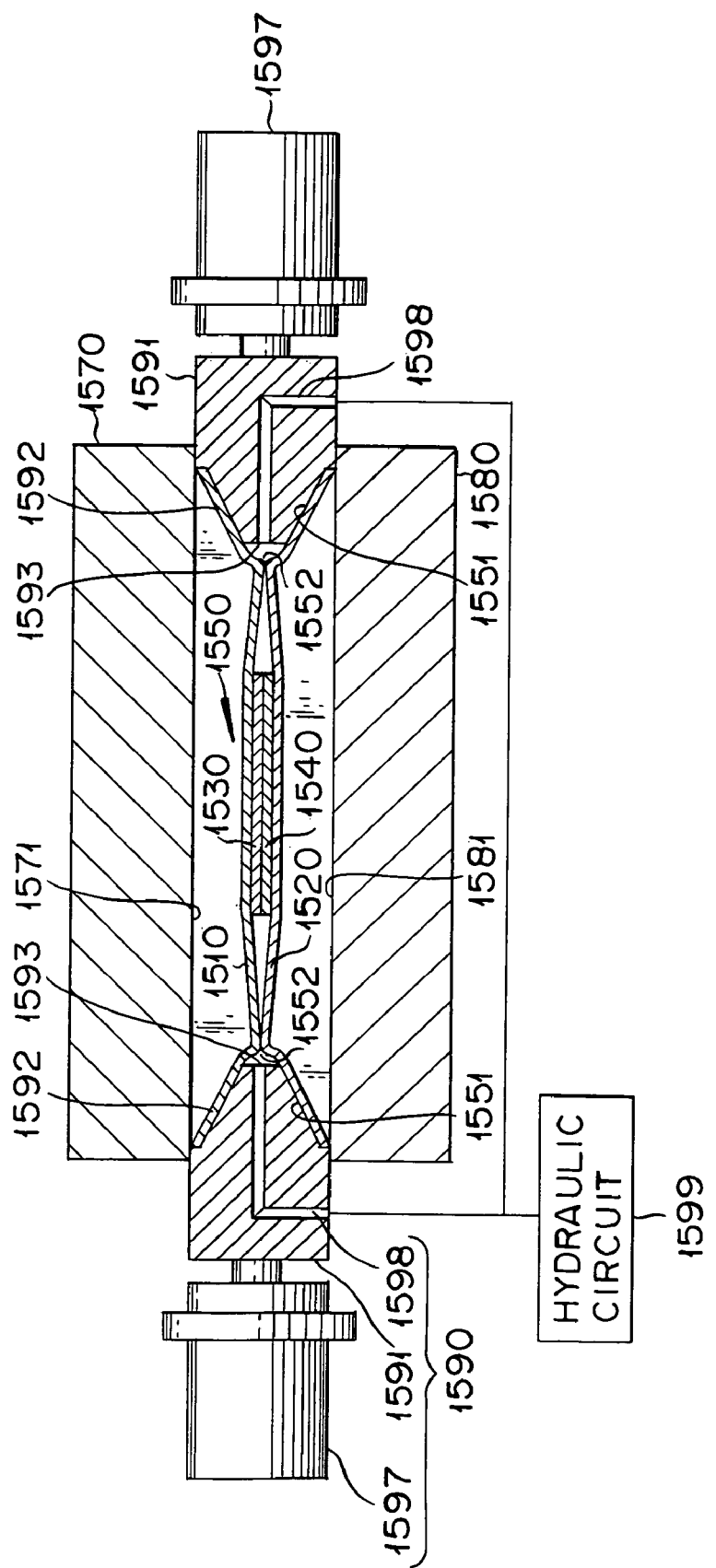
FIG. 43 is a cross-sectional view of assistance in explaining an embodiment B6.

FIG. 43 is a cross-sectional view of assistance in explaining an embodiment B6. The embodiment B6 is generally different from the embodiment B1 concerning the shape of the preform and the constitution of the hydroforming apparatus.

More specifically, a preform 1550 concerning the embodiment B6 has the top plate 1510 and the bottom plate 1520 that are to form an outer surface of a hydroformed product, the upper insertion plate 1530 and the lower insertion plate 1540 that are to form reinforcing ribs, and an inner end 1552 for providing a hydraulic pressure by means of introducing forming medium. The upper insertion plate 1530 and the lower insertion plate 1540 are disposed inside of the top plate 1510 and the bottom plate 1520.

The inner end 1552 is constituted of an abutment plane of the end faces of the top plate 1510 and the bottom plate 1520, said abutment plane being preformed in substantially conical shapes. The inner end 1552 is communicating with the inside of the preform 1550 and has an outer end provided with a circular opening. In other words, the preform 1550 has an opening formed by the abutment plane of the end face of one of the outer members 1510 and the other outer members 1520. The inner end 1552 is not limited to a shape being disposed throughout the end face but can be partially disposed.

The top plate 1510 is disposed to face a cavity surface 1571 of the top die 1570. The bottom plate 1520 is disposed to face a cavity surface 1581 of the bottom die 1580. The cavity surfaces 1571 and 1581 correspond to the outer surface of the hydroformed product.

A hydraulic pressure supply mechanism 1590 has a flow path 1598 that communicates with a hydraulic circuit 1599, an axial press punch 1591, and an axial press cylinder 1597. The axial press punch 1591 is located on each side of the top die 1570 and the bottom die 1580 and is connected to the axial press cylinder 1597. The axial press punch 1591 has a nozzle unit 1592.

The nozzle unit 1592 has an injection port 1593 that communicates with the flow path 1598, and presents a substantially conical shape that corresponds with the shape of the inner end 1552. The axial press cylinder 1597 supports the axial press punch 1591 to move towards or away from the dies of the top die 1570 and the bottom die 1580. The power source of the axial press cylinder 1597 is typically hydraulic or pneumatic pressure.

The inner end 1552 of the preform 1550 expands when the nozzle unit 1592 is pushed into its opening, while its expanded diameter is restricted by the top die 1570 and the bottom die 1580. As a consequence, the inner end 1552 makes a close contact with the nozzle unit 1592 securing a sealing effect.

The injection port 1593 of the nozzle unit 1592 is aligned with the inner end 1552 that communicates with the inside of the preform 1550. As a consequence, when the forming medium supplied from the hydraulic circuit 1599 is introduced to the flow path 1598 and the injection port 1593, the forming medium is injected into the inside of the preform 1550 via the inner end 1552.

Consequently, the hydraulic pressure supply mechanism 1590 applies a hydraulic pressure to the inside of the preform 1550 to cause an inflating deformation.

As can be seen from the above, the embodiment B6 can form the outer surface s of a hydroformed product and reinforcement ribs that divide the hollow cross section of the hydroformed product by means of hydraulic pressure by introducing a forming medium into an opening created by an abutment plane between the end face of one of the outer members and the end face of the other outer member.

Incidentally, in the embodiments B1 through B6, depending on the intended hydroformed product, it is possible to modify as needed the shapes of the top plate and the bottom plate as sheet materials that constitute the outer members, the upper insertion plate and the lower insertion plate as sheet materials that constitute the reinforcement members, locations of the recesses, the locations of the sheet materials that constitute the reinforcement members of the preform, etc.

It is also possible to form reinforcing ribs that evenly divide the hollow cross section of the hydroformed product in substantially vertical direction as well as in substantially horizontal direction by disposing and jointing the upper insertion plate and the lower insertion plate in an offset manner. Moreover, it is possible to have reinforcing ribs that unevenly divide the hollow cross section of the hydroformed product by using the upper insertion plate and the lower insertion plate with different shapes.

Figure 44:
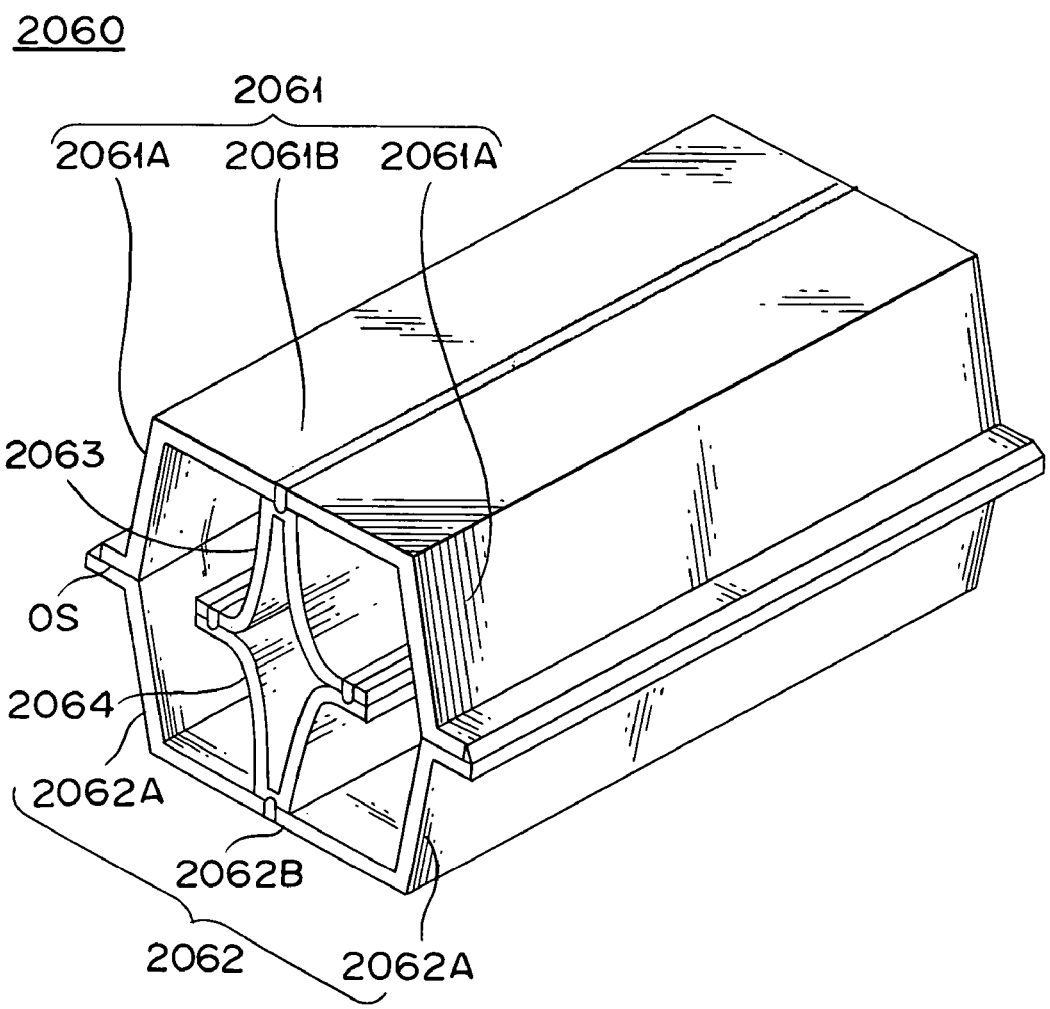
FIG. 44 is a perspective view of assistance in explaining a hydroformed product according to an embodiment C1.
Figure 45:
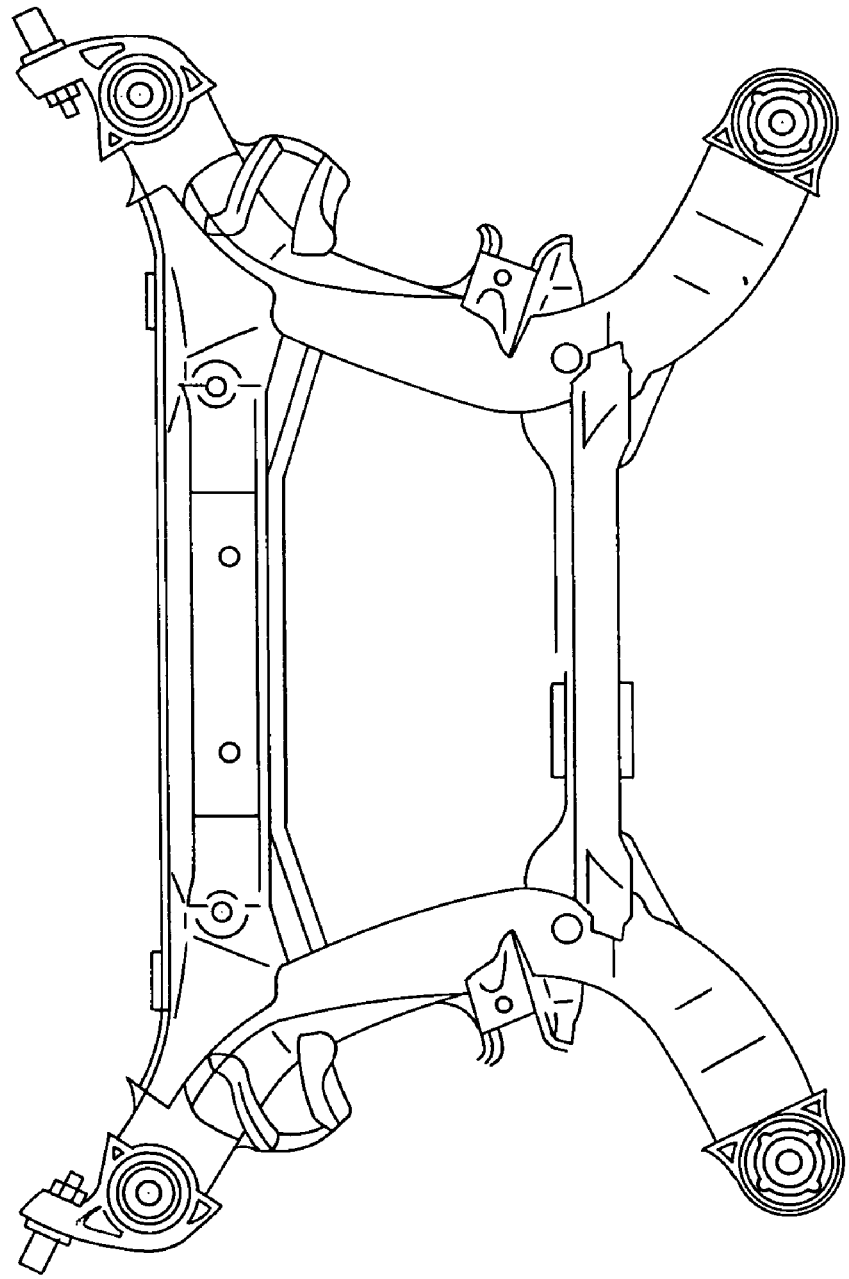
FIG. 45 is a plan view of assistance in explaining an automobile part to which the hydroformed product shown in FIG. 44 is applied.

FIG. 44 is a perspective view of assistance in explaining a hydroformed product according to an embodiment C1 and FIG. 45 is a plan view of assistance in explaining an automobile part to which the hydroformed product shown in FIG. 44 is applied.

A hydroformed product 2060 has outer members 2061, 2062 and reinforcement ribs 2063, 2064 forming a hollow structure, and is applied to automobile parts that require lighter weight and high rigidity, such as a side member of a suspension part 2065 and a cross member. The hydroformed product 2060 can also be applied to pillar parts, axle parts, or body side parts.

Outer surfaces 2061, 2062 have sidewalls 2061A, 2062A that are inclined relative to an overlapping surface OS and summit parts 2061B, 2062B that are surrounded by the sidewalls 2061A, 2062A. The reinforcement ribs 2063, 2064 divide the hollow cross sections of the outer surface s 2061, 2062 and support the top and bottom, or the summit parts 2061B, 2062B. The reinforcement ribs 2063, 2064 improve the rigidity in the direction perpendicular or vertical to the overlapping surface OS. Both ends of the reinforcement ribs 2063, 2064 are jointed together and have no joint with the outer surface s 2061, 2062.

Figure 48:
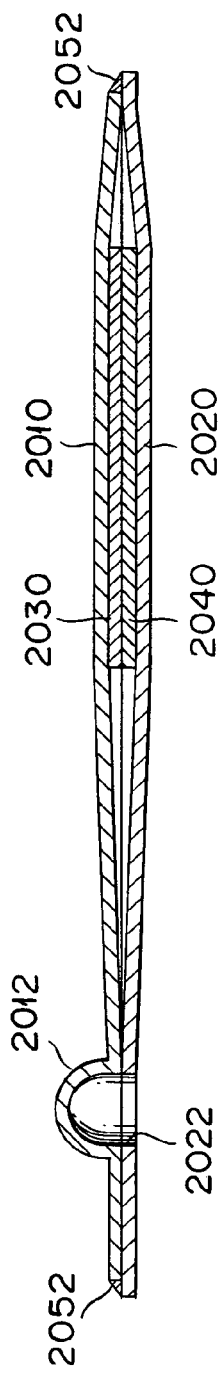
FIG. 48 is a cross-sectional view taken online XLVIII-XLVIII of the view in FIG. 46.
Figure 49:
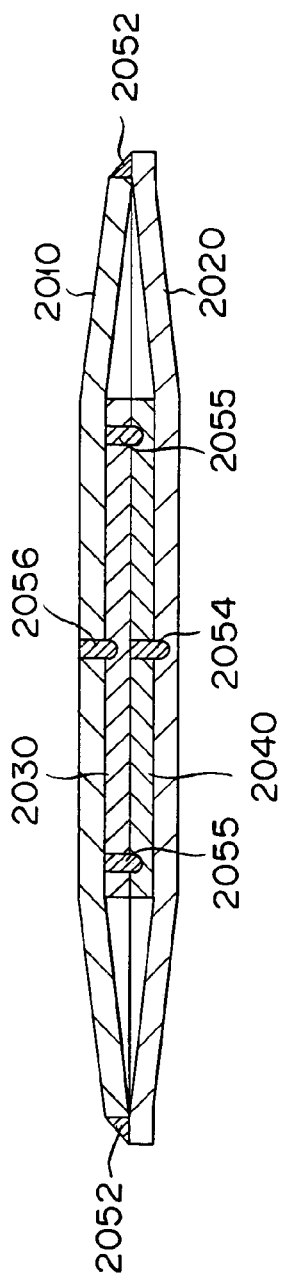
FIG. 49 is a cross-sectional view taken on line XLIX-XLIX of the view in FIG. 46.

FIG. 46 is a plan view of assistance in explaining a preform according to the embodiment C1, FIG. 47 is a rear elevation of the preform shown in FIG. 46, FIG. 48 is a cross-sectional view taken on line XLVIII-XLVIII of the preform shown in FIG. 46, and FIG. 49 is a cross-sectional view taken on line XLIX-XLIX of the view in FIG. 46.

The preform 2050 has outer members and reinforcement members. The outer members are to form the outer surface s 2061, 2062 of the hydroforming product 2060. The reinforcement members are to form the reinforcement ribs 2063, 2064 of the hydroforming product 2060.

The sheet materials that constitute the outer members include the top plate 2010 as first outer member and the bottom plate 2020 as second outer member, and their overlapping edge has a joint 2052 formed by fillet welding. The method of forming the joint 2052 can be anything that securely provides good sealing and does not affect hydraulic forming capability, for example, laser welding, arc welding, or gluing.

The sheet materials that constitute the reinforcement members include the upper insertion plate 2030 as first enforcement member and the lower insertion plate 2040 as second reinforcement member having substantially same shapes and are disposed inside the top plate 2010 and the bottom plate 2020 overlapping on each other. The raw material of the sheet material that constitute the outer members and the reinforcement members are not specified but can be cold rolled steel sheet or hot rolled mild steel sheet.

The top plate 2010 that forms the outer surface 2061 of the hydroformed products 2060 have an intermediate part 2015 and end sections 2011, 2016 located across the intermediate part 2015. A peripheral area 2015A and a middle area 2015B of the intermediate part 2015 form a sidewall 2061A and a summit part 2061B of the outer surface 2061. A dome-shaped part 2012 is formed on the end section 2011.

The bottom plate 2020 that is to form the outer surface 2062 of the hydroformed products 2060 is slightly larger than the top plate 2010 in size and is similar to the top plate 2010 in shape, and has an intermediate part 2025 that corresponds to the intermediate part 2015 of the top plate 2010 and end sections 2021 and 2026 that correspond to the end sections 2011, 2016 of the top plate 2010. A peripheral area 2025A and a middle area 2025B of the intermediate part 2025 form a sidewall 2062A and a summit part 2062B of the outer surface 2062. The end section 2021 has an opening 2022 that coincides with the position of the dome-shaped part 2012.

The upper insertion plate 2030 and the lower insertion plate 2040 are substantially flat and no forming for bending is required, so that no cost increase due to additional processes accompanies the preform manufacturing.

The lower insertion plate 2040 is disposed in such a way as to face the bottom plate 2020, and is connected to the bottom plate 2020 via a joint 2054. The joint 2054 is located at the middle area 2025B of the bottom plate 2020 which is to form the summit part 2062B for the outer surface 2062 of the hydroformed product 2060.

The upper insertion plate 2030 is disposed in such a way as to face the lower insertion plate 2040 and is connected to the lower insertion plate 2040 via joints 2055 provided at both ends. The top plate 2010 is disposed in such a way as to face the upper insertion plate 2030, and is connected to the upper insertion plate 2030 via a joint 2056. The joint 2056 is located at the middle area 2015B of the bottom plate 2010 which is to form the summit part 2061B for the outer surface 2061 of the hydroformed product 2060.

The upper insertion plate 2030 and the lower insertion plate 2040 are jointed to the middle areas 2015B, 2025B of the top plate 2010 and the bottom plate 2020 that are to form the summit parts 2061B, 2062B for the outer surface s 2061, 2062 of the hydroformed product 2060. As a result, the hydroformed product obtained from the preform 2050 will have the reinforcing ribs 2063, 2064 supporting the summit parts 2061B, 2062B and can improve the rigidity in the direction perpendicular or vertical to the overlapping surface OS.

The joints 2054, 2055, and 2056 are formed by pierce welding. The pierce welding is preferable because of welding together the first sheet material located on the surface and the second sheet material located inside thereof to provide a good joint strength. Laser welding or electronic beam welding can be applied as the pierce welding. Also, the method of forming the joints 2054, 2055 and 2056 can be anything that securely provides good jointing strength and does not affect hydroforming capability, for example, laser welding, arc welding, or gluing.

Figure 50:
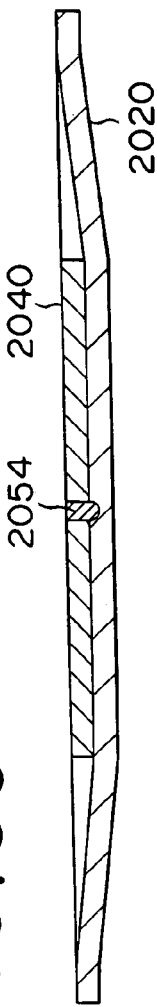
FIG. 50 is a cross-sectional view of assistance in explaining an example method of jointing the lower insertion plate and the upper insertion plate that constitute reinforcement members of the preform shown in FIG. 46 showing the jointing process of the lower insertion plate to the bottom plate.

Next, an example of the method for jointing the reinforcement members of the preform will be described. FIG. 50 is a cross-sectional view of assistance in explaining the jointing process of the lower insertion plate to the bottom plate, FIG. 51 is a cross-sectional view of assistance in explaining the jointing process of the upper insertion plate to the lower insertion plate following FIG. 50, and FIG. 52 is a cross-sectional view of assistance in explaining the jointing process of the top plate to the upper insertion plate following FIG. 51.

First, the lower insertion plate 2040 is laid on the bottom plate 2020 disposed in a specified location. Next, joint the middle area of the lower insertion plate 2040 to the middle area 2025B of the bottom plate 2020 by pierce welding to form the joint 2054 (see FIG. 50).

Figure 51:
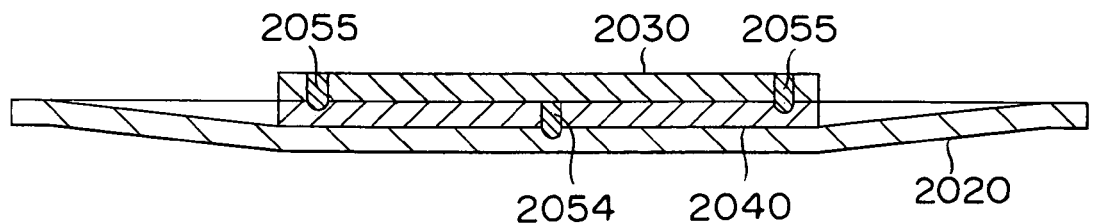
FIG. 51 is a cross-sectional view of assistance in explaining the jointing process of the upper insertion plate to the lower insertion plate following FIG. 50.

After that, the upper insertion plate 2030 is laid on the lower insertion plate 2040 in such a way to have each end section of the upper insertion plate 2030 aligned with each end section of the lower insertion plate 2040, and the end sections are jointed together respectively by a pierce welding process to form the joints 2055 (FIG. 51).

Figure 52:
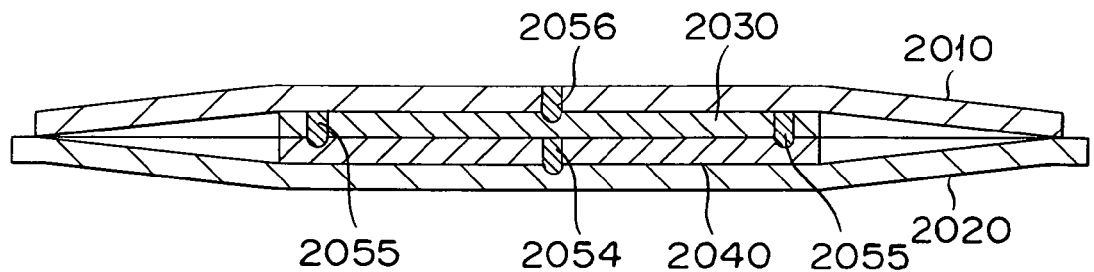
FIG. 52 is a cross-sectional view of assistance in explaining the jointing process of the top plate to the upper insertion plate following FIG. 51.

When the formation of the joints 2055 is completed, the top plate 2010 is laid on the upper insertion plate 2030 and the middle area 2015B of the top plate 2010 is jointed to the upper insertion plate 2030 by pierce welding to form the joint 2056 (FIG. 52). After that, the overlapped edges of the top plate 2010 and the bottom plate 2020 are jointed to complete the preform 2050 (FIG. 49).

As described above, the reinforcement members as upper insertion plate 2030 and lower insertion plate 2040 for forming the reinforcement ribs are jointed to the middle area of the first and second outer members as top plate 2010 and bottom plate 2020 that are to form the summit parts on the outer surface of the hydroformed product. As a result, the hydroformed product obtained from the preform 2050 will have the reinforcing ribs supporting the summit parts, thus enhancing their rigidity in the direction perpendicular or vertical to the overlapping surface of the first and second outer members. These reinforcement members are substantially flat and no forming for bending is required, so that no cost increase due to additional processes accompanies the preform manufacturing.

Figure 53:
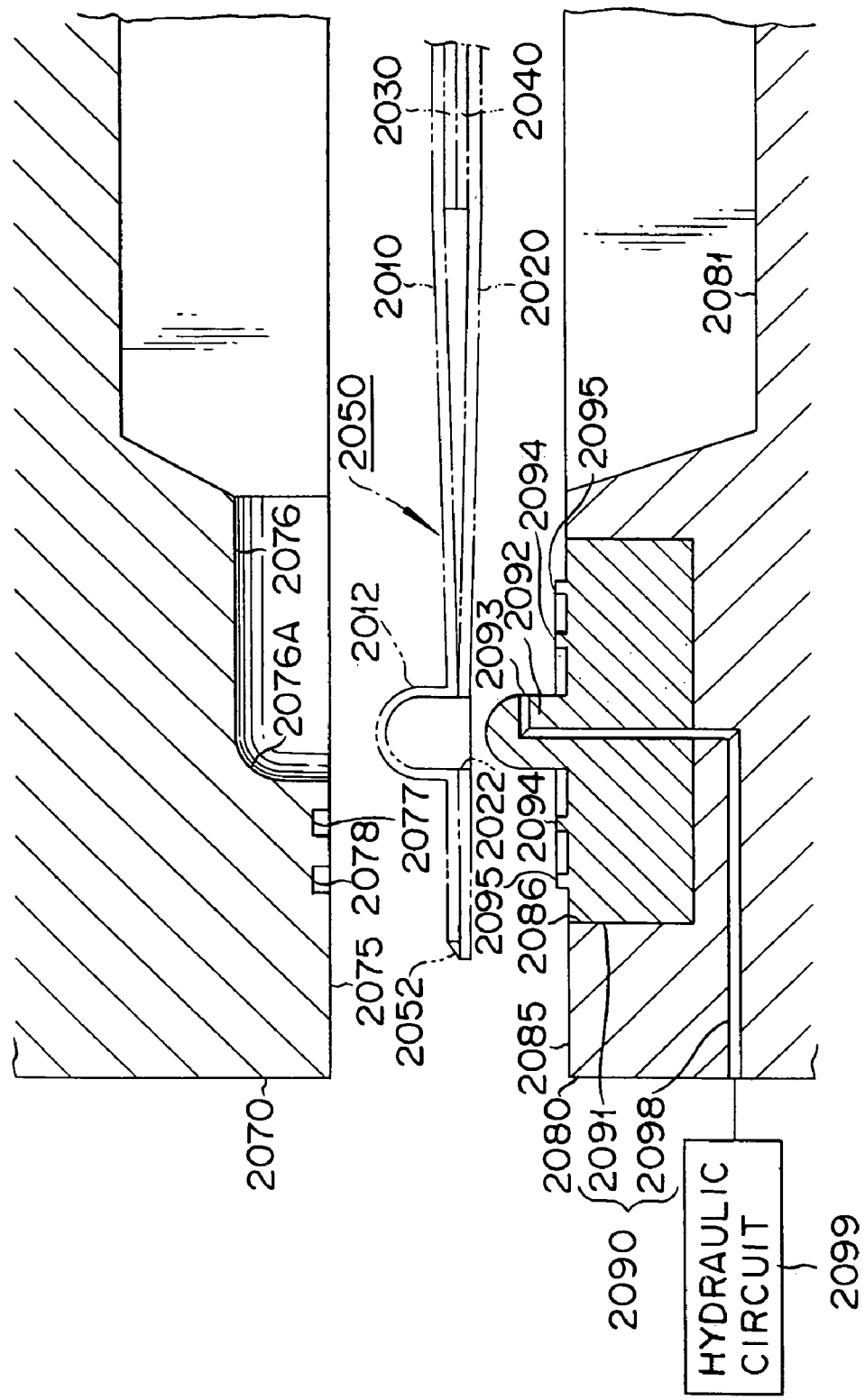
FIG. 53 is a cross-sectional view of assistance in explaining hydroforming apparatus according to the embodiment B1.
Figure 54:
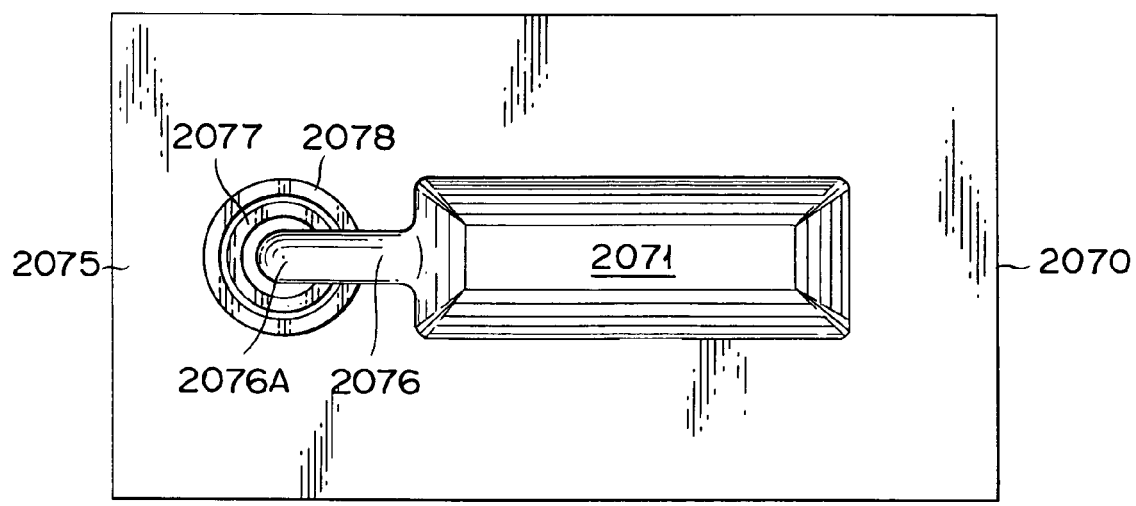
FIG. 54 is a plan view of assistance in explaining the top die for the hydroforming apparatus shown in FIG. 53.
Figure 55:
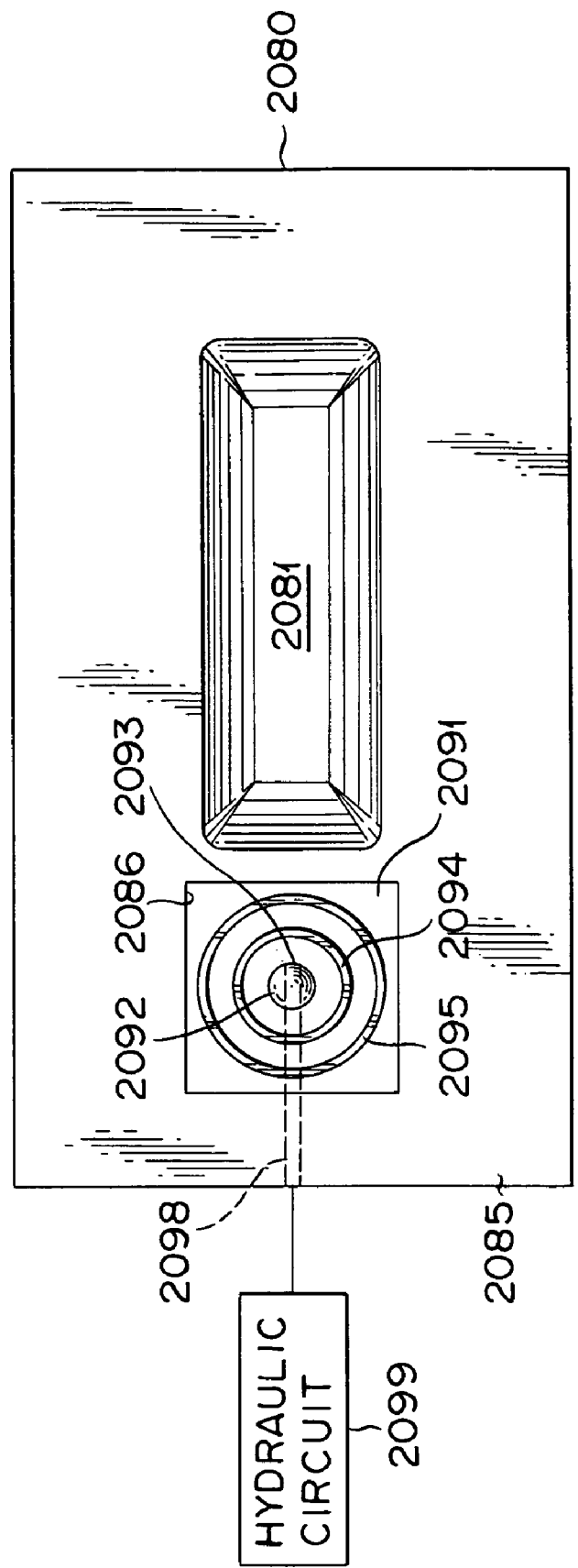
FIG. 55 is a plan view of assistance in explaining the bottom die for the hydroforming apparatus shown in FIG. 53.

FIG. 53 is a cross-sectional view of assistance in explaining a hydroforming apparatus according to the embodiment C1, FIG. 54 is a plan view of assistance in explaining the top die for the hydroforming apparatus shown in FIG. 53, and FIG. 55 is a plan view of assistance in explaining the bottom die for the hydroforming apparatus shown in FIG. 53.

The hydroforming apparatus has forming dies of the top die 2070 and the bottom die 2080, and a hydraulic pressure supply mechanism 2090. The top die 2070 and the bottom die 2080 can be moved proximate to or apart from each other, and clamped with a preform 2050 being placed inside thereof.

The top die 2070 and the bottom die 2080 have cavity surfaces 2071, 2081 and pressing sections 2075, 2085. The cavity surfaces 2071, 2081 correspond to the outer surface shapes of the hydroformed product 2060, having sidewalls and summit parts, i.e. top or bottom surfaces corresponding to the sidewalls 2061A, 2062A and summit parts 2061B, 2062B on the outer surface s 2061, 2062 of the hydroformed product 2060. The pressing sections 2075, 2085 grip the outer periphery of the preform 2050 during the die clamping.

The pressing section 2075 of the top die 2070 includes a recess 2076 that extends from the cavity surface 2071, having arc-shaped grooves 2077, 2078 placed to surround an end section 2076A of the recess 2076. The end section 2076A has a cross-sectional shape that corresponds to the outer shape of the section obtained by vertically separating the dome-shaped part 2012 of the preform 2050 in two parts. The common center of the arc-shaped grooves 2077, 2078 coincides with the center of the end section 2076A. The pressing section 2085 of the bottom die 2080 has a substantially rectangular recess 2086 where a nozzle unit 2091 is to be placed.

The hydroforming apparatus further has a large spacer and a small spacer (not shown) placed between the pressing section 2075 of the top die 2070 and the pressing section 2085 of the bottom die 2080, so that the die clamping of the top die 2070 and the bottom die 2080 can be implemented in two stages.

The thickness of the large spacer is designed to correspond with the thickness of a part of the preform 2050 where the joints 2054, 2055 and 2056 are located, or with the total thickness of the top plate 2010, the bottom plate 2020, the upper insertion plate 2030 and the lower insertion plate 2040. The thickness of the small spacer is designed to correspond with the thickness of an edge of the preform 2050 where the joint 2052 is located, or with the total thickness of the top plate 2010 and the bottom plate 2020.

The hydraulic pressure supply mechanism 2090 is connected to a pressure generating device having a booster cylinder and a forming medium source, and has a flow path 2098 and a nozzle unit 2091 that are connected to a hydraulic circuit 2099. The flow path 2098 extends through the inside of the bottom die 2080 and reaches the nozzle unit 2091. The forming medium is typically water.

The nozzle unit 2091 has a dome-shaped part 2092 that corresponds to the inside of the dome-shaped part 2012 of the preform 2050, and annular protrusions 2094, 2095 disposed to surround the dome-shaped part 2092. The annular protrusions 2094, 2095 are matched in positions with the arc-shaped grooves 2077, 2078 of the pressing section 2075 of the top die 2077. The sizes of the annular protrusions 2094, 2095 are smaller than the arc-shaped grooves 2077, 2078 in size and are selected in consideration of the thickness of the sheet material 2010 and 2020. The arc-shaped grooves 2077, 2078 as well as annular protrusions 2094, 2095 can be omitted if necessary.

The dome-shaped part 2092 can pass freely through the opening 2022 of the sheet material 2020 and has an injection port 2093 that communicates with the flow path 2098. When the nozzle unit 2091 is inserted into the opening 2022 and placed inside the dome-shaped part 2012 of the preform 2050, the forming medium supplied from the hydraulic circuit 2099 is introduced inside the preform 2050 via the nozzle part 2091 and the opening 2022. As a result, the forming medium applies a hydraulic pressure to the inside of the preform 2050 and causes an inflating deformation of the preform 2050.

Figure 56:
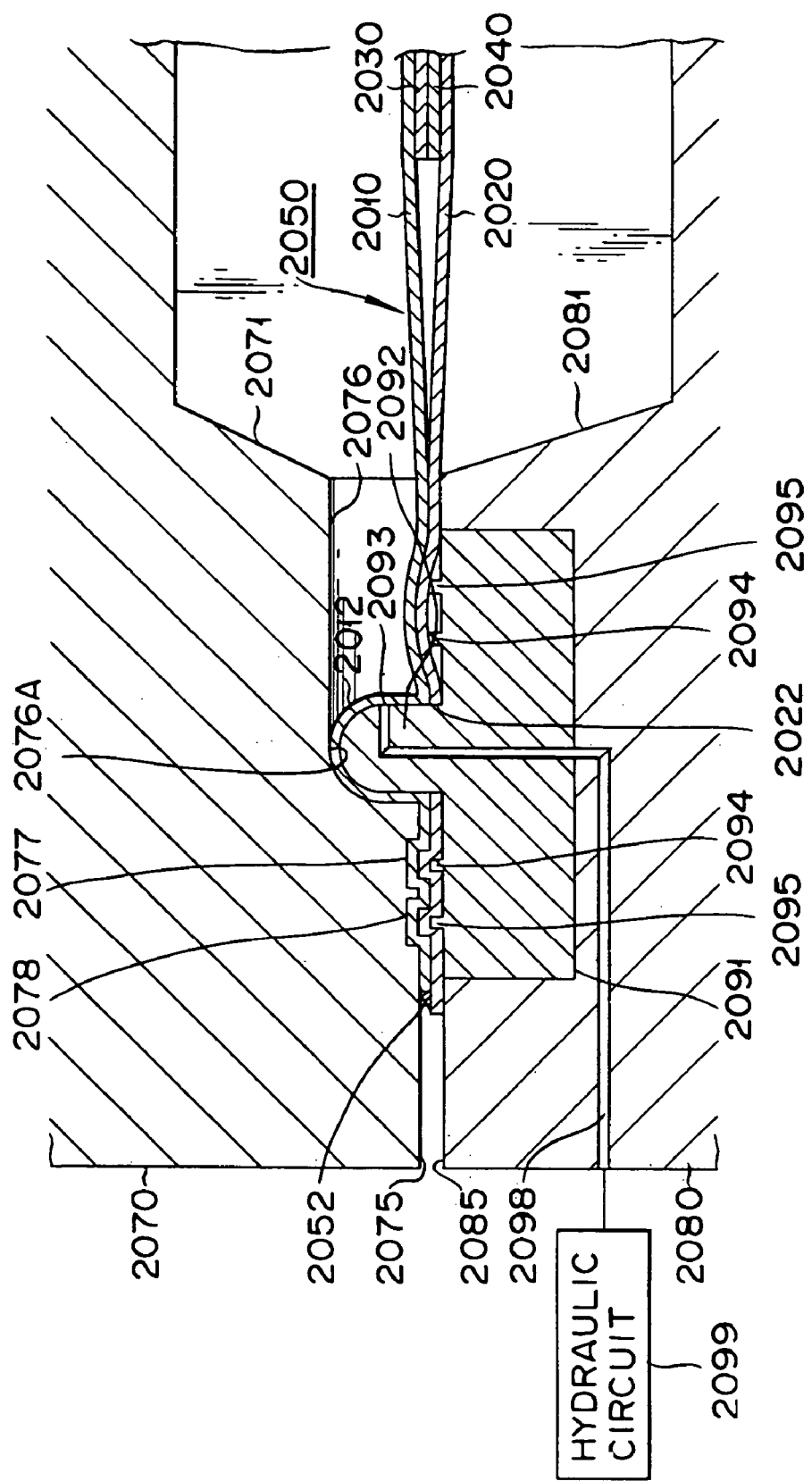
FIG. 56 is a cross-sectional view of assistance in explaining a hydroforming method according to the embodiment C1 showing a die clamping stage.
Figure 58:
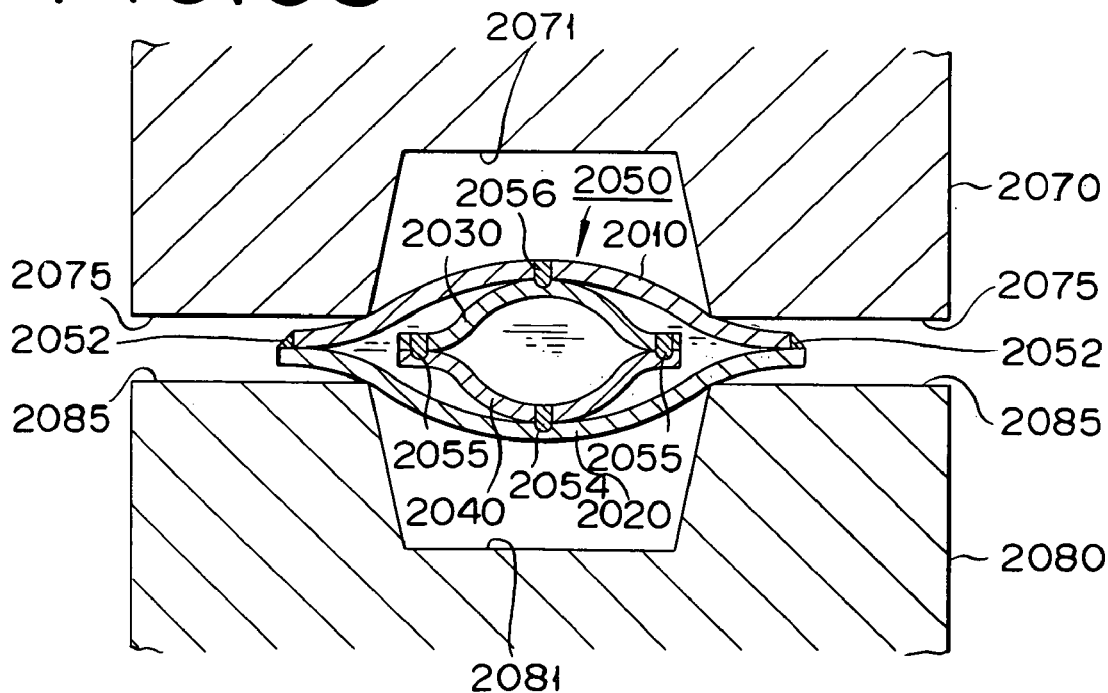
FIG. 58 is a cross-sectional view of assistance in explaining an initial stage of forming continued from FIG. 57.
Figure 59:
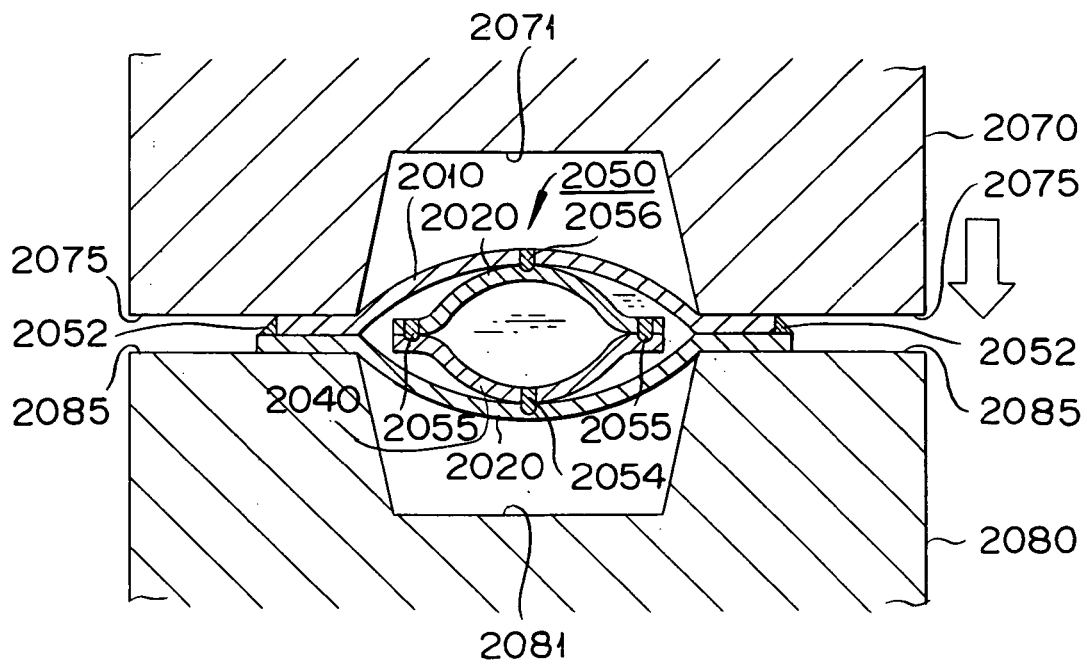
FIG. 59 is a cross-sectional view of assistance in explaining a die clamping stage continued from FIG. 58.
Figure 60:
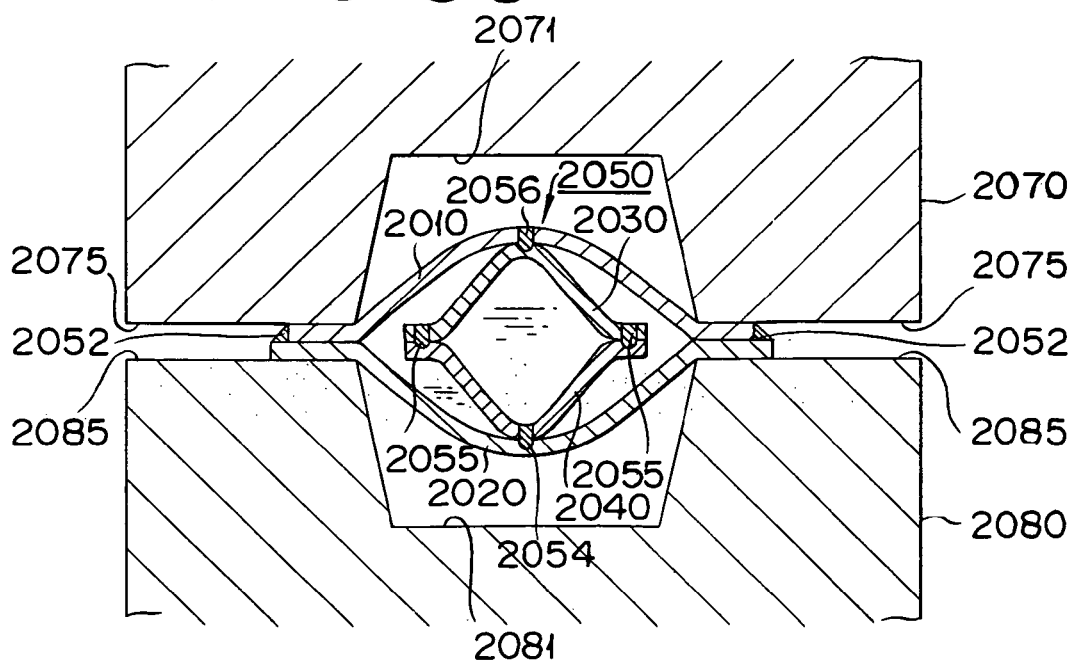
FIG. 60 is a cross-sectional view of assistance in explaining an intermediate stage of forming continued from FIG. 59.
Figure 61:
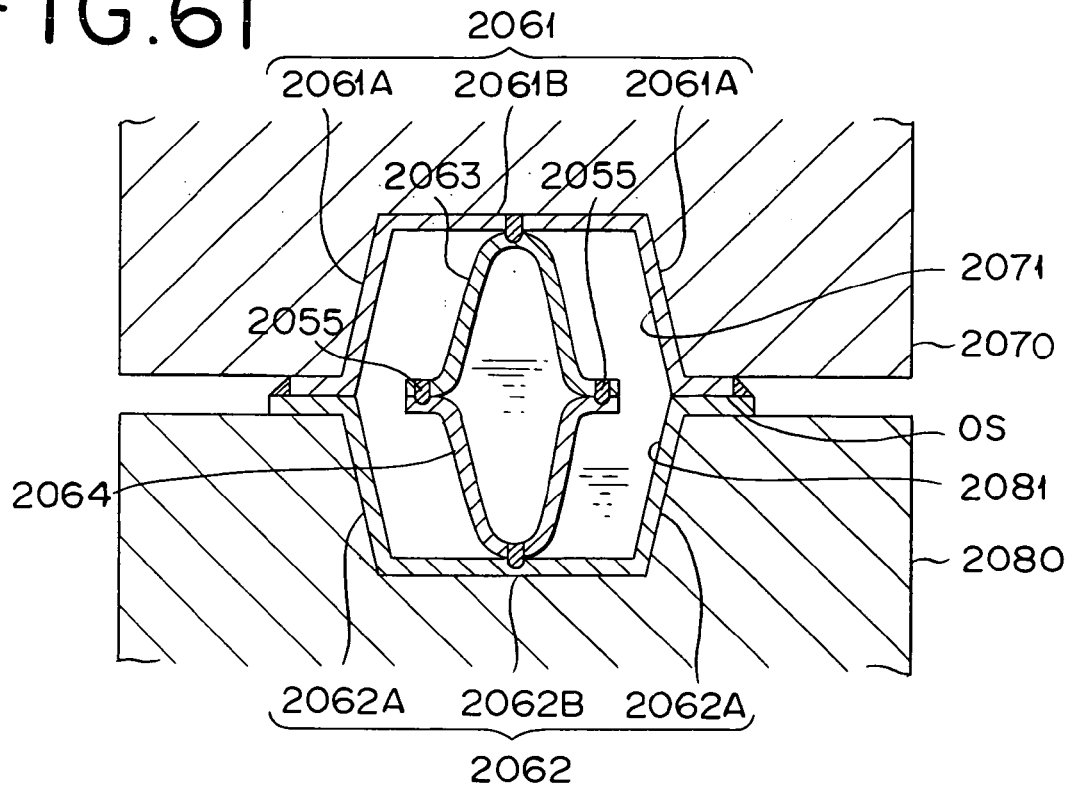
FIG. 61 is a cross-sectional view of assistance in explaining a latter stage of forming continued from FIG. 60.

Next, the hydraulic pressure forming method according to the embodiment C1 will be described. FIG. 56 is a cross-sectional view of assistance in explaining a die clamping stage, FIG. 57 is a cross-sectional view taken on line LVII-LVII of the view in FIG. 56, FIG. 58 is a cross-sectional view of assistance in explaining an initial stage of forming continued from FIG. 57, FIG. 59 is a cross-sectional view of assistance in explaining a die clamping stage continued from FIG. 58, FIG. 60 is a cross-sectional view of assistance in explaining an intermediate stage of forming continued from FIG. 59, and FIG. 61 is a cross-sectional view of assistance in explaining a latter stage of forming continued from FIG. 60.

First, the preform 2050 is placed on the bottom die 2080. At this time, the bottom plate 2020 that is to constitute the outer surface 2062 of the hydroformed products 2060 is disposed in such a way to face the cavity surface 2081, and align the opening 2022 of the sheet material 2020 with the dome-shaped part 2092 of the nozzle unit 2091 of the hydraulic pressure supply mechanism 2090.

Figure 57:
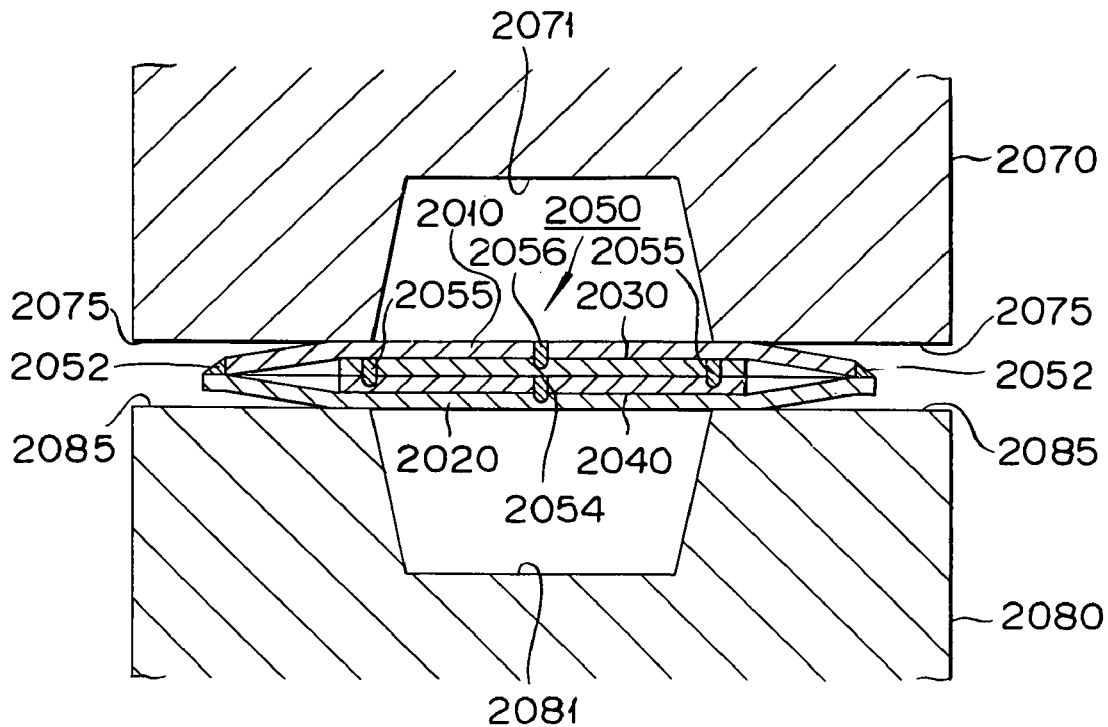
FIG. 57 is a cross-sectional view taken on line LVII-LVII of the view in FIG. 56.

After that, the top die 2070, which has been in a standby position, comes down to approach the bottom die 2080 to complete the clamping of the top die 2070 and the bottom die 2080 (see FIG. 56 and FIG. 57). At this time, the top plate 2010, which is to constitute the outer surface 2061 of the hydroformed products 2060, is disposed in such a way as to face the cavity surface 2071, and the dome-shaped part 2012 of the sheet material 2010 is fitted to the end section 2076A of the recess 2076 located in the pressing section 2075 of the top die 2070.

The vicinity of the dome-shaped part 2012 is gripped by the arc-shaped grooves 2077, 2078 in the pressing section 2075 of the top die 2070 and the annular protrusions 2094, 2095 in the nozzle unit 2091 placed in the recess 2086 of the bottom die 2080. This generates an annularly deformed area in the vicinity of the dome-shaped part 2012, which provides an improved sealability against the forming medium being introduced.

The joints 2052 and 2055 of the preform 2050 are disposed to the pressing sections 2075, 2085 which are positioned a prescribed clearance apart from each other by the large spacer (not shown).

The hydraulic pressure supply mechanism 2090 introduces a forming medium supplied from the hydraulic circuit 2099 into the inside of the preform 2050 via the nozzle unit 2091 and the opening 2022 to apply a hydraulic pressure. As a result, the preform 2050 causes its inflating deformation, bringing the edges of the preform 2050 closer toward the cavity surfaces 2071, 2081 and causing material flows.

As the joint 2055 of the preform 2050 moves into the internal forming space surrounded by the cavity surfaces 2071, 2081 (see FIG. 58), the large spacer placed between the pressing section 2075 of the top die 2070 and the pressing section 2085 of the bottom die 2080 are replaced with the small spacer. The top die 2070 comes down further in correspondence with the thickness of the small spacer to clamp the dies, securing a specified clearance corresponding to the thickness of the edges of the preform 2050 (see FIG. 59).

As the supply of the forming medium continues, the middle areas of the upper insertion plate 2030 and the lower insertion plate 2040 jointed to the top plate 2010 and the bottom plate 2020, which are causing inflating deformation, are stretched under a tension. Since the upper insertion plate 2030 and the lower insertion plate 2040 are jointed together at the ends, they bend in the middle areas and gradually deform into a parallelogram shape forming corners at the joints 2054, 2055, and 2056 (FIG. 60).

When the inner pressure of the preform 2050 reaches its final pressure, the supply of the forming medium is stopped and held for a prescribed time to complete the inflation process of the preform 2050. Consequently, the top plate 2010 and the bottom plate 2020 form the outer surfaces 2061, 2062 of the hydroformed product 2060, wherein the peripheral areas 2015A, 2025A and the middle areas 2015B, 2025B of the intermediate parts 2015, 2025 of the top plate 2010 and the bottom plate 2020 form the sidewalls 2061A, 2062A that are inclined relative to the overlapping plane OS of the outer surface 2061, 2062 as well as the summit parts 2061B, 2062B surround by the sidewalls 2061A, 2062A.

Since the middle areas of the upper insertion plate 2030 and the lower insertion plate 2040 are jointed to the summit parts 2061B, 2062B and also jointed together at the ends, the upper insertion plate 2030 and the lower insertion plate 2040 form the reinforcement ribs 2063, 2064 which divide the hollow cross section of the outer surfaces 2061, 2062 of the hydroformed product 2060 and support the summit parts 2061B, 2062B of the outer surface 2061, 2062 (FIG. 61).

Next, the top die 2070 is raised after removing the hydraulic pressure, the hydroformed product is taken out, and trimming including cutting is performed.

The hydroformed product has an excellent rigidity in the perpendicular direction because of the reinforcing ribs 2063, 2064 supporting the summit parts 2061B, 2062B. Its manufacturing cost is excellent as it is made from the preform 2050 which has an excellent manufacturing cost.

As can be seen from the above, the embodiment C1 provides preforms with excellent manufacturing cost advantages and capability of improving the vertical direction rigidity of hydroformed products, a hydraulic forming method for obtaining hydroformed products with excellent manufacturing cost advantages and vertical direction rigidity, and hydroformed products with excellent manufacturing cost advantages and vertical direction rigidity.

In order to suppress the reduction of the rigidity in the horizontal direction or the direction parallel to the overlapping surface OS, it is preferable to have the joints 2055 of the reinforcement ribs 2063, 2064 located abutting to or in very close proximity of the side walls 2061A, 2062A of the hydroformed product. This is achievable by properly modifying the sizes and shapes of the upper insertion plate 2030, the lower insertion plate 2040, the top plate 2010, the bottom plate 2020, and the cavity surfaces 2071, 2081 of the forming dies.

Moreover, although it was shown to provide the hydraulic pressure by injecting the forming medium through the opening formed in one of the outer members, the embodiment C1 is capable of applying various other types of preforms and hydroforming apparatuses without being limited to the aforementioned particular style.

For example, the opening 2022 of the bottom plate 2020 and the nozzle unit 2091 of the hydraulic pressure supply mechanism 2090 can both be provided more than one. It is also possible to perform the die clamping only once by disposing the joints 2054, 2056 of the preform 2050 in the internal forming space surrounded by the cavity surfaces 2071, 2081 from the start, thus eliminating the spacer replacement process.

Figure 62:
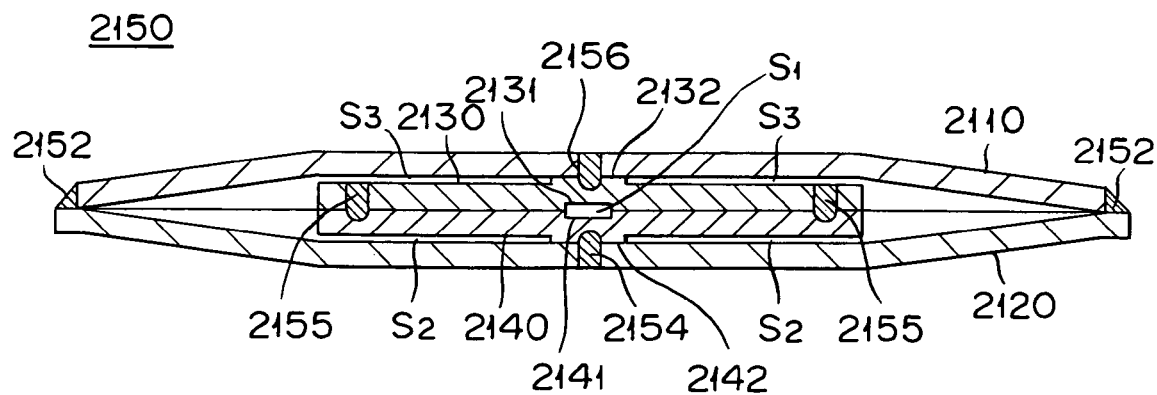
FIG. 62 is a cross-sectional view of assistance in explaining a preform according to the embodiment C2.
Figure 63:
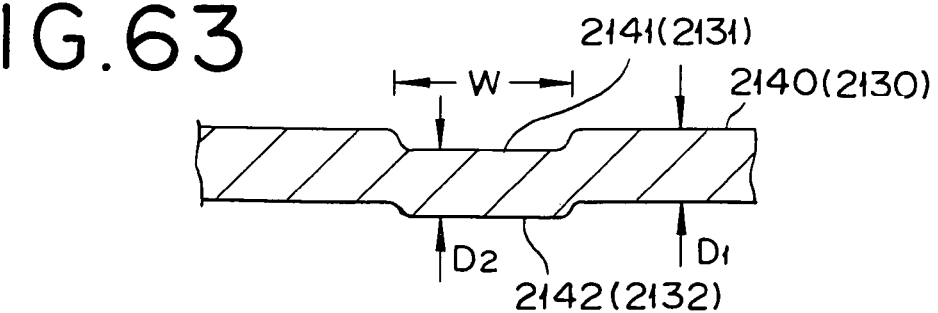
FIG. 63 is a cross-sectional view of assistance in explaining shapes of the lower insertion plate and the upper insertion plate that constitute reinforcement members of the preform shown in FIG. 62.

FIG. 62 is a cross-sectional view of a preform according to the embodiment C2, and FIG. 63 is a cross-sectional view of assistance in explaining shapes of the lower insertion plate and the upper insertion plate that constitute a reinforcement member of a preform shown in FIG. 62. Those members that have the identical functions as those in the embodiment C1 will be denoted with the identical keys hereinafter in order to avoid duplicating their descriptions.

The embodiment C2 is generally different from the embodiment C1 in that the welding yield is improved by modifying the shapes of the upper insertion plate and the lower insertion plate.

The upper insertion plate 2130 and the lower insertion plate 2140 in accordance with the embodiment C2 have recesses 2131, 2141 located substantially in the middle between the edges. The recesses 2131, 2141 have bending shapes which can be formed by presses, for example.

The recesses 2131, 2141 are aligned with joints 2154, 2156 to be piercing-welded. The welding heat generated by pierce welding moves primarily through an area with reduced thickness and the welding preferably requires a penetration of about two to three times of the material thickness. Therefore, it is so designed that the sheet thickness $D_2$ of the bottoms of the recesses 2131, 2141 is smaller than the sheet thickness $D_1$ of the vicinities of the recesses 2131, 2141, or of areas where the recesses 2131, 2141 are not formed, and the width W of the recesses 2131, 2141 is two to three times of the sheet thickness $D_1$.

The lower insertion plate 2140 is disposed in such a way that the back area 2142 of the recess 2141 faces the bottom plate 2120, and the back area 2142 is connected to the middle area of the bottom plate 2120 via the joint 2154. Since the back area 2142 constitutes a protrusion or is protrusively shaped, it forms a thin flat space $S_2$ between the lower insertion plate 2140 and the bottom plate 2120.

The upper insertion plate 2130 is disposed in such a way that the recess 2131 faces the recess 2141 of the lower insertion plate 2140, and both ends of the upper insertion plate 2130 are connected to both ends of the lower insertion plate 2140 via the joints 2155. The recess 2131 of the upper insertion plate 2130 is jointed with the recess 2131 of the lower insertion plate 2140 to form a substantially rectangular space $S_1$.

The top plate 2110 is disposed to face a back area 2132 of the recess 2131 of the upper insertion plate 2130, and the middle part of the top plate 2110 is connected to the back area 2132 of the recess 2131 of the upper insertion plate 2130 via the joint 2156. Since the back area 2132 constitutes a protrusion or is protrusively shaped, it forms a thin flat space $S_3$ between the top plate 2110 and the upper insertion plate 2130. The edges of the top plate 2110 are connected to the edges of the bottom plate 2120 via joints 2152.

Figure 64:
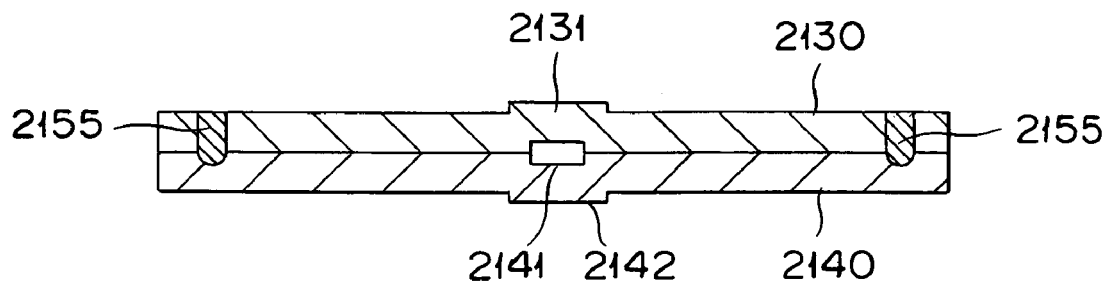
FIG. 64 is a cross-sectional view of assistance in explaining an example method of jointing the upper insertion plate and the lower insertion plate that constitute the reinforcement members of the preform shown in FIG. 62 showing the jointing process of the upper insertion plate to the lower insertion plate.
Figure 65:
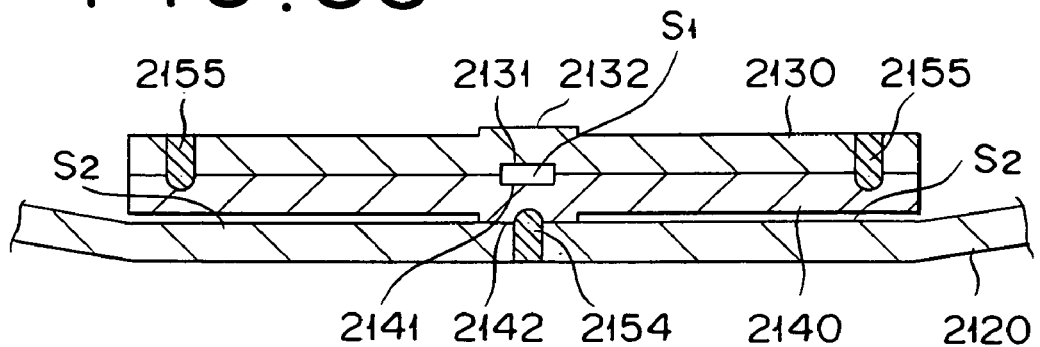
FIG. 65 is a cross-sectional view of assistance in explaining the jointing process of the lower insertion plate to the bottom plate following FIG. 64.
Figure 66:
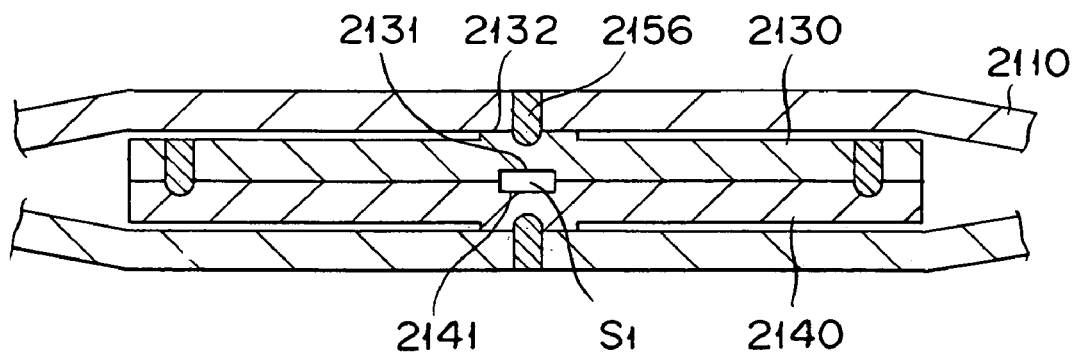
FIG. 66 is a cross-sectional view of assistance in explaining the jointing process of the top plate to the upper insertion plate following FIG. 65.

Next, a typical method for jointing the lower insertion plate and the upper insertion plate constituting reinforcement members for a preform according to the embodiment C2 will be described below. FIG. 64 is a cross-sectional view of assistance in explaining the jointing process of the the upper insertion plate to the lower insertion plate, FIG. 65 is a cross-sectional view of assistance in explaining the jointing process of the lower insertion plate to the bottom plate following FIG. 64, and FIG. 66 is a cross-sectional view of assistance in explaining the jointing process of the top plate to the upper insertion plate following FIG. 65.

First, the upper insertion plate 2130 is laid over the lower insertion plate 2140, which is already disposed in a specified position, in such a way that the recess 2131 of the upper insertion plate 2130 faces the recess 2141 of the lower insertion plate 2140. Next, both ends of the upper insertion plate 2130 are jointed to both ends of the lower insertion plate 2140 by pierce welding to form the joints 2155 (see FIG. 64).

At this time, the lower insertion plate 2140 is relatively unstable as it is supported only by the back area 2142 of the recess 2141. Therefore, it is preferable to eliminate this unstable condition by placing wedge plates having the same height as the back area 2142 in such a way that they abut the surface the back area 2142 is located.

After that, the jointed member consisting of the upper insertion plate 2130 and the lower insertion plate 2140 is disposed in such a way that the back area 2142 of the recess 2141 of the lower insertion plate 2140 faces the bottom plate 2120. Then joint the middle area of the bottom plate 2120 to the back area 2142 of the recess 2141 of the lower insertion plate 2140 by pierce welding to form the joint 2154 (see FIG. 65).

In other words, the joint 2154 is formed by welding the first sheet material as bottom plate 2120 located on the surface to the second sheet material as lower insertion plate 2140 located inside thereof while stacking more than three pieces of materials, i.e., the outer member as bottom plate 2120 and the sheet materials as upper insertion plate 2130 and lower insertion plate 2140 that constitute the reinforcement members.

Meanwhile, a space $S_1$ formed by the recesses 2131, 2141 exists between the upper insertion plate 2130 and the lower insertion plate 2140. The space $S_1$ prevents the transmission of welding heat and inadvertent welding of the second sheet material as lower insertion plate 2140 to the third sheet material as upper insertion plate 2130, thus improving the welding yield.

Moreover, the upper insertion plate 2130 is relatively unstable as it is supported only by the back area 2132 of the recess 2131. Therefore, it is preferable to eliminate this unstable condition by placing wedge plates having the same height as the back area 2132 in such a way that they abut the surface the back area 2132 is located.

When the formation of the joint 2154 is completed, the top F plate 2110 is laid over the upper insertion plate 2130 in such a way that the edges of the top plate 2210 match with the edges of the bottom plate 2120. Next, joint the middle area of the top plate 2110 to the upper insertion plate 2130 by pierce welding to form the joint 2156 (see FIG. 66). The welding location is the back area 2132 of the recess 2131, and the recess 2131 is forming the space $S_1$ in coordination with the recess 2141 of the lower insertion plate 2140.

Namely, the joint 2156 is formed by welding the first sheet material as top plate 2110 located on the surface to the second sheet material as upper insertion plate 2130 located inside thereof while stacking more than three pieces of materials, i.e., the outer members as top plate 2110 and bottom plate 2120 and the sheet materials that constitute the reinforcement member as upper insertion plate 2130 and lower insertion plate 2140.

The space $S_1$, which is aligned with the joint surface, is located between the second sheet material as upper insertion plate 2130 and the third sheet material as lower insertion plate 2140 located in the inside thereof. The space $S_1$ prevents the transmission of welding heat and inadvertent welding of the second sheet material as upper insertion plate 2130 to the third sheet material as lower insertion plate 2140, thus improving the welding yield.

When the jointed section 2156 is completed, the overlapping edges of the top plate 2110 and the bottom plate 2120 are jointed to complete the preform 2150 (see FIG. 62). The reference numeral 2152 denotes the joint formed on the edges.

As can be seen from the above, the embodiment C2 makes it possible to reduce the manufacturing cost of the preform further by improving the welding yield.

The order of jointing the upper insertion plate 2130, the lower insertion plate 2140, and the bottom plate 2120 can be arbitrarily changed. For example, a thin space $S_2$ exists between the lower insertion plate 2140 and the bottom plate 2120 when the upper insertion plate 2130 is jointed to the lower insertion plate 2140 after the lower insertion plate 2140 is jointed to the bottom plate 2120. The space $S_2$ prevents the transmission of welding heat and inadvertent welding of the second sheet material as lower insertion plate 2140 to the third sheet material as bottom plate 2120.

Figure 67:
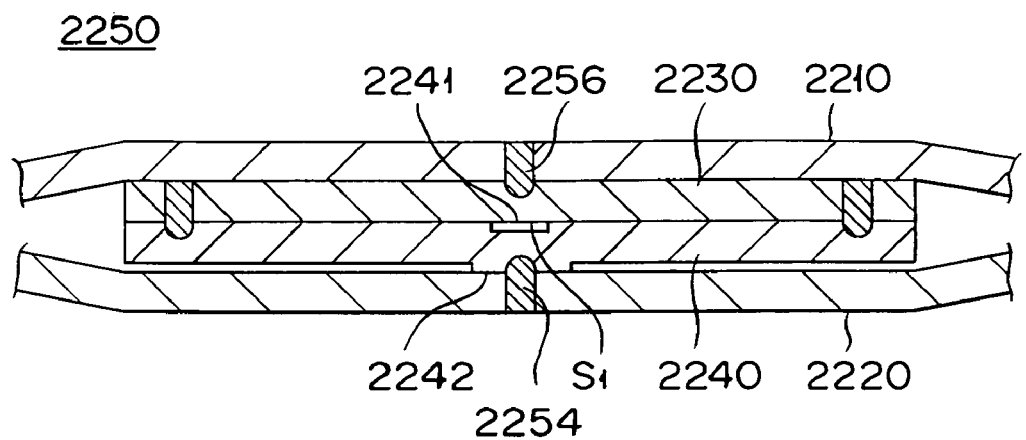
FIG. 67 is a cross-sectional view of assistance in explaining the lower insertion plate and the upper insertion plate that constitute reinforcement members for a preform according to the embodiment C3.

FIG. 67 is a cross-sectional view of assistance in explaining the lower insertion plate and the upper insertion plate that constitute reinforcement members for the preform according to the embodiment C3. The preform 2250 according to the embodiment C3 is generally different from the preform 2150 according to the embodiment C2 in that the shapes of the upper insertion plate and the lower insertion plate do not coincide with their respective counterparts.

In case of the preform 2250 in accordance with the embodiment C3, the lower insertion plate 2240 has a recess 2241 while the upper insertion plate 2230 is substantially flat. However, it is still possible for the recess 2241 to form a space $S_1$ between the lower insertion plate 2240 and the upper insertion plate 2230.

Consequently, the space $S_1$ can prevent the transmission of the welding heat and prevent the lower insertion plate 2240 and the upper insertion plate 2230 from inadvertently welded together, when the jointed body consisting of the upper insertion plate 2230 and the lower insertion plate 2240 is disposed in such a way that a back area 2242 of the recess 2241 of the lower insertion plate 2240 faces against the bottom plate 2220, and the bottom plate 2220 is jointed to the back area 2242 of the recess 2241 of the lower insertion plate 2240 by pierece welding to form a joint 2254 (see FIG. 65).

When the top plate 2210 is jointed to the upper insertion plate 2230 by pierce welding to form the joint 2256, the welding location corresponds to the location of the recess 2241 of the lower insertion plate 2240, and a back of the upper insertion plate 2230 forms the space $S_1$ in coordination with a recess 2241 of the lower insertion plate 2240. Consequently, the space $S_1$ can prevent the transmission of the welding heat and prevent the upper insertion plate 2230 and the lower insertion plate 2240 from inadvertently welded together.

As can be seen from the above, the embodiment C3 is different from the embodiment C2 in that it has the recess only on the lower insertion plate, it can improve the welding yield as in the embodiment C2. It is also possible to form a recess on the upper insertion plate while maintaining the lower insertion plate substantially flat.

Figure 68:
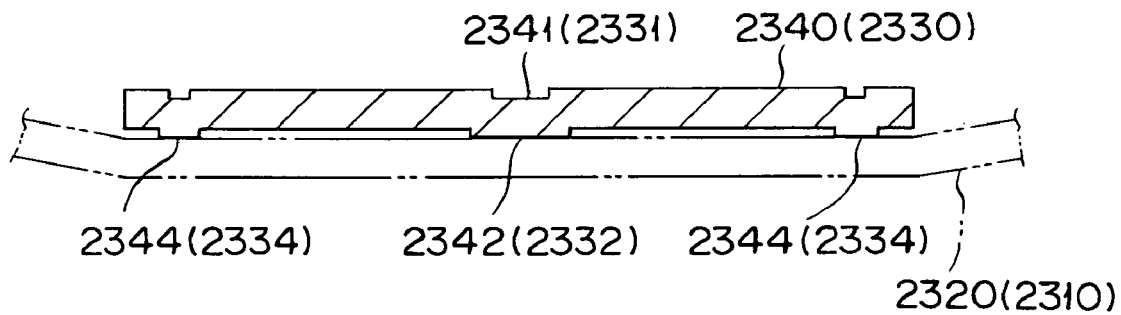
FIG. 68 is a cross-sectional view of assistance in explaining the lower insertion plate and the upper insertion plate that constitute reinforcement members for a preform according to the embodiment C4.

FIG. 68 is a cross-sectional view of assistance in explaining the lower insertion plate and the upper insertion plate that constitute reinforcements member for the preform according to the embodiment C4. The preform according to the embodiment C4 is generally different from the preform 2150 according to the embodiment C2 in that protrusions are formed on both the upper insertion plate and the lower insertion plate.

Protrusion 2344 (2334) in the embodiment C4 are disposed across the back areas 2342 (2332) of recesses 2341 (2331) in the vicinities of the ends. Each of the protrusions 2344 (2334) is formed in a bent shape having a substantially flat top and can be formed by a press forming process, for example. The height of the protrusions 2344 (2334) matches the height of the back areas 2342 (2332) of the recesses 2341 (2331).

Consequently, it produces a stable condition when the lower insertion plate 2340 is jointed to the bottom plate 2320 (compare with FIG. 65) as the gap between the bottom plate 2320 and the lower insertion plate 2340 is supported by three places in total, i.e. two protrusions 2344 and the back area 2332 of the recess 2331.

It produces a stable condition when the top plate 2310 is jointed to the upper insertion plate 2330 (compare with FIG. 66) as the gap between the top plate 2310 and the upper insertion plate 2330 is supported by three places in total, or two protrusions 2334 and the back area 2332 of the recess 2331.

Thus, the joints 2254, 2256 can be securely formed even without a process of applying wedge plates so that it is possible to reduce welding failures and improve the welding yield without increasing the number of work steps.

As can be seen from the above, the embodiment C4 can further reduce the manufacturing cost of the preform compared to the embodiment C2 by improving the welding yield without reducing the productivity. The protrusions can be formed only one of the upper insertion plate or the lower insertion plate if needed.

Figure 69:
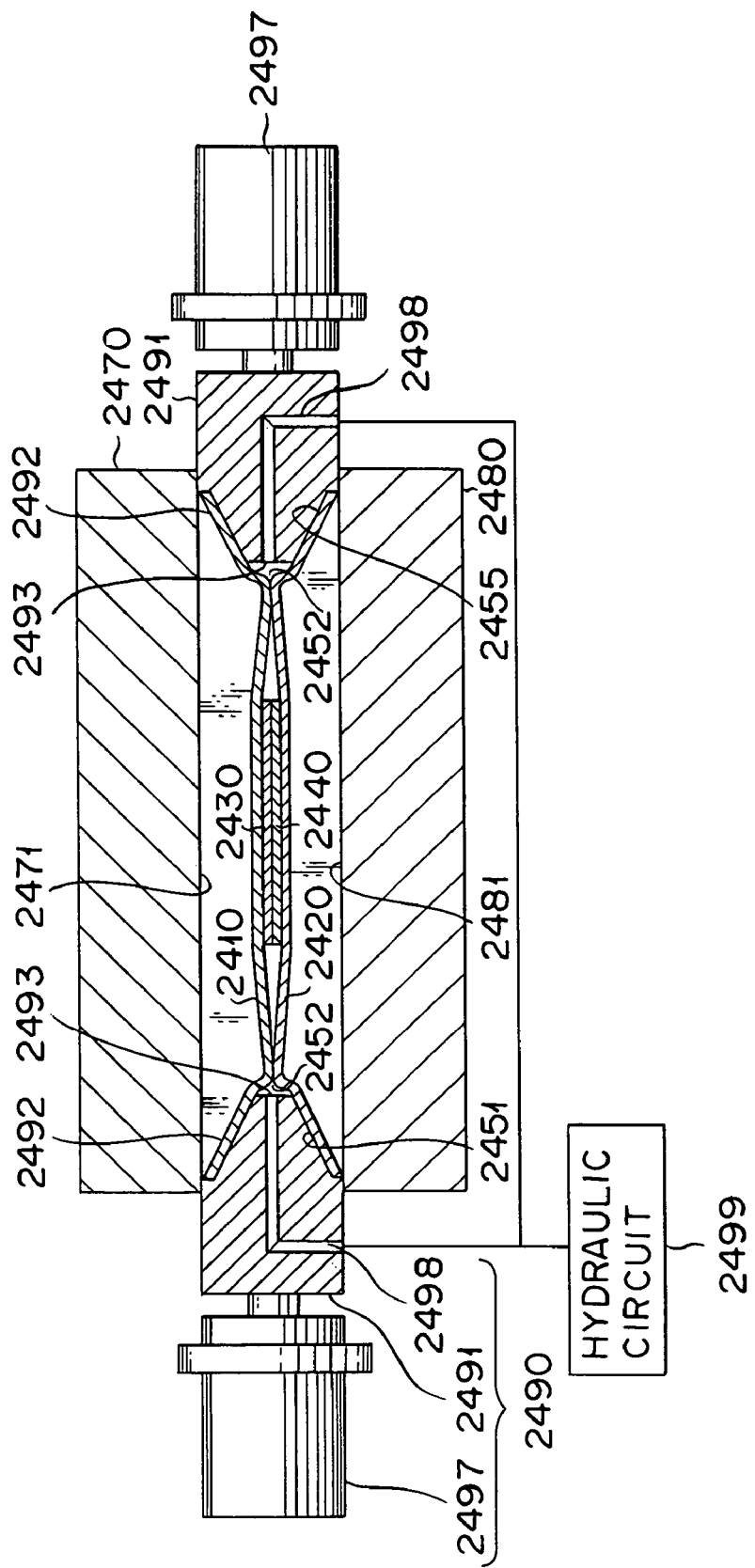
FIG. 69 is a cross-sectional view of assistance in explaining an embodiment C5.

FIG. 69 is a cross-sectional view of assistance in explaining an embodiment C5. The embodiment C5 is generally different from the embodiment C1 concerning the shape of the preform and the constitution of the hydroforming apparatus.

More specifically, a preform 2450 concerning the embodiment C5 has the top plate 2410 and the bottom plate 2420 that are to form an outer surface of a hydroformed product, the upper insertion plate 2430 and the lower insertion plate 2440 that are to form reinforcing ribs, and a non-jointing part 2451 for providing a hydraulic pressure by means of introducing forming medium. The upper insertion plate 2430 and the lower insertion plate 2440 are disposed inside of the top plate 2410 and the bottom plate 2420 overlapping each other.

The non-jointing part 2451 is constituted of a abutting plane of the end faces of the top plate 2410 and the bottom plate 2420. The abutting plane is preformed in substantially a conical shape. The non-jointing part 2451 has an outer end on which a circular opening is provided and an inner end 2452 communicating with the inside of the preform 2450. Namely, the preform 2450 has an opening formed by the end face of one of the outer members 2410 and the abutting surface of the other outer members 2420. The non-jointing part 2451 is not limited to a shape being disposed throughout the end face but can be partially disposed.

The top plate 2410 is disposed to face a cavity surface 2471 of the top die 2470. The bottom plate 2420 is disposed to face a cavity surface 2481 of the bottom die 2480. The cavity surfaces 2471, 2481 correspond to the outer surface shapes of the hydroformed product 2060, having sidewalls and summit parts as top or bottom surfaces corresponding to the sidewalls 2061A, 2062A and summit parts 2061B, 2062B on the outer surface s 2061, 2062 of the hydroformed product 2060.

A hydraulic pressure supply mechanism 2490 has a flow path 2498 that communicates with a hydraulic circuit 2499, an axial press punch 2491, and an axial press cylinder 2497. The axial press punch 2491 is located on each side of the top die 2470 and the bottom die 2480 and is connected to the axial press cylinder 2497. The axial press punch 2491 has a nozzle unit 2492.

The nozzle unit 2492 has an injection port 2493 that communicates with the flow path 2498, and presents a substantially conical shape that corresponds with the shape of the non-jointing part 2451. The axial press cylinder 2497 supports the axial press punch 2591 to move towards or away from the dies. i.e. the top die 2470 and the bottom die 2480. The power source of the axial press cylinder 2497 is typically hydraulic or pneumatic.

The non-jointing part 2451 of the preform 2450 expands when the nozzle unit 2492 is pushed into its opening, while its expanded diameter is restricted by the top die 2470 and the bottom die 2480. As a consequence, the non-jointing part 2451 makes a close contact with the nozzle unit 2492 securing a sealing effect.

The injection port 2493 of the nozzle unit 2492 is aligned with the inner end 2452 that communicates with the inside of the preform 2450. As a consequence, the forming medium supplied from the hydraulic circuit 2499 is introduced to the flow path 2498 and the injection port 2493, and injected into the inside of the preform 2450 via the non-jointing part 2451 and the inner end 2452.

Thus, the hydraulic pressure supply mechanism 2490 applies a hydraulic pressure to the inside of the preform 2450 to cause an inflating deformation.

As can be seen from the above, the embodiment C5 can form the outer surface parts of a hydroformed product and reinforcement ribs that divide the hollow cross section of the hydroformed product by means of introducing a forming medium into an opening created by an abutment plane between the end face of one of the outer members and the end face of the other outer member to apply a hydraulic pressure, and causing an inflating deformation of a preform.

Incidentally, in the embodiment C1 through C5, it is possible to create a hollow structural product with excellent rigidity both in vertical and horizontal directions as a whole by properly combining a hydroformed product with excellent vertical rigidity according to the embodiment C1 through C5 and a hydroformed product with excellent horizontal rigidity.

Furthermore, depending on the intended hydroformed product, it is possible to modify as needed the shapes of the top plate and the bottom plate as sheet materials that constitute the outer members, the upper insertion plate and the lower insertion plate as sheet materials that constitute the reinforcement members, locations of the recesses, the locations of the sheet materials that constitute the reinforcement members of the preform, etc.

It is obvious that this invention is not limited to the particular embodiments shown and described above but may be variously changed and modified without departing from the technical concept of this invention.

For example, it is possible to apply the sheet material according to the embodiment A1 to the embodiment B1 through B6 and the embodiment C1 through C5 to obtain hydroformed products having an excellent manufacturing cost, an excellent external shape and different cross-sectional contour lengths.

This application is based on Japanese Patent Application Nos. 2004-220851 filed on Jul. 28, 2004 and 2004-261390 and 2004-261396 filed on Sep. 8, 2004, the contents of which are hereby incorporated by reference.

What is claimed is:

1. A preform having edges overlapped and jointed, two outer members for forming outer surfaces of a hydroformed product, and reinforcement members for forming reinforcement ribs that divide a hollow cross section of the hydroformed product, said preform comprising:

a joint formed by, when more than three sheet materials for forming said outer members and said reinforcement members are overlapped together, welding a first sheet material on a surface of said overlapped sheet materials to a second sheet material positioned inside said first sheet material; and a space, which is prepared before the formation of said joint, aligned with said joint and disposed between said second sheet material and a third sheet material located inside said second sheet material during said welding process.

2. A preform as claimed in claim 1, in which said space is formed by a recess formed in said second sheet material.

3. A preform as claimed in claim 2, in which said recess has a bent shape.

4. A preform as claimed in claim 2, in which a thickness of a bottom of said recess is less than a thickness of a vicinity of said recess.

5. A preform as claimed in claim 1, in which said second sheet material has a protrusion on a facing surface, and said space is formed by abutment of said protrusion.

6. A preform as claimed in claim 2, in which said second sheet material is one of said reinforcement members.

7. A preform as claimed in claim 6, in which said reinforcement members include a first reinforcement member on which said recess is formed and a second reinforcement member, which is substantially flat, and said recess is disposed to face one of said outer members, both ends of said first reinforcement member are welded to one of said outer members, and an area abutting a back area of said recess in said second reinforcement member is jointed to said first reinforcement member, and both ends of said second reinforcement member are welded to the other of said outer members.

8. A preform as claimed in claim 7, in which said recess of the first reinforcement member is located substantially in a middle of both ends of said first reinforcement member.

9. A preform as claimed in claim 7, in which said reinforcement members include a first reinforcement member and a second reinforcement member on which said recesses are respectively formed, and said recess of the first reinforcement member is disposed to face one of said outer members, and both ends of said first reinforcement member are welded to one of said outer members, and said recess of the second reinforcement member is disposed to face another one of said outer members, and a back area of said recess of the second reinforcement member is welded to a back area of said recess of the first reinforcement member, and both ends of said second reinforcement member are welded to the other of said outer members.

10. A preform as claimed in claim 9, in which said first reinforcement member and said second reinforcement member each have protrusions disposed on both sides at a position separated from the back area of said recess, said protrusion of the first reinforcement member and said protrusion of the second reinforcement member are so positioned as to abut, and a space formed between said first reinforcement member and said second reinforcement member when said protrusion of the first reinforcement member is made to abut said protrusion of the second reinforcement member, matches a total of a height of the back area of said recess of the first reinforcement member and a height of the back area of said recess of the second reinforcement member.

11. A preform as claimed in claim 9, in which said second reinforcement member has protrusions disposed on both sides at a position separated from the back area of said recess, and said first reinforcement member has receiving parts disposed on both sides at a position separated from the back area of said recess and so positioned as to fit with said protrusions, and a space formed between said first reinforcement member and said second reinforcement member when said receiving part of the first reinforcement member is made to fit with said protrusion of the second reinforcement member, matches a total of a height of the back area of said recess of the first reinforcement member and a height of the back area of said recess of the second reinforcement member.

12. A preform as claimed in claim 11, in which said receiving part includes a protrusion having a summit part on which a dent is so formed as to fit with said protrusion of the second reinforcement member.

13. A preform as claimed in claim 9, in which said recesses of the first reinforcement member and the second reinforcement member are located substantially in a middle of both ends of said first reinforcement member and said second reinforcement member, respectively.

14. A preform as claimed in claim 1, in which, said hydroformed product has different cross-sectional contour lengths, and one and the other one of said outer members generate different elongation amounts when a hydraulic pressure is applied, and one of said outer members which generates a smaller elongation forms an outer surface of said hydroformed product with a smaller cross-sectional contour length, and the other one of said outer members which generates a larger elongation forms an outer surface of said hydroformed product with a larger cross-sectional contour length.

15. A preform as claimed in claim 14, in which, one and the other one of said outer members are made of different materials.

16. A preform as claimed in claim 14, in which one and the other one of said outer members are made of materials with different sheet thicknesses.

17. A preform as claimed in claim 14, in which a tensile strength of one of said outer members is greater than a tensile strength of the other outer member.

18. A perform as claimed in claim 14, in which one of said outer members is made of hot rolled mild steel sheet and the other outer member is made of cold rolled steel sheet.

19. A preform as claimed in claim 1, in which, said outer surfaces of the hydroformed product have sidewalls that are inclined relative to an overlapping surface of one and the other one of said outer members and summit parts surrounded by said sidewalls, and said reinforcement members are substantially flat and are jointed to a middle area of one and the other of said outer members for forming said summit parts.

20. A preform as claimed in claim 19, in which, said reinforcement members include a first and a second reinforcement member that are overlapped to each other, and both ends of said first and second reinforcement members are jointed to the counterparts thereof, and middle parts located between both ends are jointed to one and the other of the outer members respectively.

21. A preform as claimed in claim 19, in which said space is formed by a recess formed on said second sheet material.

22. A preform as claimed in claim 21, in which said recess has a bent shape.

23. A preform as claimed in claim 21, in which a thickness of a bottom of said recess is less than a thickness of a vicinity of said recess.

24. A preform as claimed in claim 21, in which said second sheet material has a protrusion, and said space is formed when said protrusion of the second sheet material abuts with said third sheet material.

25. A preform as claimed in claim 24, in which said protrusion is formed by a back area of said recess.

26. A preform as claimed in claim 21, comprising protrusions disposed on both sides at a position separated from a back area of said recess, in which a height of said protrusions matches with a height of a back area of said recess.

27. A preform as claimed in claim 19, in which one of said outer members or the other one of said outer members has an opening for injecting a forming medium.

28. A preform as claimed in claim 19, in which an opening for injecting a forming medium is formed by an abutment surface between the end face of one of said outer members and the end face of the other of said outer members.

29. A preform as claimed in claim 1, wherein said third sheet material has a protrusion on a facing surface, and said space is formed by an abutment of said protrusion.

30. A preform as claimed in claim 1, wherein said second sheet material and said third sheet material have protrusions on facing surfaces, and said space is formed by abutment of said protrusions.

31. A preform as claimed in claim 19, wherein said space is formed by a recess formed on said third sheet material.

32. A preform as claimed in claim 19, wherein said space is formed by recesses formed on said second sheet material and said third sheet material.

33. A perform as claimed in claim 1, wherein the space and the joint are located directly above and below one another in relation to a thickness direction of the sheet materials.

\* \* \* \* \*